US008823636B2

(12) United States Patent
Cohen et al.

(10) Patent No.: US 8,823,636 B2
(45) Date of Patent: Sep. 2, 2014

(54) INCLUDING ENVIRONMENTAL INFORMATION IN A MANUAL EXPRESSION

(75) Inventors: Alexander J. Cohen, Mill Valley, CA (US); B. Isaac Cohen, Mill Valley, CA (US); Ed Harlow, Boston, MA (US); Eric C. Leuthardt, St. Louis, MO (US); Royce A. Levien, Lexington, MA (US); Mark A. Malamud, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 11/603,334

(22) Filed: Nov. 20, 2006

(65) Prior Publication Data

US 2007/0120837 A1    May 31, 2007

Related U.S. Application Data

(63) Continuation-in-part of application No. 11/603,332, filed on Nov. 20, 2006, now Pat. No. 7,809,215, and a (Continued)

(51) Int. Cl.
*G09G 5/00* (2006.01)
*G06K 9/22* (2006.01)
*G06F 3/0354* (2013.01)
*G06F 17/24* (2006.01)
*G06K 9/24* (2006.01)

(52) U.S. Cl.
CPC ........... *G06F 3/03545* (2013.01); *G06K 9/222* (2013.01); *G06F 17/241* (2013.01); *G06K 9/24* (2013.01)
USPC ........................................................ 345/156

(58) Field of Classification Search
USPC .................................................. 345/179–183
See application file for complete search history.

(56) References Cited

U.S. PATENT DOCUMENTS

| 1,550,048 A | 8/1925 | Ruben |
| 4,053,024 A | 10/1977 | Hoyt |

(Continued)

FOREIGN PATENT DOCUMENTS

JP    07334639 A    12/1995

OTHER PUBLICATIONS

"Pen-One, Inc. Announces Biometric Pen Developer's Kit at CARTES Worldwide Card and Security Conference"; Breaking News Nov. 2, 2004 Paris, France; Nov. 2, 2004; pp. 1-2; printed on Dec. 13, 2006; bearing dates of 2001-2004; located at http://pen-one.com/html/Informatica_SDK_110204.htm; Pen One.

(Continued)

*Primary Examiner* — Alexander Eisen
*Assistant Examiner* — Cory Almeida

(57) ABSTRACT

Embodiments include a method, a manual device, a handheld manual device, a handheld writing device, a system, and an apparatus. An embodiment provides a system. The system includes a manual device. The manual device includes a first writing element operable to discharge a first marking substance on a surface in response to a movement of the first writing element upon the surface. The manual device also includes a second writing element operable to discharge a second marking substance on the surface in response to a controller. The controller is operable to encode information corresponding to an environment of the manual device by regulating a discharge of the second marking substance. The system also includes a sensor operable to acquire data indicative of an environment of the manual device.

19 Claims, 39 Drawing Sheets

Related U.S. Application Data continuation-in-part of application No. 11/603,289, filed on Nov. 20, 2006, now Pat. No. 7,826,687, and a continuation-in-part of application No. 11/603,333, filed on Nov. 20, 2006, now Pat. No. 7,873,243, and a continuation-in-part of application No. 11/603,275, filed on Nov. 20, 2006, and a continuation-in-part of application No. 11/603,336, filed on Nov. 20, 2006, now Pat. No. 7,813,597, and a continuation-in-part of application No. 11/083,567, filed on Mar. 18, 2005, now Pat. No. 8,340,476, and a continuation-in-part of application No. 11/580,217, filed on Oct. 11, 2006, now Pat. No. 8,244,074, and a continuation-in-part of application No. 11/580,218, filed on Oct. 11, 2006, now Pat. No. 8,290,313, and a continuation-in-part of application No. 11/114,245, filed on Apr. 25, 2005, now Pat. No. 8,229,252, and a continuation-in-part of application No. 11/097,977, filed on Mar. 31, 2005, now Pat. No. 8,640,959, and a continuation-in-part of application No. 11/097,980, filed on Mar. 31, 2005, and a continuation-in-part of application No. 11/137,716, filed on May 25, 2005, now Pat. No. 8,102,383, and a continuation-in-part of application No. 11/137,694, filed on May 25, 2005, now Pat. No. 8,232,979, and a continuation-in-part of application No. 11/137,687, filed on May 25, 2005, now abandoned, and a continuation-in-part of application No. 11/167,072, filed on Jun. 24, 2005, and a continuation-in-part of application No. 11/166,780, filed on Jun. 24, 2005, now Pat. No. 7,791,593, and a continuation-in-part of application No. 11/166,035, filed on Jun. 24, 2005, now Pat. No. 7,760,191, and a continuation-in-part of application No. 11/167,058, filed on Jun. 24, 2005, now Pat. No. 7,672,512.

(56) References Cited

U.S. PATENT DOCUMENTS

| | | |
|---|---|---|
| 4,384,196 A | 5/1983 | McCumber et al. |
| 4,475,240 A | 10/1984 | Brogardh et al. |
| 4,495,646 A | 1/1985 | Gharachorloo |
| 4,523,235 A | 6/1985 | Rajchman |
| 4,685,142 A | 8/1987 | Ooi et al. |
| 4,703,511 A | 10/1987 | Conoval |
| 4,728,784 A | 3/1988 | Stewart |
| 4,746,937 A | 5/1988 | Realis et al. |
| 4,799,560 A | 1/1989 | Kobayashi |
| 4,829,431 A | 5/1989 | Ott et al. |
| 4,839,634 A | 6/1989 | More et al. |
| 4,864,618 A | 9/1989 | Wright et al. |
| D306,316 S | 2/1990 | Shintani |
| 4,927,766 A | 5/1990 | Auerbach et al. |
| 4,939,355 A | 7/1990 | Rando et al. |
| 5,022,086 A | 6/1991 | Crane et al. |
| 5,029,233 A | 7/1991 | Metroka |
| 5,064,280 A | 11/1991 | Ringens et al. |
| 5,109,439 A | 4/1992 | Froessl |
| 5,129,320 A | 7/1992 | Fadner |
| 5,215,397 A | 6/1993 | Taguchi et al. |
| 5,227,985 A | 7/1993 | DeMenthon |
| 5,250,804 A | 10/1993 | Chin |
| 5,303,312 A | 4/1994 | Comerford et al. |
| 5,311,207 A | 5/1994 | Kusumoto et al. |
| 5,325,444 A | 6/1994 | Cass et al. |
| 5,331,137 A | 7/1994 | Swartz |
| 5,339,412 A | 8/1994 | Fueki |
| 5,339,734 A | 8/1994 | Mustafa et al. |
| 5,369,714 A | 11/1994 | Withgott et al. |
| 5,434,371 A | 7/1995 | Brooks |
| 5,454,046 A | 9/1995 | Carman, II |
| 5,501,535 A | 3/1996 | Hastings et al. |
| 5,509,966 A | 4/1996 | Sykes |
| 5,513,278 A | 4/1996 | Hashizume et al. |
| 5,515,144 A | 5/1996 | Miyasaka et al. |
| 5,521,722 A | 5/1996 | Colvill et al. |
| 5,572,651 A | 11/1996 | Weber et al. |
| 5,606,609 A | 2/1997 | Houser et al. |
| 5,615,284 A | 3/1997 | Rhyne et al. |
| 5,659,639 A | 8/1997 | Mahoney et al. |
| 5,664,126 A | 9/1997 | Hirakawa et al. |
| 5,687,259 A | 11/1997 | Linford |
| 5,710,832 A | 1/1998 | Berman et al. |
| 5,729,618 A | 3/1998 | Fujisawa et al. |
| 5,740,271 A | 4/1998 | Kunkler et al. |
| 5,754,434 A | 5/1998 | Delfer et al. |
| 5,758,574 A | 6/1998 | Bernardo et al. |
| 5,767,496 A | 6/1998 | Swartz et al. |
| 5,779,482 A | 7/1998 | Fukumoto |
| 5,793,397 A | 8/1998 | Barker et al. |
| 5,823,572 A | 10/1998 | NakaMats |
| 5,823,691 A | 10/1998 | Langner |
| 5,828,783 A | 10/1998 | Ishigaki |
| 5,861,754 A | 1/1999 | Garland et al. |
| 5,862,260 A | 1/1999 | Rhoads |
| 5,864,635 A | 1/1999 | Zetts et al. |
| 5,880,451 A | 3/1999 | Smith et al. |
| 5,889,888 A | 3/1999 | Marianetti, II et al. |
| 5,903,667 A | 5/1999 | Kuzunuki et al. |
| 5,918,223 A | 6/1999 | Blum et al. |
| 5,970,455 A | 10/1999 | Wilcox et al. |
| 5,974,204 A | 10/1999 | Lin et al. |
| 5,978,523 A | 11/1999 | Linford et al. |
| 5,981,884 A | 11/1999 | Sato et al. |
| 5,999,666 A | 12/1999 | Gobeli et al. |
| 6,004,048 A | 12/1999 | Moh et al. |
| 6,005,945 A | 12/1999 | Whitehouse |
| 6,031,936 A | 2/2000 | Nakamura |
| 6,044,165 A | 3/2000 | Perona et al. |
| 6,050,490 A | 4/2000 | Leichner et al. |
| 6,055,332 A | 4/2000 | Aitani et al. |
| 6,070,805 A | 6/2000 | Kaufman et al. |
| 6,091,546 A | 7/2000 | Spitzer |
| 6,104,388 A | 8/2000 | Nagai et al. |
| 6,122,042 A | 9/2000 | Wunderman et al. |
| 6,128,414 A | 10/2000 | Liu |
| 6,131,162 A | 10/2000 | Yoshiura et al. |
| 6,178,403 B1 | 1/2001 | Detlef |
| 6,181,836 B1 | 1/2001 | Delean |
| 6,188,789 B1 | 2/2001 | Marianetti, II et al. |
| 6,195,053 B1 | 2/2001 | Kodukula et al. |
| 6,246,382 B1 | 6/2001 | Maguire, Jr. |
| 6,259,043 B1 | 7/2001 | Clary et al. |
| 6,262,804 B1 | 7/2001 | Friend et al. |
| 6,308,991 B1 | 10/2001 | Royer |
| 6,310,615 B1 | 10/2001 | Davis et al. |
| 6,348,914 B1 | 2/2002 | Tuli |
| 6,376,783 B1 | 4/2002 | Vaghi |
| 6,377,249 B1 | 4/2002 | Mumford |
| 6,395,234 B1 | 5/2002 | Hunnell et al. |
| 6,405,929 B1 | 6/2002 | Ehrhart et al. |
| 6,408,092 B1 | 6/2002 | Sites |
| 6,421,453 B1 | 7/2002 | Kanevsky et al. |
| 6,446,208 B1 | 9/2002 | Gujar et al. |
| 6,454,482 B1 | 9/2002 | Silverbrook et al. |
| 6,456,740 B1 | 9/2002 | Carini et al. |
| 6,486,874 B1 | 11/2002 | Muthuswamy et al. |
| 6,502,912 B1 | 1/2003 | Bernard et al. |
| 6,509,893 B1 | 1/2003 | Akhlagi et al. |
| 6,525,716 B1 | 2/2003 | Makino |
| 5,634,730 C1 | 3/2003 | Bobry |
| 6,529,920 B1 | 3/2003 | Arons et al. |
| 6,550,685 B1 | 4/2003 | Kindberg |
| 6,594,406 B1 | 7/2003 | Hecht |
| 6,598,800 B1 | 7/2003 | Schmit et al. |
| 6,603,464 B1 | 8/2003 | Rabin |
| 6,619,550 B1 | 9/2003 | Good et al. |
| 6,649,849 B2 | 11/2003 | Bass et al. |
| 6,654,496 B1 | 11/2003 | Goldberg |
| 6,666,376 B1 | 12/2003 | Ericson |

(56) References Cited

U.S. PATENT DOCUMENTS

| | | |
|---|---|---|
| 6,686,579 B2 | 2/2004 | Fagin et al. |
| 6,686,910 B2 | 2/2004 | O'Donnell, Jr. |
| 6,703,570 B1 | 3/2004 | Russell et al. |
| 6,715,687 B2 | 4/2004 | Berson |
| 6,752,316 B2 | 6/2004 | Mizoguchi |
| 6,788,815 B2 | 9/2004 | Lui et al. |
| 6,791,537 B1 | 9/2004 | Shim et al. |
| 6,798,403 B2 | 9/2004 | Kitada et al. |
| 6,806,867 B1 | 10/2004 | Arruda et al. |
| 6,808,330 B1 * | 10/2004 | Lapstun et al. ............... 401/45 |
| 6,816,870 B1 | 11/2004 | Nishimura et al. |
| 6,836,555 B2 | 12/2004 | Ericson et al. |
| 6,839,453 B1 | 1/2005 | McWilliam et al. |
| 6,839,464 B2 | 1/2005 | Hawkins et al. |
| 6,847,336 B1 | 1/2005 | Lemelson et al. |
| 6,859,909 B1 | 2/2005 | Lerner et al. |
| 6,864,880 B2 | 3/2005 | Hugosson et al. |
| 6,885,759 B2 | 4/2005 | Cox et al. |
| 6,897,853 B2 | 5/2005 | Keely et al. |
| 6,917,722 B1 | 7/2005 | Bloomfield |
| 6,921,223 B2 | 7/2005 | Marschand |
| 6,925,565 B2 | 8/2005 | Black |
| 6,931,153 B2 | 8/2005 | Nakao et al. |
| 6,940,617 B2 | 9/2005 | Ma et al. |
| RE38,884 E | 11/2005 | Kakii |
| 6,965,682 B1 | 11/2005 | Davis et al. |
| 6,980,704 B2 | 12/2005 | Kia et al. |
| 6,982,808 B1 | 1/2006 | Ogg et al. |
| 6,991,164 B2 | 1/2006 | Lemelson et al. |
| 6,992,655 B2 | 1/2006 | Ericson et al. |
| 7,002,712 B2 | 2/2006 | Barker et al. |
| 7,015,950 B1 | 3/2006 | Pryor |
| 7,043,056 B2 | 5/2006 | Edwards et al. |
| 7,047,419 B2 | 5/2006 | Black |
| 7,072,493 B2 | 7/2006 | Venkatesan et al. |
| 7,082,213 B2 | 7/2006 | Black |
| 7,092,934 B1 | 8/2006 | Mahan et al. |
| 7,094,977 B2 | 8/2006 | Ericson et al. |
| 7,097,275 B2 | 8/2006 | Murcia et al. |
| 7,098,898 B2 | 8/2006 | Hattori et al. |
| 7,104,636 B2 | 9/2006 | Davis et al. |
| 7,120,320 B2 | 10/2006 | Petterson et al. |
| 7,158,678 B2 | 1/2007 | Nagel et al. |
| 7,167,164 B2 | 1/2007 | Ericson et al. |
| 7,176,896 B1 | 2/2007 | Fahraeus et al. |
| 7,197,174 B1 | 3/2007 | Koizumi |
| 7,198,195 B2 | 4/2007 | Bobba et al. |
| 7,203,384 B2 | 4/2007 | Carl |
| 7,239,747 B2 | 7/2007 | Bresler et al. |
| 7,262,764 B2 | 8/2007 | Wang et al. |
| 7,289,105 B2 | 10/2007 | Dort |
| 7,289,110 B2 | 10/2007 | Hansson |
| 7,289,643 B2 | 10/2007 | Brunk et al. |
| 7,295,193 B2 | 11/2007 | Fahraeus |
| D558,166 S | 12/2007 | Black |
| 7,319,799 B2 | 1/2008 | Berche et al. |
| 7,322,526 B1 | 1/2008 | Koenck et al. |
| 7,328,995 B2 | 2/2008 | Campagna et al. |
| 7,341,456 B2 | 3/2008 | McAdams et al. |
| 7,345,673 B2 | 3/2008 | Ericson et al. |
| 7,353,453 B1 | 4/2008 | Simmons |
| 7,360,706 B2 | 4/2008 | Zhu et al. |
| 7,363,505 B2 | 4/2008 | Black |
| 7,369,677 B2 | 5/2008 | Petrovic et al. |
| 7,376,630 B2 | 5/2008 | Blair et al. |
| 7,408,536 B2 | 8/2008 | Hugosson et al. |
| 7,433,499 B2 | 10/2008 | Kim |
| 7,447,537 B1 | 11/2008 | Funda et al. |
| 7,456,820 B1 | 11/2008 | Lapstun et al. |
| 7,545,951 B2 | 6/2009 | Davis et al. |
| 7,609,410 B2 | 10/2009 | Lapstun et al. |
| 7,639,898 B1 | 12/2009 | Chan |
| 7,649,659 B2 | 1/2010 | Nabemoto et al. |
| 7,780,087 B2 | 8/2010 | Bobba et al. |
| 7,786,984 B2 | 8/2010 | Burdsall et al. |
| 7,793,233 B1 | 9/2010 | Sellers et al. |
| 7,965,864 B2 | 6/2011 | Davis et al. |
| 7,991,206 B1 | 8/2011 | Kaminski, Jr. |
| 8,130,951 B2 | 3/2012 | Tian |
| 8,290,313 B2 | 10/2012 | Cohen et al. |
| 2001/0035861 A1 | 11/2001 | Ericson et al. |
| 2001/0044858 A1 | 11/2001 | Rekimoto |
| 2001/0053978 A1 | 12/2001 | Lewis et al. |
| 2002/0003726 A1 | 1/2002 | Hattori et al. |
| 2002/0012134 A1 | 1/2002 | Calaway |
| 2002/0031243 A1 | 3/2002 | Schiller et al. |
| 2002/0040817 A1 | 4/2002 | LeKuch et al. |
| 2002/0044134 A1 | 4/2002 | Ericson et al. |
| 2002/0044152 A1 | 4/2002 | Abbott, III et al. |
| 2002/0044689 A1 | 4/2002 | Roustaei et al. |
| 2002/0057940 A1 | 5/2002 | Kaufmann |
| 2002/0064308 A1 | 5/2002 | Altman et al. |
| 2002/0079371 A1 | 6/2002 | Bobrow et al. |
| 2002/0085843 A1 | 7/2002 | Mann |
| 2002/0105484 A1 | 8/2002 | Navab et al. |
| 2002/0107885 A1 | 8/2002 | Brooks et al. |
| 2002/0126105 A1 | 9/2002 | O'Donnell, Jr. |
| 2002/0126872 A1 | 9/2002 | Brunk et al. |
| 2002/0143994 A1 | 10/2002 | Sun et al. |
| 2002/0156902 A1 | 10/2002 | Crandall |
| 2002/0183890 A1 | 12/2002 | Bass et al. |
| 2002/0196978 A1 | 12/2002 | Hawkins et al. |
| 2003/0001020 A1 | 1/2003 | Kardach |
| 2003/0001950 A1 | 1/2003 | Eriksson |
| 2003/0024375 A1 | 2/2003 | Sitrick |
| 2003/0025321 A1 * | 2/2003 | Lee ............................ 283/82 |
| 2003/0034897 A1 | 2/2003 | Shamoon et al. |
| 2003/0043266 A1 | 3/2003 | Yoshikawa et al. |
| 2003/0046256 A1 | 3/2003 | Hugosson et al. |
| 2003/0048948 A1 | 3/2003 | Confer et al. |
| 2003/0051362 A1 | 3/2003 | Buckman et al. |
| 2003/0065805 A1 | 4/2003 | Barnes, Jr. |
| 2003/0066691 A1 | 4/2003 | Jelinek et al. |
| 2003/0070139 A1 | 4/2003 | Marshall et al. |
| 2003/0080948 A1 | 5/2003 | Lapstun et al. |
| 2003/0081038 A1 | 5/2003 | Valero |
| 2003/0090734 A1 | 5/2003 | Lapstun et al. |
| 2003/0099398 A1 | 5/2003 | Izumi |
| 2003/0101072 A1 | 5/2003 | Dick et al. |
| 2003/0106019 A1 | 6/2003 | Silverbrook et al. |
| 2003/0115470 A1 | 6/2003 | Cousins et al. |
| 2003/0144034 A1 | 7/2003 | Hack et al. |
| 2003/0146286 A1 * | 8/2003 | Berson ....................... 235/487 |
| 2003/0148539 A1 | 8/2003 | van Dam et al. |
| 2003/0151596 A1 | 8/2003 | Moyne et al. |
| 2003/0184649 A1 | 10/2003 | Mann |
| 2003/0185444 A1 | 10/2003 | Honda |
| 2003/0187458 A1 | 10/2003 | Carlson, II |
| 2003/0193544 A1 | 10/2003 | Eguchi |
| 2003/0218070 A1 | 11/2003 | Tsikos et al. |
| 2004/0002926 A1 | 1/2004 | Coffy et al. |
| 2004/0005915 A1 | 1/2004 | Hunter |
| 2004/0013454 A1 | 1/2004 | Manduley |
| 2004/0023024 A1 | 2/2004 | Landberg et al. |
| 2004/0035936 A1 | 2/2004 | Hoson et al. |
| 2004/0036699 A1 | 2/2004 | Nettamo |
| 2004/0037463 A1 | 2/2004 | Calhoun et al. |
| 2004/0070573 A1 | 4/2004 | Graham |
| 2004/0070823 A1 | 4/2004 | Radna |
| 2004/0078215 A1 | 4/2004 | Dahlin et al. |
| 2004/0083369 A1 | 4/2004 | Erlingsson et al. |
| 2004/0085301 A1 | 5/2004 | Furukawa et al. |
| 2004/0085358 A1 | 5/2004 | Tolmer et al. |
| 2004/0093330 A1 | 5/2004 | Westphal |
| 2004/0101178 A1 | 5/2004 | Fedorovskaya et al. |
| 2004/0103111 A1 | 5/2004 | Miller et al. |
| 2004/0108381 A1 | 6/2004 | Elliott et al. |
| 2004/0120404 A1 | 6/2004 | Sugahara et al. |
| 2004/0130614 A1 | 7/2004 | Valliath et al. |
| 2004/0131252 A1 | 7/2004 | Seto |
| 2004/0133189 A1 | 7/2004 | Sakurai |
| 2004/0134690 A1 | 7/2004 | Norris, Jr. et al. |
| 2004/0135776 A1 | 7/2004 | Brouhon |
| 2004/0140965 A1 | 7/2004 | Wang et al. |

(56) References Cited

U.S. PATENT DOCUMENTS

| | | |
|---|---|---|
| 2004/0164970 A1 | 8/2004 | Benard et al. |
| 2004/0182925 A1 | 9/2004 | Anderson et al. |
| 2004/0193697 A1 | 9/2004 | Grosvenor et al. |
| 2004/0210444 A1 | 10/2004 | Arenburg et al. |
| 2004/0212848 A1 | 10/2004 | Lapstun et al. |
| 2004/0218738 A1 | 11/2004 | Arai et al. |
| 2004/0225282 A1 | 11/2004 | Ness |
| 2004/0230600 A1 | 11/2004 | Devore, Jr. et al. |
| 2004/0236244 A1 | 11/2004 | Allen et al. |
| 2004/0236315 A1 | 11/2004 | Hered |
| 2004/0241424 A1 | 12/2004 | Barbera-Guillem |
| 2004/0252888 A1 | 12/2004 | Bargeron et al. |
| 2005/0013104 A1 | 1/2005 | Feague et al. |
| 2005/0024346 A1 | 2/2005 | Dupraz et al. |
| 2005/0033724 A1 | 2/2005 | Antognini et al. |
| 2005/0041100 A1 | 2/2005 | Maguire, Jr. |
| 2005/0052434 A1 | 3/2005 | Kolmykov-Zotov et al. |
| 2005/0060644 A1 | 3/2005 | Patterson |
| 2005/0064503 A1 | 3/2005 | Lapstun et al. |
| 2005/0083516 A1 | 4/2005 | Baker |
| 2005/0093845 A1 | 5/2005 | Brooks et al. |
| 2005/0105781 A1 | 5/2005 | Sakamoto et al. |
| 2005/0125741 A1 | 6/2005 | Clow et al. |
| 2005/0138541 A1 | 6/2005 | Euchner et al. |
| 2005/0147300 A1 | 7/2005 | Dresevic et al. |
| 2005/0148828 A1 | 7/2005 | Lindsay |
| 2005/0149726 A1 | 7/2005 | Joshi et al. |
| 2005/0152602 A1 | 7/2005 | Chen et al. |
| 2005/0190894 A1 | 9/2005 | Fukunaga et al. |
| 2005/0194444 A1 | 9/2005 | Gieske |
| 2005/0199724 A1 | 9/2005 | Lubow |
| 2005/0202844 A1 | 9/2005 | Jabri et al. |
| 2005/0206583 A1 | 9/2005 | Lemelson et al. |
| 2005/0231482 A1 | 10/2005 | Theytaz et al. |
| 2005/0246337 A1 | 11/2005 | Forman et al. |
| 2005/0251397 A1 | 11/2005 | Zanovitch et al. |
| 2005/0286743 A1 | 12/2005 | Kurzweil et al. |
| 2005/0286771 A1 | 12/2005 | Bishop et al. |
| 2006/0001667 A1 | 1/2006 | La Viola, Jr. et al. |
| 2006/0018546 A1 | 1/2006 | Lagardere et al. |
| 2006/0033784 A1 | 2/2006 | Keenan et al. |
| 2006/0036557 A1 | 2/2006 | Mattern |
| 2006/0045308 A1 | 3/2006 | Abrams et al. |
| 2006/0066591 A1 | 3/2006 | Marggraff et al. |
| 2006/0067572 A1 | 3/2006 | White et al. |
| 2006/0078866 A1 | 4/2006 | Marggraff et al. |
| 2006/0086811 A1 | 4/2006 | Yoshida et al. |
| 2006/0109237 A1 | 5/2006 | Morita et al. |
| 2006/0109238 A1 | 5/2006 | Lau et al. |
| 2006/0120559 A1 | 6/2006 | Levy |
| 2006/0138211 A1 | 6/2006 | Lubow |
| 2006/0149296 A1 | 7/2006 | Stanners |
| 2006/0149549 A1 | 7/2006 | Napper |
| 2006/0155589 A1 | 7/2006 | Lane et al. |
| 2006/0159345 A1 | 7/2006 | Clary et al. |
| 2006/0161992 A1 | 7/2006 | Kempf |
| 2006/0178902 A1 | 8/2006 | Vicars et al. |
| 2006/0197750 A1* | 9/2006 | Kerr et al. ............ 345/173 |
| 2006/0208085 A1 | 9/2006 | Cohen et al. |
| 2006/0209051 A1 | 9/2006 | Cohen et al. |
| 2006/0210172 A1 | 9/2006 | Sutanto et al. |
| 2006/0219776 A1 | 10/2006 | Finn |
| 2006/0238877 A1 | 10/2006 | Ashkenazi et al. |
| 2006/0239503 A1 | 10/2006 | Petrovic et al. |
| 2006/0267965 A1 | 11/2006 | Clary |
| 2006/0275068 A1 | 12/2006 | Breton |
| 2006/0283962 A1 | 12/2006 | Silverstein |
| 2006/0285147 A1 | 12/2006 | Wolfman et al. |
| 2007/0046649 A1 | 3/2007 | Reiner |
| 2007/0178432 A1 | 8/2007 | Davis et al. |
| 2007/0184422 A1 | 8/2007 | Takahashi |
| 2007/0220494 A1 | 9/2007 | Spooner |
| 2007/0253614 A1 | 11/2007 | Jung et al. |
| 2007/0273674 A1 | 11/2007 | Cohen et al. |
| 2007/0273918 A1 | 11/2007 | Gonzalez |
| 2007/0276558 A1* | 11/2007 | Kim ............................. 701/23 |
| 2007/0286486 A1 | 12/2007 | Goldstein |
| 2008/0088606 A1 | 4/2008 | Cohen et al. |
| 2008/0088607 A1 | 4/2008 | Sandstrom et al. |
| 2008/0141117 A1 | 6/2008 | King et al. |
| 2009/0098925 A1 | 4/2009 | Gagner et al. |

OTHER PUBLICATIONS

"Pen-One, Inc. Selects Award Winning P9 Design to Develop New Fingerprint Sensing Pen"; Breaking News Jul. 27, 2004 10:00 AM Southfield, MI (For Release Jul. 27, 2004); pp. 1-2; printed on Dec. 13, 2006; bearing dates of 2001-2004; located at http://pen-one.com/html/biometric_P9_news_072604.htm; Pen One.

"Pen-One, Inc. to Unveil Connaitre Biometric Pen at CARTES Worldwide Card and Security Conference"; Breaking News Oct. 20, 2004 Southfield, MI (For Release Oct. 22, 2004); pp. 1-2; printed on Dec. 13, 2006; bearing dates of 2001-2004; located at http://pen-one.com/html/connaitre_news_102004.htm; Pen One.

"Pen-One News Releases Worldwide Pen-One in the News . . . "; pp. 1-2; printed on Dec. 13, 2006; bearing dates of 2001-2004; located at http://pen-one.com/html/Pen-One_in_the_news.htm; Pen One.

"The World's First Fingerprint Sensing Pen! Pen One in the news . . . "; pp. 1-2; printed on Dec. 13, 2006; bearing dates of 2001-2004; located at http://pen-one.com/index.html; Pen One.

"World's First Use of Fraud Resistant Fingerprint Scanning Biometric Pen"; May 6, 2004; pp. 1-2 ; printed on Dec. 13, 2006; bearing dates of 2001-2004; located at http://pen-one.com/html/biometric_news_050604.html; Pen One.

"Alert dialog box"; Wikipedia; pp. 1-2; bearing date Jun. 21, 2006; printed on Jul. 12, 2006; located at http://en.wikipedia.org/wiki/Alert_dialog_box; Wikimedia Foundation, Inc.

"API"; Computer Desktop Encyclopedia; bearing dates of 1981-2005 and 2005; pp. 1-3; Ver. 18.4, 4$^{th}$ Quarter; printed on Jul. 31, 2006; The Computer Language Company Inc.

"Atomic spectroscopy"; Wikipedia; pp. 1-3; bearing date Jun. 9, 2006; printed on Oct. 3, 2006; located at http://en.wikipedia.org/wiki/Atomic_spectroscopy; Wikimedia.Foundation, Inc.

"Dialog box"; Wikipedia; pp. 1-2; bearing date Jun. 25, 2006; printed on Jul. 12, 2006; located at http://en.wikipedia.org/wiki/Dialog_box; Wikimedia Foundation, Inc.

"Dialog box"; Computer Desktop Encyclopedia; pp. 1; bearing dates of 1981-2005; printed on Jul. 12, 2006; the Computer Language Company Inc.; Ver. 18.4, 4$^{th}$ Quarter 2005.

"Dialog box"; Webopedia; bearing dates of Dec. 4, 2002 and 2006; pp. 1-3; printed on Jul. 12, 2006; located at http://webopedia.com/TERM/D/dialog_box.html; Jupitermedia Corporation.

"Digital watermark"; Computer Desktop Encyclopedia; pp. 1; bearing dates of 1981-2005; printed on Jul. 12, 2006; the Computer Language Company Inc.; Ver. 18.4, 4$^{th}$ Quarter 2005.

"digital watermark"; Webopedia; bearing dates of Oct. 27, 2003 and 2006; pp. 1-3; printed on Aug. 22, 2006; located at http://webopedia.com/TERM/D/digital_watermark.html; Jupitermedia Corporation.

"Digital watermarking"; Wikipedia; pp. 1-2; bearing date Aug. 15, 2006; printed on Aug. 22, 2006; located at http://en.wikipedia.org/wiki/Digital_watermarking; Wikimedia Foundation, Inc.

Felten, Edward W.; Balfanz, Dirk; Dean, Drew; Wallach, Dan S.; "Web Spoofing an Internet Con Game"; Technical Report 540-96; pp. 1-9; printed on Jul. 14, 2006; located at http://bau2.uibk.ac.at/matic/spoofing.htm; Princeton University.

"GUI"; Computer Desktop Encyclopedia; bearing dates of 1981-2005 and 2005; pp. 1-3; Ver. 18.4, 4$^{th}$ Quarter; The Computer Language Company Inc.

He, Dajun; Sun, Qibin; Tian, Qi; "A Semi-Fragile Object Based Video Authentication System"; IEEE; bearing date 2003; pp. 814-817; Media Engineering.

"How does it work"; Norman: Antivirus | Firewall | Network security; pp. 1-2; printed on Aug. 2, 2006; located at http://www.norman.com/Virus/Sandbox/20374/en-us.

"Multiple Browsers Window Injection Vulnerability Test"; Secunia; pp. 1-2; printed on Jul. 14, 2006; located at http://secunia.com/multiple$_{browsers}$_window_injection_vulnerability_test/.

(56) References Cited

OTHER PUBLICATIONS

"Nanoparticle"; Wikipedia; pp. 1-2; bearing date Sep. 30, 2006; printed on Oct. 3, 2006; located at http://en.wikipedia.org/wiki/Nanoparticle; Wikimedia Foundation, Inc.

Netscape Communicator "'Window spoofing Security Bug'"; Netscape Communicator 4.5 window spoofing bug; pp. 1; printed on Jul. 14, 2006; located at http://www.guninski.com/b14.html.

"Norman SandBox Pro-active virus protection"; Norman; pp. 1-2; printed on Aug. 2, 2006; located at http://www.norman.com/.

"Norman's SandBox Technology Protects Against Latest Virus Outbreaks"; e-consultancy-Press Release; bearing a date of Jul. 28, 2004; pp. 1-2; printed on Aug. 2, 2006; located at http://www.e-consultancy.com/news-blog/156926/norman-s-sandbox-technology-protects-against-latest-virus-outbreaks.html.

"Norman Virus Control 5.8"; Free Downloads Center; pp. 1; printed on Aug. 2, 2006; located at http://www.freedownloadscenter.com/Utilities/Anti-Virus_Utilities/Norman_Virus_Control.html.

"Overview"; GreenBorder Technology; bearing a date of 2006; pp. 1; printed on Aug. 3, 2006; Green Border Technologies, Inc.; located at http://greenborder.com/technology/.

"Quantum dot"; Wikipedia; pp. 1-5; bearing date Sep. 30, 2006; printed on Oct. 3, 2006; located at http://en.wikipedia.org/wiki/Quantum_dot; Wikimedia Foundation, Inc.

"Shop, Bank and Surf the Internet—in Total Safety & Privacy"; GreenBorder; bearing a date of 2006; pp. 1; printed on Aug. 3, 2006; Green Border Technologies, Inc.; located at http://greenborder.com/consumer/.

"User Interface"; Human Machine Interface; bearing a date of 2005; pp. 1-4; Farlex, Inc.; printed on Aug. 7, 2006; located at http://encyclopedia.thefreedictionary.com/Human+Machine+Interface.

Vibber, Kelson; Foreman, Katherine; "Stealing pop-ups from your bank"; K-Squared Ramblings; bearing dates Dec. 8, 2004 and 2002-2006; pp. 1-2; printed on Jul. 14, 2006; located at http://www.hyperborea.org/journal/archives/2004/12/08/stealing-pop-ups-from-your-bank/; WordPress.

"window"; Computer Desktop Encyclopedia; bearing dates of 1981-2005 and 2005; pp. 1; Ver. 18.4, $4^{th}$ Quarter; printed on Aug. 7, 2006; The Computer Language Company Inc.

"Window (computing)"; Wikipedia; pp. 1-3; printed on Jul. 17, 2006; located at: http://en.wikipedia.org/wiki/Window_%28computing%29.

PCT International Search Report; International App. No. PCT/US 07/24232; Aug. 6, 2008; pp. 1-2.

Excerpts from the Oxford English Dictionary $2^{nd}$ Edition; bearing a date of 1989; printed on Apr. 1, 2009; pp. 1-4 and pp. 1-2.

"6 tips for adding international characters and symbols to your document, for Microsoft Office Word 2003, Microsoft Word 2000 and 2002"; Microsoft Office Online; Bearing a date of 2009; pp. 1-6; Microsoft Corporation; printed on Jun. 6, 2009; located at: http://office.microsoft.com/en-us/world/HA011268771033.aspx.

Definition of "tag"; Merriam Webster Online Dictionary; pp. 1-2; located at http://www.meriam-webster.com/dictionary/tag.

Shneiderman et al.; "Direct Annotation: A Drag-and-Drop Strategy for Labeling Photos"; bearing a date of 2000; pp. 88-95; © 2000 IEEE.

U.S. Appl. No. 12/924,991, Cohen et al.
U.S. Appl. No. 12/806,115, Cohen et al.
U.S. Appl. No. 12/806,112, Cohen et al.
U.S. Appl. No. 12/806,054, Cohen et al.
U.S. Appl. No. 13/135,206, Cohen et al.
U.S. Appl. No. 13/007,982, Cohen et al.

Calhoun et al.; "Recognizing Multi-Stroke Symbols"; AAAI Technical Report SS-02-08; bearing a date of 2002; 9 pages; AAAI.

Liang et al.; "Segmentation of Handwritten Interference Marks Using Multiple Directional Stroke Planes and Reformalized Morphological Approach"; IEEE Transactyions on Image Processing; Aug. 1997; pp. 1195-1202; vol. 6, No. 8; IEEE.

Stevenson et al.; "Combining Weak Knowledge Sources for Sense Disambiguztion"; Natural Language Processing; bearing a date of 1999 ; pp. 884-889.

\* cited by examiner

INCLUDING ENVIRONMENTAL INFORMATION IN A MANUAL EXPRESSION

RELATED APPLICATIONS

The present application is related to the following listed applications (Related Applications):

For purposes of the USPTO extra-statutory requirements, the present application constitutes a continuation-in-part of United States patent application entitled CONTEXTUAL INFORMATION ENCODED IN A FORMED EXPRESSION, naming Alexander J. Cohen, B. Isaac Cohen, Ed Harlow, Eric C. Leuthardt, Royce A. Levien, and Mark A. Malamud as inventors, U.S. application Ser. No. 11/603,332, filed Nov. 20, 2006 and issued as U.S. Pat. No. 7,809,215 on Oct. 5, 2010.

For purposes of the USPTO extra-statutory requirements, the present application constitutes a continuation-in-part of United States patent application entitled INCLUDING CONTEXTUAL INFORMATION WITH A FORMED EXPRESSION, naming Alexander J. Cohen, B. Isaac Cohen, Ed Harlow, Eric C. Leuthardt, Royce A. Levien, and Mark A. Malamud as inventors, U.S. application Ser. No. 11/603,289, filed Nov. 20, 2006 and issued as U.S. Pat. No. 7,826,687 on Nov. 2, 2010.

For purposes of the USPTO extra-statutory requirements, the present application constitutes a continuation-in-part of United States patent application entitled DECODING DIGITAL INFORMATION INCLUDED IN A HAND-FORMED EXPRESSION, naming Alexander J. Cohen, B. Isaac Cohen, Ed Harlow, Eric C. Leuthardt, Royce A. Levien, and Mark A. Malamud as inventors, U.S. application Ser. No. 11/603,333, filed Nov. 20, 2006 and issued as U.S. Pat. No. 7,873,243 on Jan. 18, 2011.

For purposes of the USPTO extra-statutory requirements, the present application constitutes a continuation-in-part of United States patent application entitled VERIFYING A WRITTEN EXPRESSION, naming Alexander J. Cohen, B. Isaac Cohen, Ed Harlow, Eric C. Leuthardt, Royce A. Levien, and Mark A. Malamud as inventors, U.S. application Ser. No. 11/603,275, filed Nov. 20, 2006.

For purposes of the USPTO extra-statutory requirements, the present application constitutes a continuation-in-part of United States patent application entitled INFORMATION ENCODED IN AN EXPRESSION, naming Alexander J. Cohen, B. Isaac Cohen, Ed Harlow, Eric C. Leuthardt, Royce A. Levien, and Mark A. Malamud as inventors, U.S. application Ser. No. 11/603,336, filed Nov. 20, 2006 and issued as U.S. Pat. No. 7,813,597 on Oct. 12, 2010.

For purposes of the USPTO extra-statutory requirements, the present application constitutes a continuation-in-part of United States patent application entitled ELECTRONIC ACQUISITION OF A HAND FORMED EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/083,567, filed Mar. 18, 2005 now U.S. Pat. No. 8,340,476.

For purposes of the USPTO extra-statutory requirements, the present application constitutes a continuation-in-part of United States patent application entitled ELECTRONIC ACQUISITION OF A HAND FORMED EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/580,217, filed Oct. 11, 2006 now U.S. Pat. No. 8,244,074.

For purposes of the USPTO extra-statutory requirements, the present application constitutes a continuation-in-part of United States patent application entitled ELECTRONIC ACQUISITION OF A HAND FORMED EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/580,218, filed Oct. 11, 2006 now U.S. Pat. No. 8,290,313.

For purposes of the USPTO extra-statutory requirements, the present application constitutes a continuation-in-part of United States patent application entitled ELECTRONIC ASSOCIATION OF A USER EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/114,245, filed Apr. 25, 2005 now U.S. Pat. No. 8,229,252.

For purposes of the USPTO extra-statutory requirements, the present application constitutes a continuation-in-part of United States patent application entitled ACQUISITION OF A USER EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/097,977, filed Mar. 31, 2005 now U.S. Pat. No. 8,640,959.

For purposes of the USPTO extra-statutory requirements, the present application constitutes a continuation-in-part of United States patent application entitled ACQUISITION OF A USER EXPRESSION AND AN ENVIRONMENT OF THE EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/097,980, filed Mar. 31, 2005.

For purposes of the USPTO extra-statutory requirements, the present application constitutes a continuation-in-part of United States patent application entitled PERFORMING AN ACTION WITH RESPECT TO A HAND-FORMED EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/137,716, filed May 25, 2005 now U.S. Pat. No. 8,102,383.

For purposes of the USPTO extra-statutory requirements, the present application constitutes a continuation-in-part of United States patent application entitled PERFORMING AN ACTION WITH RESPECT TO A HAND-FORMED EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/137,694, filed May 25, 2005 now U.S. Pat. No. 8,232,979.

For purposes of the USPTO extra-statutory requirements, the present application constitutes a continuation-in-part of United States patent application entitled OUTPUTTING A SAVED HAND-FORMED EXPRESSION, naming Alexander J. Cohen, Edward K. Y. Jung, Royce A. Levien, Robert W. Lord, Mark A. Malamud, and John D. Rinaldo, Jr. as inventors, U.S. application Ser. No. 11/137,687, filed May 25, 2005 now abandoned.

For purposes of the USPTO extra-statutory requirements, the present application constitutes a continuation-in-part of United States patent application entitled ARTICLE HAVING A WRITING PORTION AND PREFORMED IDENTIFIERS, naming Alexander J. Cohen, Edward K. Y. Jung, Royce A. Levien, Robert W. Lord, Mark A. Malamud, and John D. Rinaldo, Jr. as inventors, U.S. application Ser. No. 11/167,072, filed Jun. 24, 2005.

For purposes of the USPTO extra-statutory requirements, the present application constitutes a continuation-in-part of United States patent application entitled MACHINE-DIFFERENTIATABLE IDENTIFIERS HAVING A COMMONLY ACCEPTED MEANING, naming Alexander J. Cohen, Edward K. Y. Jung, Royce A. Levien, Robert W. Lord, Mark A. Malamud, and John D. Rinaldo, Jr. as inventors, U.S. application Ser. No. 11/166,780, filed Jun. 24, 2005 now U.S. Pat. No. 7,791,593.

For purposes of the USPTO extra-statutory requirements, the present application constitutes a continuation-in-part of United States patent application entitled HANDWRITING REGIONS KEYED TO A DATA RECEPTOR, naming Alexander J. Cohen, Edward K. Y. Jung, Royce A. Levien, Robert W. Lord, Mark A. Malamud, and John D. Rinaldo, Jr. as inventors, U.S. application Ser. No. 11/166,035, filed Jun. 24, 2005 now U.S. Pat. No. 7,760,191.

For purposes of the USPTO extra-statutory requirements, the present application constitutes a continuation-in-part of United States patent application entitled FORMS FOR COMPLETION WITH AN ELECTRONIC WRITING DEVICE, naming Alexander J. Cohen, Edward K. Y. Jung, Royce A. Levien, Robert W. Lord, Mark A. Malamud, and John D. Rinaldo, Jr. as inventors, U.S. application Ser. No. 11/167,058, filed Jun. 24, 2005 now U.S. Pat. No. 7,672,512.

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a manual device operable in a context. The manual device includes a writing element operable to form a mark on a surface in response to a movement of the writing element with respect to the surface. The manual device also includes a controller operable to encode information corresponding to the context of the manual device by regulating the formation of the mark. In an alternative embodiment, the manual device includes a reservoir configured to contain a supply of a marking substance. In another alternative embodiment, the manual device includes a memory configurable by file that includes at least one instance of the context of the manual device and a code indicative of the context of the manual device. In a further embodiment, the manual device includes an image device operable to capture an aspect of the surface. In addition to the foregoing, other device embodiments are described in the claims, drawings, and text that form a part of the present application.

Another embodiment provides a manual device operable in a context. The manual device includes a body, and a writing instrument having an electronically driven printhead operable to discharge a marking substance on a surface in response to a movement of at least a portion of the body over the surface. The manual device also includes a sensor operable to acquire information corresponding to a context of the manual device. The manual device further includes a controller operable to encode the information corresponding to the context of the manual device by regulating a discharge of the marking substance from the electronically driven printhead. In an alternative embodiment, the manual device further includes a reservoir configured to contain a supply of the marking substance.

In another alternative embodiment, the manual device further includes a memory configurable by file that includes at least one instance of a context of the manual device and a code useable by the controller and corresponding to the context of the manual device. In a further alternative embodiment, the manual device further includes an imaging device operable to capture an aspect of the surface. In addition to the foregoing, other device embodiments are described in the claims, drawings, and text that form a part of the present application.

A further embodiment provides a method. The method includes acquiring information corresponding to a context of a manual device having a writing element. The method also includes marking a surface in response to a movement of the writing element with respect to the surface. The method further includes encoding information corresponding to a context of the manual device by regulating the marking of the surface. In addition to the foregoing, other method embodiments are described in the claims, drawings, and text that form a part of the present application.

An embodiment provides a manual device operable in a context. The manual device includes means for acquiring information corresponding to the context of the manual device having a writing element. The manual device also includes means for marking a surface in response to a movement of the writing element with respect to the surface. The manual device further includes means for encoding information corresponding to a context of the manual device by regulating the marking of the surface. In addition to the foregoing, other device embodiments are described in the claims, drawings, and text that form a part of the present application.

Another embodiment provides an apparatus. The apparatus includes a writing element having a first portion operable to discharge a first marking substance on a surface in response to a movement of the writing element over the surface and a second portion operable to discharge a second marking substance on the surface in response to a controller. The apparatus also includes the controller operable to encode information corresponding to a context of the apparatus by regulating the discharge of the second marking substance. In an alternative embodiment, the apparatus further includes a sensor operable to acquire the information corresponding to a context of the apparatus. In another alternative embodiment, the apparatus includes a sensor operable to acquire and transmit the information corresponding to a context of the apparatus. In a further alternative embodiment, the apparatus includes an imaging device operable to capture an aspect of the surface. In an alternative embodiment, the apparatus includes a reservoir configured to contain a supply at least one of the first marking substance and/or the second marking substance. In another alternative embodiment, the apparatus includes a memory configurable by file that includes at least one instance of a context and a code indicative of the context. In addition to the foregoing, other apparatus embodiments are described in the claims, drawings, and text that form a part of the present application.

A further embodiment provides a method. The method includes acquiring information corresponding to a context of a handheld writing device having at least two electronically driven printheads. The method also includes discharging a marking substance from a first electronically driven printhead of the at least two electronically driven printheads in response to a movement of the handheld writing device vis-à-vis a surface. The method further includes encoding the information corresponding to a context of the handheld writing device by regulating a discharge of a second marking substance from a second electronically driven printhead of the at least two electronically driven printheads. In addition to the foregoing, other method embodiments are described in the claims, drawings, and text that form a part of the present application.

An embodiment provides a handheld writing device operable in a context. The device includes means for acquiring information corresponding to a context of the handheld writing device having at least two electronically driven printheads. The handheld writing device also includes means for discharging a marking substance from a first electronically driven printhead of the at least two electronically driven printheads in response to a movement of the handheld writing device vis-à-vis a surface. The handheld writing device further includes means for encoding the information corresponding to a context of the handheld writing device by regulating the discharge of a second marking substance from a second electronically driven printhead of the at least two electronically driven printheads. In addition to the foregoing, other handheld writing device embodiments are described in the claims, drawings, and text that form a part of the present application.

Another embodiment provides a device. The device includes an imaging circuit operable to acquire digital information encoded in a hand-formed analog expression marked on a surface by a handheld writing device. The device also includes a translator circuit operable to decode the digital information. The device further includes a correlation circuit operable to generate a signal indicative of the decoded digital information. In an alternative embodiment, the device includes a display operable to broadcast a human viewable image corresponding to the digital information. In addition to the foregoing, other device embodiments are described in the claims, drawings, and text that form a part of the present application.

A further embodiment provides a device. The device includes an imaging circuit operable to acquire digital information encoded in a hand-formed expression formed on a surface by a handheld writing device. The digital information corresponding to an environment of the handheld writing device when the expression was formed on the surface. The device also includes a translator circuit operable to decode the digital information corresponding to an environment of the handheld writing device when the expression was formed on the surface. The device further includes a correlation circuit operable to generate a signal indicative of the environment of the handheld writing device when the expression was formed on the surface. In an alternative embodiment, the device includes a memory configurable by a file that includes at least one correlation between an instance of encoded digital information and an environment of the handheld marking device. In another alternative embodiment, the device includes a memory configurable by a file that includes at least one user established correlation between an instance of encoded digital information and an environment of the handheld marking device. In a further embodiment, the device includes a display operable to broadcast a human viewable image indicative of the environment of the handheld writing device when the expression was formed on the surface. In addition to the foregoing, other handheld writing device embodiments are described in the claims, drawings, and text that form a part of the present application.

An embodiment provides a method. The method includes acquiring information encoded in a track formed on a surface by a manual writing device, the encoded information corresponding to a context of the manual writing device proximate to when the substance was deposited. The method also includes interpreting the encoded information. The method further includes generating a signal indicative of the context of the manual writing device when the substance was deposited. In an alternative embodiment, the method includes broadcasting a human viewable image indicative of the context of the manual writing device when the substance was deposited. In addition to the foregoing, other method embodiments are described in the claims, drawings, and text that form a part of the present application.

Another embodiment provides a device. The device includes means for acquiring information encoded in a track formed on a surface by a manual writing device. The encoded information corresponding to a context of the manual writing device when the substance was deposited. The device also includes means for interpreting the encoded information. The device further includes means for generating a signal indicative of the context of the manual writing device when the substance was deposited. In an alternative embodiment, the device includes means for broadcasting a human viewable image indicative of the context of the manual writing device when the substance was deposited. In addition to the foregoing, other device embodiments are described in the claims, drawings, and text that form a part of the present application.

A further embodiment provides a system. The system includes a manual device that includes a writing element operable to discharge a marking substance on a surface in response to a movement of the writing element upon the surface. The system also includes a sensor operable to acquire information corresponding to an environment of the manual device. The system further includes a verification module operable to determine a correspondence between a first aspect of the environment of the manual device and a second aspect of the environment of the manual device. In an alternative embodiment, the system includes an electronic device that includes the sensor operable to acquire information corresponding to an environment of the manual device. In another alternative embodiment, the system includes a computing device that includes a storage device configurable by a file that includes data useful in a verification of the environment of the manual device. In a further alternative embodiment, the system includes a computing device that includes a storage device configurable by a file that includes data useful in a verification of the environment of the manual device and that is operable to wirelessly communicate with the manual device. In an alternative embodiment, the system includes a computing device that includes a storage device configurable by a file that includes data useful in a verification of the environment of the manual device and that includes the sensor operable to acquire information corresponding to the environment of the manual device. In addition to the foregoing, other system embodiments are described in the claims, drawings, and text that form a part of the present application.

An embodiment provides a method. The method includes acquiring information corresponding to an environment of a device having a marking element. The method also includes forming a mark on a surface corresponding to a manual movement of the marking element upon the surface. The method further includes determining a correspondence between first aspect of the environment of the device and a second aspect of the environment of the device. In an alternative embodiment, the method includes configuring a storage device in response to a file that includes data useful in verification of the environment of the manual device. In another embodiment, the method includes controlling the forming a mark on a surface corresponding to a manual movement of the marking element upon the surface at least partially in response to the determining a correspondence between a first aspect of the environment of the device and a second aspect of the environment of the device. In addition to the foregoing, other method embodiments are described in the claims, drawings, and text that form a part of the present application.

Another embodiment provides a device. The device includes means for acquiring information corresponding to an environment of the device. The device also includes means for forming a mark on a surface corresponding to a manual movement of the marking element upon the surface. The device further includes means for determining a correspondence between first aspect of the environment of the device and a second aspect of the environment of the device. In an alternative embodiment, the device includes means for configuring a storage device in response to a file that includes data useful in verification of the environment of the manual device.

A further embodiment provides a system. The system includes a manual device. The manual device includes a first writing element operable to discharge a first marking substance on a surface in response to a manual movement of the first writing element upon the surface. The manual device also includes a second writing element operable to discharge a second marking substance on the surface in response to a controller. The controller is operable to encode information corresponding to an environment of the manual device by regulating a discharge of the second marking substance. The system also includes a sensor operable to acquire data indicative of an environment of the manual device. In an alternative embodiment, the system includes an electronic device including the sensor operable to acquire data indicative of an environment of the manual device. In another alternative embodiment, the system includes an electronic device operable to wirelessly communicate with the manual device and including the sensor operable to acquire data indicative of an environment of the manual device. In a further embodiment, the system includes an electronic device including the sensor operable to acquire data indicative of an environment of the manual device and including a storage device configurable by a file that includes data useful in characterizing the environment of the manual device. In addition to the foregoing, other system embodiments are described in the claims, drawings, and text that form a part of the present application.

An embodiment provides a method. The method includes discharging a first marking substance from an electronic printhead of a device and onto a surface in response to a first manual movement of the device. The method also includes including information corresponding to an environment of the device by regulating the discharging of the first marking substance on the surface. The method further includes discharging a second marking substance from a writing element of the device and onto the surface in response to a second manual movement of the device. In a further embodiment the method includes acquiring data indicative of an environment of the manual device. In an alternative embodiment, the method further includes acquiring data indicative of an environment of the manual device.

Another embodiment provides a device. The device includes means for discharging from an electronic printhead of the device a first marking substance on a surface in response to a first manual movement of the device. The device also includes means for including information corresponding to an environment of the device by regulating the discharging of the first marking substance on the surface. The device further includes means for discharging from a writing element of the device a second marking substance on the surface in response to a second manual movement of the device. In an alternative embodiment, the device further includes means for acquiring data indicative of an environment of the manual device. In addition to the foregoing, other device embodiments are described in the claims, drawings, and text that form a part of the present application.

A further embodiment provides a device. The device includes a writing element operable to form a mark on a surface corresponding to a movement of the writing element over the surface. The device also includes a controller operable to digitally encode information in the mark. In addition to the foregoing, other device embodiments are described in the claims, drawings, and text that form a part of the present application.

An embodiment provides a method. The method includes forming a mark representing a first information on a surface. The method also includes regulating the formation of the mark to include a second information. In addition to the foregoing, other method embodiments are described in the claims, drawings, and text that form a part of the present application.

Another embodiment provides a device. The device includes means for forming a mark representing a first information on a surface corresponding to a movement of an electronic writing element over the surface. The device also includes means for regulating the formation of the mark to include a second information. In addition to the foregoing, other device embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
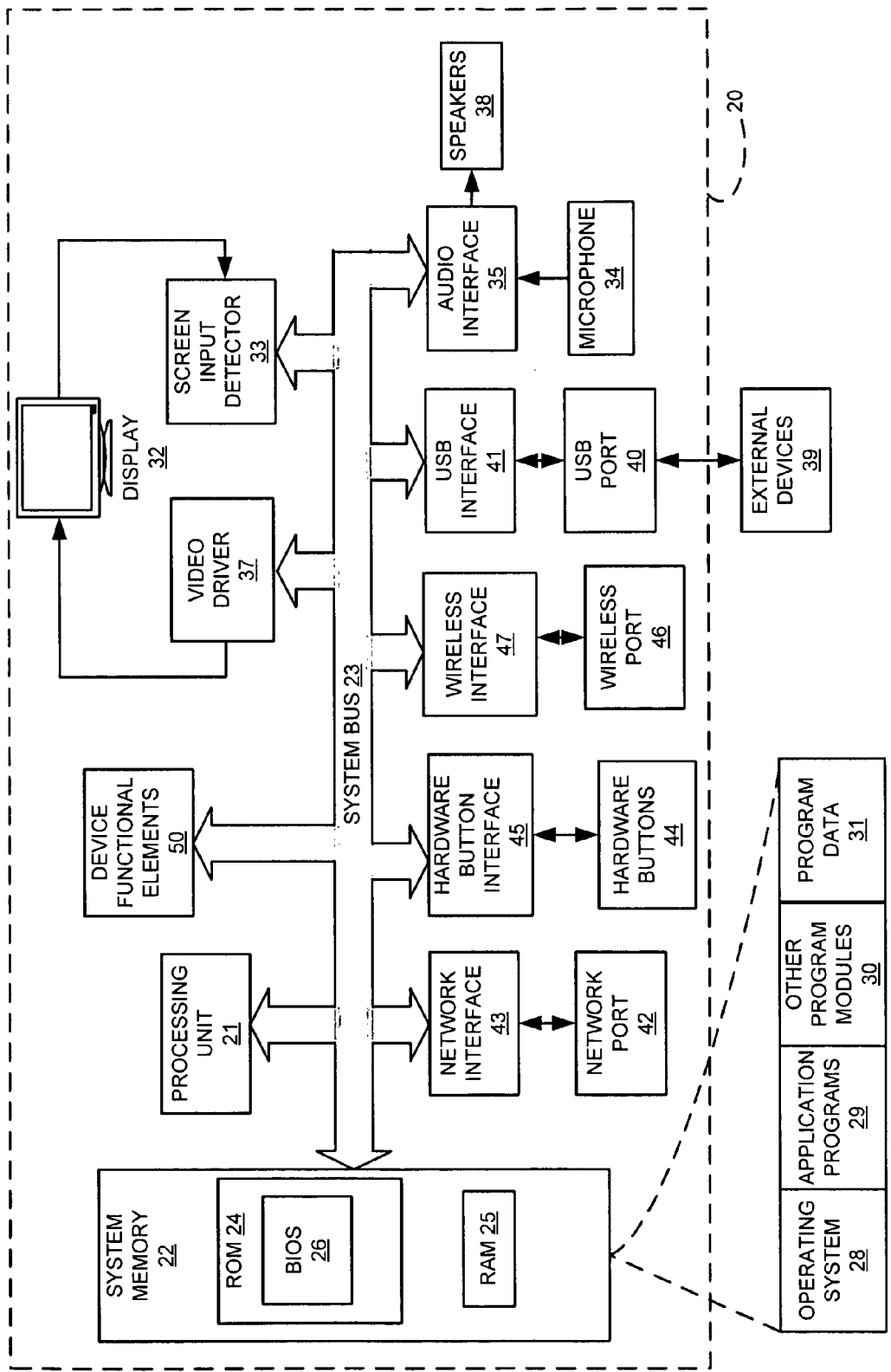
FIG. 1 illustrates an exemplary thin computing device in which embodiments may be implemented

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional element may typically perform a single well-defined task with little or no user configuration or setup, such as a refrigerator keeping food cold, a cell phone connecting with an appropriate tower and transceiving voice or data information, and a camera capturing and saving an image.

Figure 2:
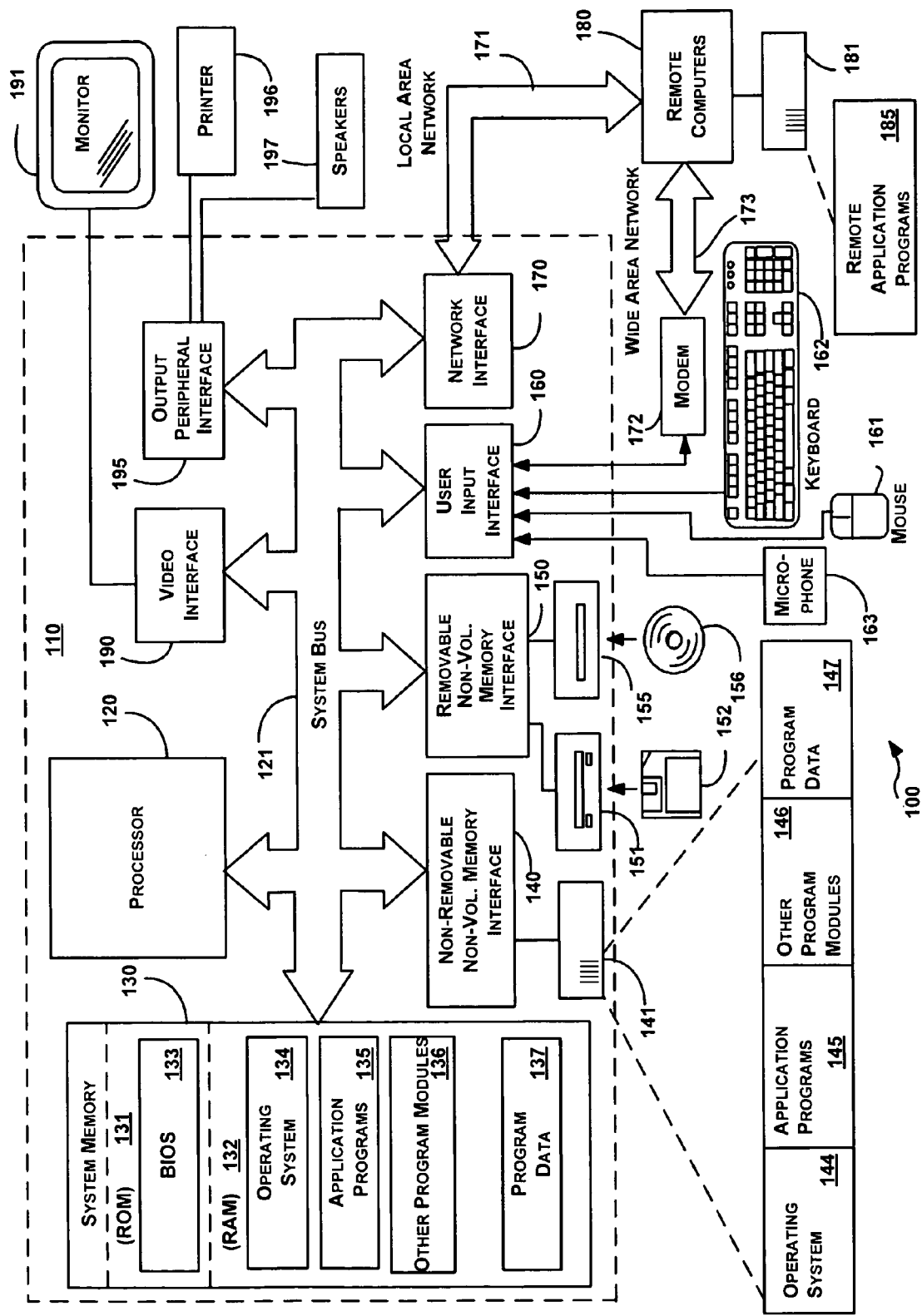
FIG. 2 illustrates an exemplary general-purpose computing system in which embodiments may be implemented.

FIG. 2 illustrates an exemplary general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art. In an embodiment, an information store may include a computer storage media. In a further embodiment, an information store may include a group of digital information storage devices. In another embodiment, an information store may include a quantum memory device.

The computing device 110 may also include other removable/non-removable, volatile/nonvolatile computer storage media products. By way of example only, FIG. 2 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing a communications link between the computers may be used.

FIGS. 1 and 2 are intended to provide a brief, general description of an illustrative and/or suitable exemplary environment in which embodiments may be implemented. An exemplary system may include the thin computing device 20 of FIG. 1 and/or the computing system environment 100 of FIG. 2. FIGS. 1 and 2 are examples of a suitable environment and is not intended to suggest any limitation as to the structure, scope of use, or functionality of an embodiment. A particular environment should not be interpreted as having any dependency or requirement relating to any one or combination of components illustrated in an exemplary environment. For example, in certain instances, one or more elements of an environment may be deemed not necessary and omitted. In other instances, one or more other elements may be deemed necessary and added. Further, it will be appreciated that device(s) and/or environment(s) described herein may include numerous electrical, mechanical, and/or digital components that may necessary to operate the device, but are not needed to illustrate the subject matter described herein. As such, some of these electrical, mechanical, and/or digital components may be omitted from the specification for clarity.

In the description that follows, certain embodiments may be described with reference to acts and symbolic representations of operations that are performed by one or more computing devices, such as the computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 3:
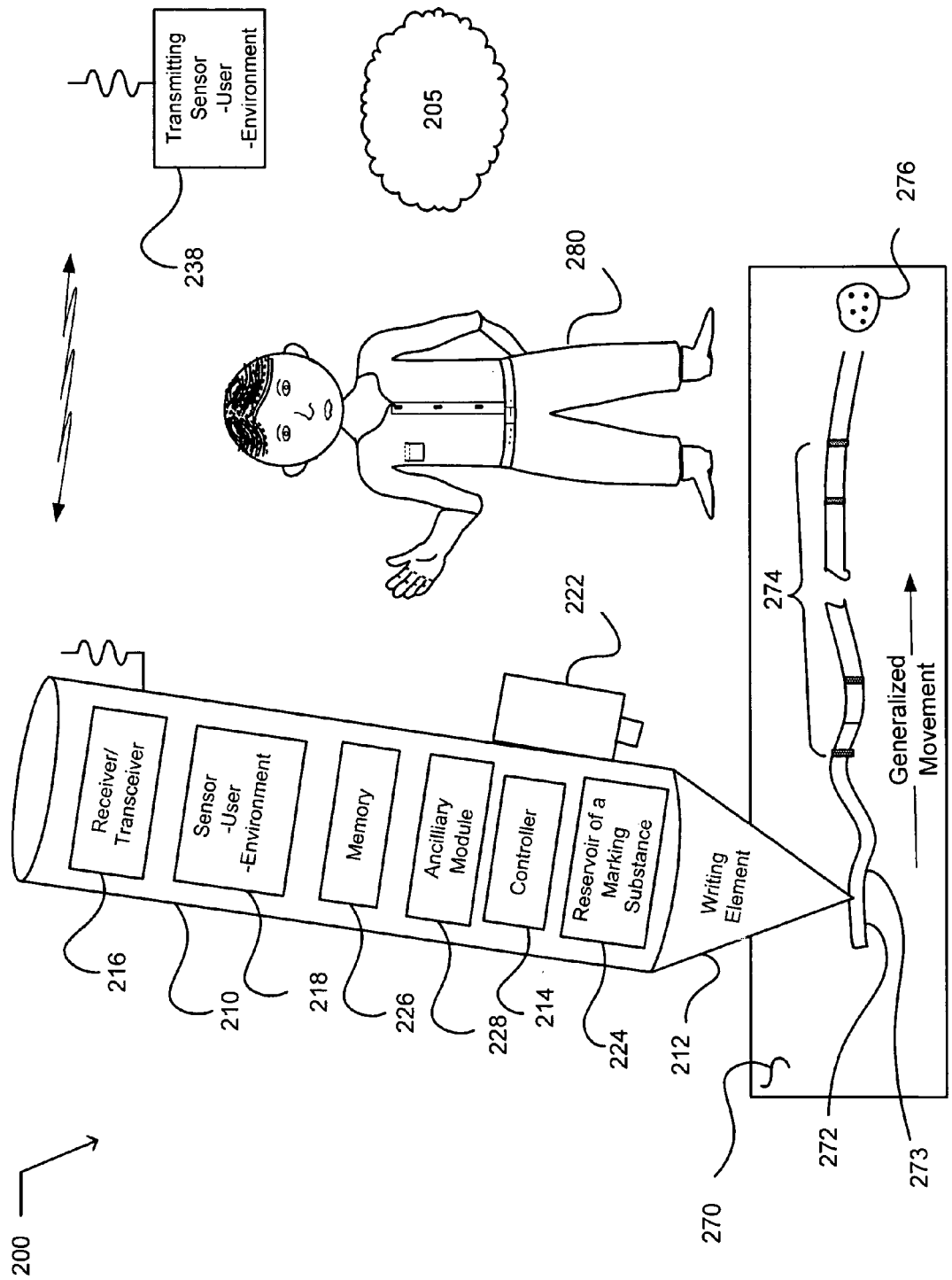
FIG. 3 illustrates an exemplary setting that includes an exemplary manual device operable in a context.

FIG. 3 illustrates an exemplary setting 200 that includes an exemplary manual device 210 operable in a context 205. In an embodiment, the manual device includes a writing element 212 operable to form a mark 272 on a surface 270 in response to a movement of the writing element with respect to the surface. The manual device further includes a controller 214 operable to encode information corresponding to the context 205 of the manual device by regulating the formation of the mark. An embodiment of the encoded information is illustrated in FIG. 3 as binary data 274 linearly deposited along or incorporated into the mark. See FIGS. 4, 16, and 20 infra., for additional illustrated embodiments of the encoded information as binary data associated with the mark. Another embodiment of the encoded information is illustrated in FIG. 3 as a microscopic structure or structures 276 proximally associated with the mark. The movement of the writing element is illustrated in FIG. 3 as a "Generalized Movement" arrow. In an embodiment, the manual device may include the thin computing device 20 of FIG. 1. The device functional elements 50 of FIG. 1 may include the writing element 212 and/or the controller 214. In another embodiment, the manual device may include the computing device 110 of FIG. 2.

In an embodiment, the writing element 212 further includes a writing element operable to discharge a marking substance 273 on a surface 270 in response to a movement of the writing element with respect to the surface. For example, the writing element may discharge the marking substance in response to a tip or nozzle (not shown) of the writing element being dragged across the surface 270 in a manner similar to a pen discharging ink as its tip is dragged across a surface in forming a handwritten expression. In another embodiment, the writing element further includes a writing element operable to initiate a visible marking action on a surface in response to a movement of the writing element with respect to the surface. A visible marking action may include a discharge of a visible marking fluid such as an ink. A visible marking action may include frictionally scraping a marking substance from the writing element in a manner similar to dragging a handheld instrument that includes pencil lead across the surface. In a further embodiment, the writing element further includes a writing element operable to discharge at least one of ink, graphite, paint, particles, nanoparticles, and/or quantum dots marking substance on a surface in response to a movement of the writing element with respect to the surface. For example, the writing element may include operability to discharge the microscopic structure or structures 276 that include particles, nanoparticles, and/or quantum dots. In an embodiment, a nozzle (not shown) of the writing element may include operability to discharge one or more quantum dots selected by the controller 214 to encode information corresponding to the context 205 of the manual device 210. For example, the nozzle operable to discharge the quantum dots may be a nozzle different from the nozzle operable to discharge the marking substance. In another example, a single nozzle of the writing element may include operability to discharge both the quantum dots and the marking substance.

In an embodiment, the writing element 212 further includes a writing element operable to discharge at least one of a visible and/or an invisible marking substance 273 on a surface 270 in response to a movement of the writing element with respect to the surface. In another embodiment, the writing element further includes a writing element operable to discharge a fluorescent substance, such as an ink or a marker tag, on the surface in response to a movement of the writing element with respect to the surface. In a further embodiment, the writing element further includes a writing element including at least one of a tip, an application element, an inkjet head, a nozzle, an inkjet nozzle, and/or a nib and being operable to form a mark on a surface in response to a movement of the writing element with respect to the surface.

In an embodiment, the writing element 212 further includes a writing element operable to at least one of emit, dispose, impart, release, eject, and/or flow a marking substance 273 on a surface 270 in response to a movement of the writing element with respect to the surface. In another embodiment, the writing element further includes a writing element operable to discharge a first instance of a marking substance on a surface in response to a movement of the writing element with respect to the surface and to discharge a second instance of the marking substance on the surface in response to the controller. In a further embodiment, the writing element further includes a writing element operable to form a mark on at least one of a skin, layer, paper, metal, plastic, and/or composite surface in response to a movement of the writing element with respect to the surface.

In an embodiment, the writing element 212 further includes a writing element operable to form a mark 272 on a surface 270 of at least one of a container, a package, a living body, a human body, and/or an object in response to a movement of the writing element with respect to the surface. In another embodiment, the writing element further includes a writing element operable to form a mark on a surface in response to a movement of the writing element with respect to the surface, the mark including a single mark and/or a succession of marks left by a passage of the writing element. In a further embodiment, the writing element further includes a writing element operable to form a track on a surface in response to a movement of the writing element with respect to the surface. In another embodiment, the writing element further includes a writing element operable to cause a thermal marking process on a surface in response to a movement of the writing element with respect to the surface. In a further embodiment, the writing element further includes a writing element operable to cause a marking interaction with a media in response to a movement of the writing element with respect to the media.

In an embodiment, the controller 214 further includes a controller operable to encode information corresponding to the context 205 of the manual device 210 by regulating a discharge of a marking substance 273. In another embodiment, the controller further includes a controller operable to encode information corresponding to the context of the manual device by regulating a discharge of at least one of a visible and/or invisible marking substance. In a further embodiment, the controller further includes a controller operable to encode information corresponding to at least one of time, location, global position, temperature, acceleration of the writing element, user identification and/or user data context of the manual device by regulating a discharge of a marking substance.

In an embodiment, the controller 214 further includes a controller operable to encode information corresponding to at least one of an identification of a human being 280 proximate to the manual device 210, and/or an identification of a physical object (for example, see a physical object 1184 at FIG. 20, infra.) proximate to manual device by regulating a discharge of a marking substance. In another embodiment, the controller further includes a controller operable to encode information corresponding to the context of the manual device by regulating at least one of volume, continuity, color, and/or pattern of a discharge of a marking substance. In a further embodiment, the controller further includes a controller operable to encode information corresponding to the context of the manual device by regulating a width of a line formed on the surface by a discharge of a marking substance.

In an embodiment, the controller 214 further includes a controller operable to encode information corresponding to the context 205 of the manual device 210 by regulating an orthogonal aspect of the mark 272 relative to a movement of the writing element 212. In another embodiment, the controller further includes a controller operable to encode information corresponding to the context of the manual device by regulating at least one of amplitude, frequency, differential shift, and/or parameter of an orthogonal formation of the mark relative to a movement of the writing element. In a further embodiment, the controller further includes a controller operable to encode information corresponding to the context of the manual device by regulating the formation of the mark, the regulated formation corresponding to a user-unique movement of the writing element with respect to the surface. For example, an ancillary module 228 may include an accelerometer and an operability to distinguish hand driven acceleration patterns imparted to the manual device from among at least two people.

In an embodiment, the controller 214 further includes a controller operable to encode information corresponding to the context 205 of the manual device 210 by regulating the formation of the mark 272. The regulated-formed mark being machine differentiatable from a user movement formation of the writing element with respect to the surface. For example, in an embodiment, the mark is formed such that a computer-implemented reader is able to distinguish and/or differentiate between a handwritten expression formed by the mark and the encoded information in the mark corresponding to the context. In another embodiment, the controller further includes a controller operable to encode information in a machine-readable form and corresponding to the context of the manual device by regulating the formation of the mark. In a further embodiment, the controller further includes a controller operable to encode information in a human-readable form and corresponding to the context of the manual device by regulating the formation of the mark. For example, the information encoded in the mark may include a human-readable text indicating an aspect of the context. For example, a time the mark was formed may be indicated in small typeface within the mark. In such an embodiment, the mark may appear as a conventional handwritten expression when viewed from a normal reading distance, but on a close view or when viewed through magnification, the small typeface indicating the time becomes visible.

In an embodiment, the manual device 210 further includes a receiver 216 operable to acquire the information corresponding to the context 205 of the manual device. The receiver is illustrated as a receiver or transceiver. In another embodiment, the receiver operable to acquire the information corresponding to the context of the manual device may include a receiver operable to directly sense the information corresponding to the context of the manual device. In a further embodiment, the receiver operable to acquire the information corresponding to the context of the manual device may further include a receiver operable to receive information sent by a transmitting sensor 238, the received information corresponding to the context of the manual device.

In an embodiment, the manual device 210 may further include a sensor 218 operable to acquire the information corresponding to the context 205 of the manual device. In another embodiment, the sensor operable to acquire the information corresponding to the context of the manual device further includes a sensor operable to sense the information corresponding to the context of the manual device. In a further embodiment, the sensor operable to acquire the information corresponding to the context of the manual device further includes a sensor operable to receive information corresponding to the context of the manual device. For example, the sensor 210 may receive information corresponding to the context of the manual device from an external transmitting sensor 238. In another embodiment, the sensor operable to acquire the information corresponding to the context of the manual device further includes a sensor operable to capture information corresponding to a visual aspect of the surface. In a further embodiment, the sensor operable to acquire and transmit the information corresponding to the context of the manual device further includes a sensor operable to capture information corresponding to an acoustical aspect of the surface.

In an embodiment, the manual device 210 further includes a reservoir 224 configured to contain a supply of a marking substance. In another embodiment, the manual device further includes a memory 226 configurable by file that includes at least one instance of the context 205 of the manual device and a code indicative of the context of the manual marking device. In a further embodiment, the manual device further includes an image device 222 operable to capture an aspect of the surface.

In use, the writing element creating the mark, such as for example a hand formed expression in the English language, will generally move in a left to right direction as illustrated by the "General Movement" and will include specific small hand driven movements generally orthogonal to the "General Movement." In another language or instance, a hand formed expression may include a different general movement, such as in a right to left direction. In an embodiment, a human user 280 may grip or hold the manual device 210 in their hand and move the writing element 212 across a surface 270, such as a piece of paper, making incremental movements in various directions as one does when handwriting, but generally moving in the Generalized Movement direction as indicated in FIG. 3, to form the mark 272 on the surface. At one or more times during the Generalized Movement, or thereafter, the controller causes information corresponding to the context 205 to be encoded in the mark, such as the encoded information 274 and/or the encoded information 276.

Figure 4:
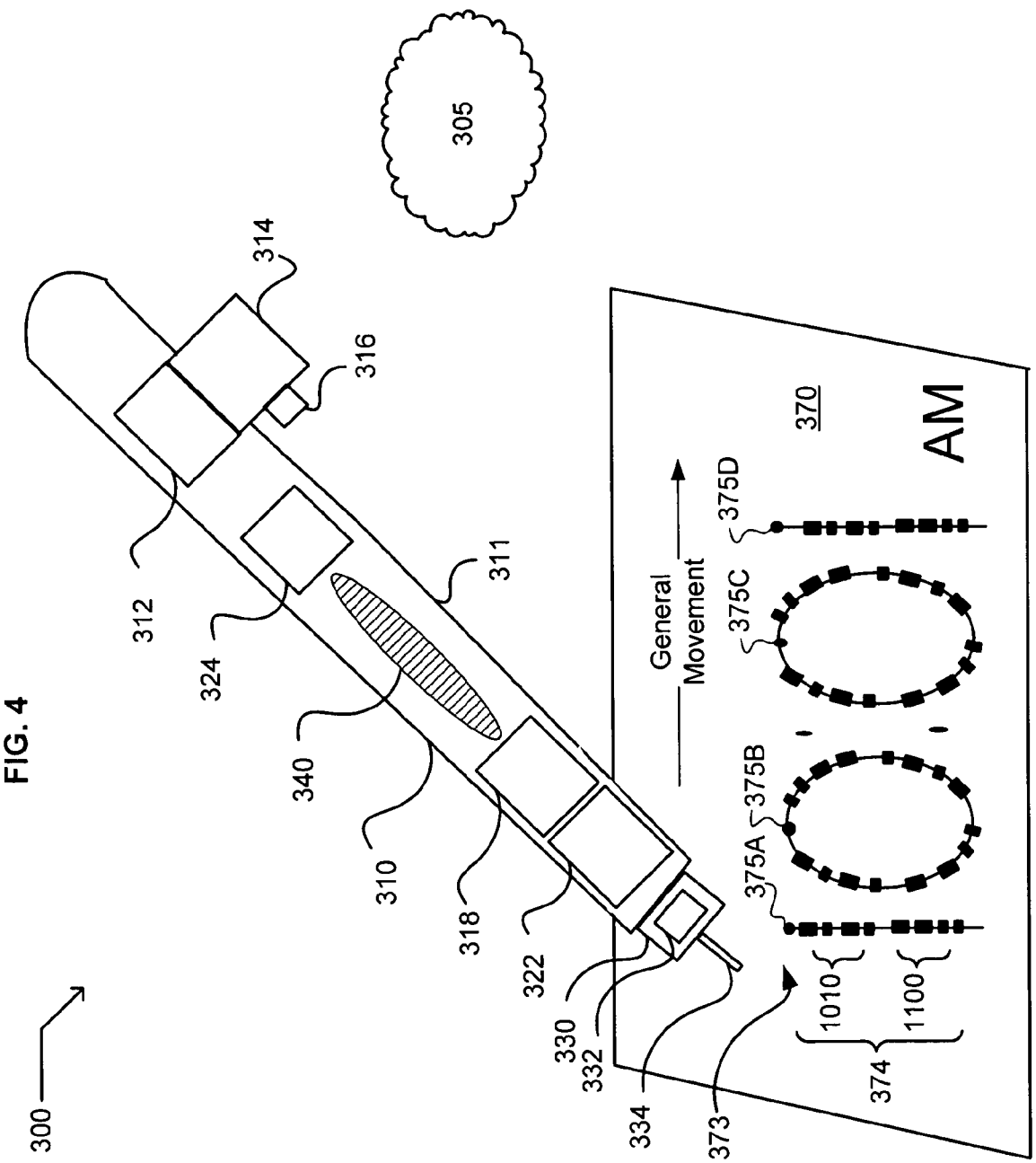
FIG. 4 illustrates an exemplary setting that includes a manual device operable in a context.

FIG. 4 illustrates an exemplary setting 300 that includes a manual device 310 operable in a context 305. The manual device includes a body 311, a writing instrument 330, a sensor 312, and a controller 318. The writing instrument has an electronically driven printhead 332 operable to discharge a marking substance 373 on a surface 370 in response to a movement of at least a portion of the body over the surface. The sensor includes a sensor operable to acquire information corresponding to a context 305 of the manual device. The controller includes a controller operable to encode the information 374 corresponding to the context of the manual device by regulating a discharge of the marking substance 373 from the electronically driven print head.

In an embodiment, the body 311 further includes a generally elongated body. In another embodiment, the body further includes a generally elongated body having a graspable portion. In a further embodiment, the body further includes a generally elongated body having a hand-graspable portion 340.

In an embodiment, the writing instrument 330 having an electronically driven printhead 332 further includes a writing instrument having an electronically driven printhead with a nozzle 334 operable to discharge a marking substance 373 on a surface 370. In another embodiment, the writing instrument having an electronically driven printhead further includes a writing instrument having an electronically driven printhead with at least two nozzles each respectively operable to discharge a marking substance on a surface in response to a movement of at least a portion of the body over the surface (a second nozzle is not shown).

In an embodiment, the sensor 312 further includes a sensor operable to acquire information corresponding to a user of the manual device 310. In another embodiment, the sensor further includes a sensor operable to acquire information corresponding to an environmental context 305 of the manual device. In a further embodiment, the manual device further includes a reservoir 322 configured to contain a supply of the marking substance. In another embodiment, the manual device further includes a memory 324 configurable by file that includes at least one instance of a context of the manual device and a code useable by the controller and corresponding to the context of the manual device. In a further embodiment, the manual device further includes an imaging device 314 operable to capture an aspect of the surface 370.

FIG. 4 illustrates an exemplary setting where the writing element 330 of the manual device 310 wrote or formed the characters "10:01 AM" in response to a hand driven movement of at least a portion of the body 311 over the surface 370. An initial portion of a stroke or a movement of the writing element in forming a character occurs at a point 375, and is illustrated as points 375A-375D. The sensor 312 has acquired a time of "10:12 AM" as a clock-time environment aspect associated with the formation of the handwritten characters "10:01 AM," and encoded the clock-time environment aspect into the handwriting. The clock-time environment aspect "10:12" is encoded in binary format into the discharged substance 373 as 1010 1100 (374) read from the initial portion of each stroke 375.

Figure 5:
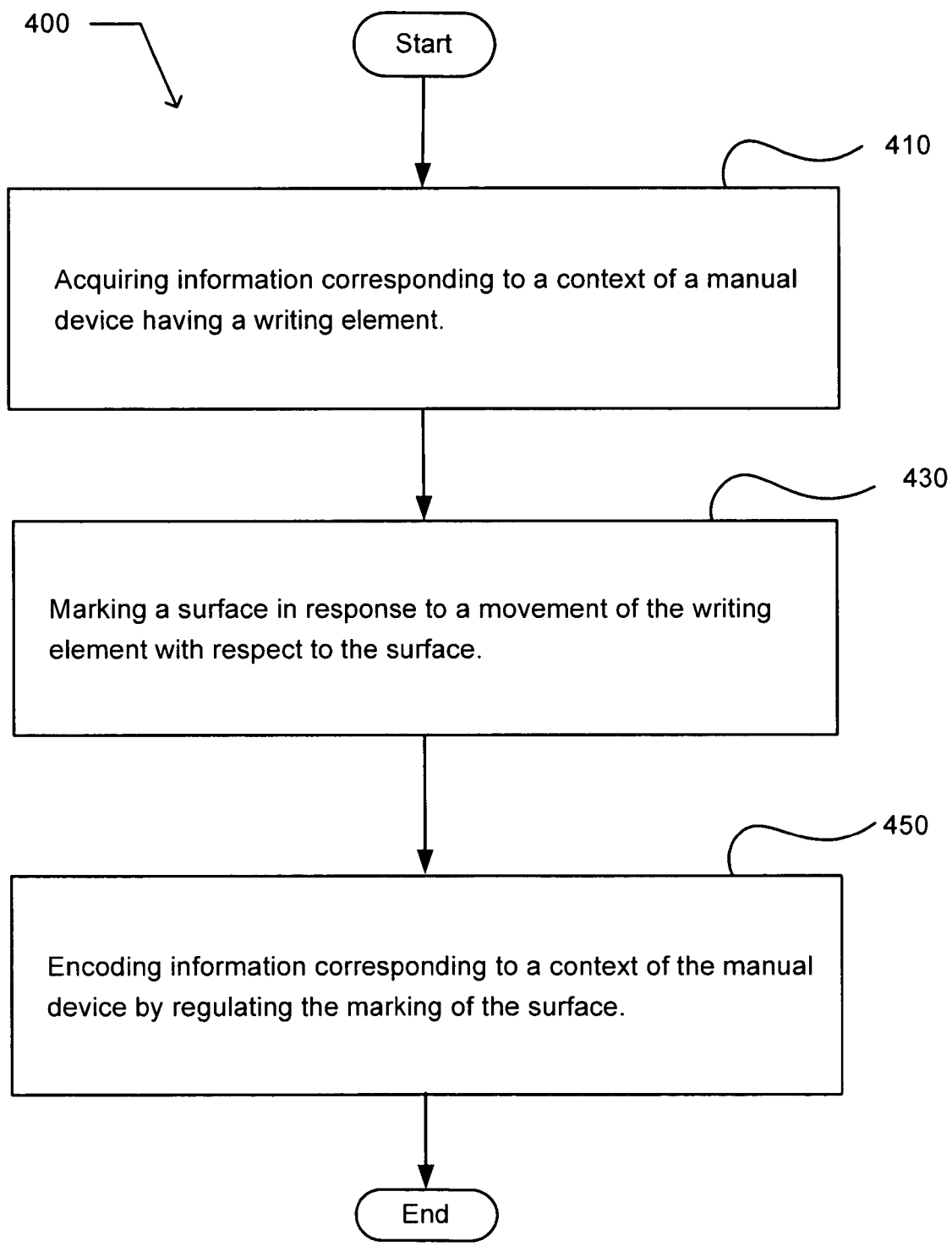
FIG. 5 illustrates an exemplary operational flow.

FIG. 5 illustrates an exemplary operational flow 400. After a start operation, the operational flow proceeds to an obtaining operation 410. The obtaining operation acquires information corresponding to a context of a manual device having a writing element. An inscription operation 430 marks a surface in response to a movement of the writing element with respect to the surface. An insertion operation 450 encodes information corresponding to a context of the manual device by regulating the marking of the surface. The operational flow then proceeds to an end operation.

Figure 6:
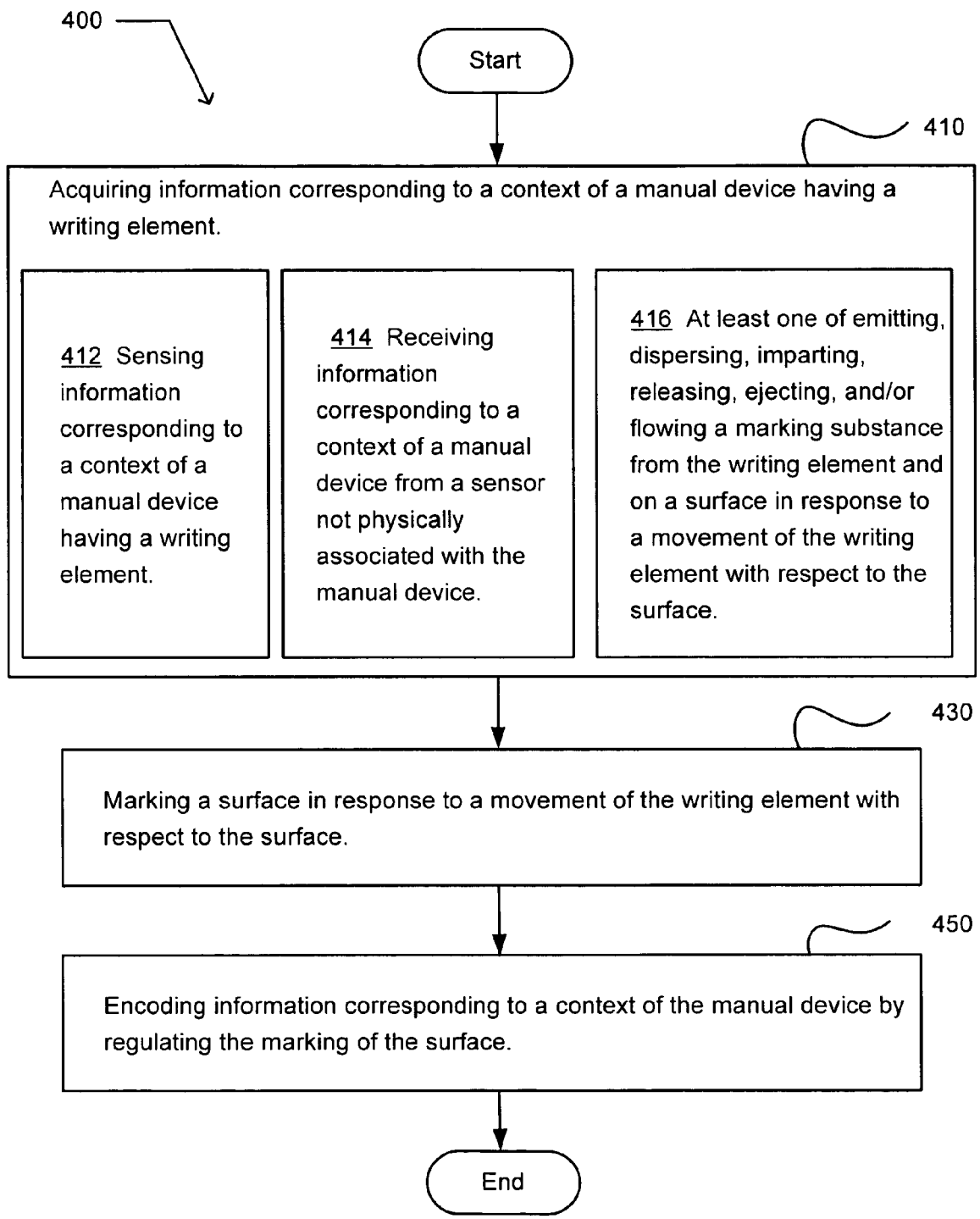
FIG. 6 illustrates an alternative embodiment of the operational flow of FIG. 5.

FIG. 6 illustrates an alternative embodiment of the operational flow 400 of FIG. 5. The obtaining operation 410 may include at least one additional operation. The at least one additional operation may include an operation 412, an operation 414, and/or an operation 416. The operation 412 senses information corresponding to a context of a manual device having a writing element. The operation 414 receives information corresponding to a context of a manual device from a sensor not physically associated with the manual device. The operation 416 includes at least one of emitting, dispersing, imparting, releasing, ejecting, and/or flowing a marking substance from the writing element and on a surface in response to a movement of the writing element with respect to the surface.

Figure 7:
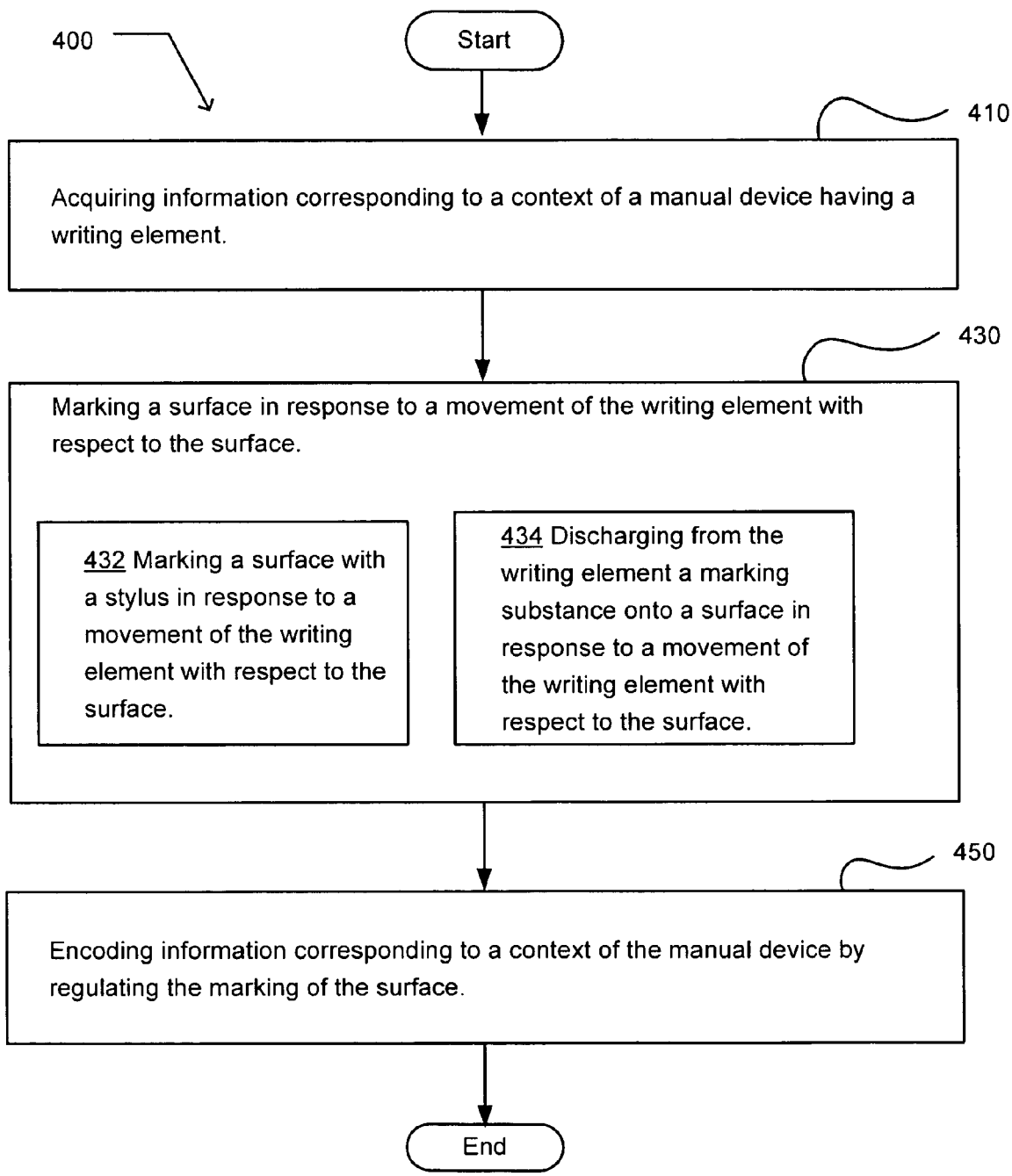
FIG. 7 illustrates an alternative embodiment of the operational flow of FIG. 5.

FIG. 7 illustrates an alternative embodiment of the operational flow 400 of FIG. 5. The inscription operation 430 may include at least one additional operation. The at least one additional operation may include an operation 432, and/or an operation 434. The operation 432 marks a surface with a stylus in response to a movement of the writing element with respect to the surface. The operation 434 discharges from the writing element a marking substance onto a surface in response to a movement of the writing element with respect to the surface.

Figure 8:
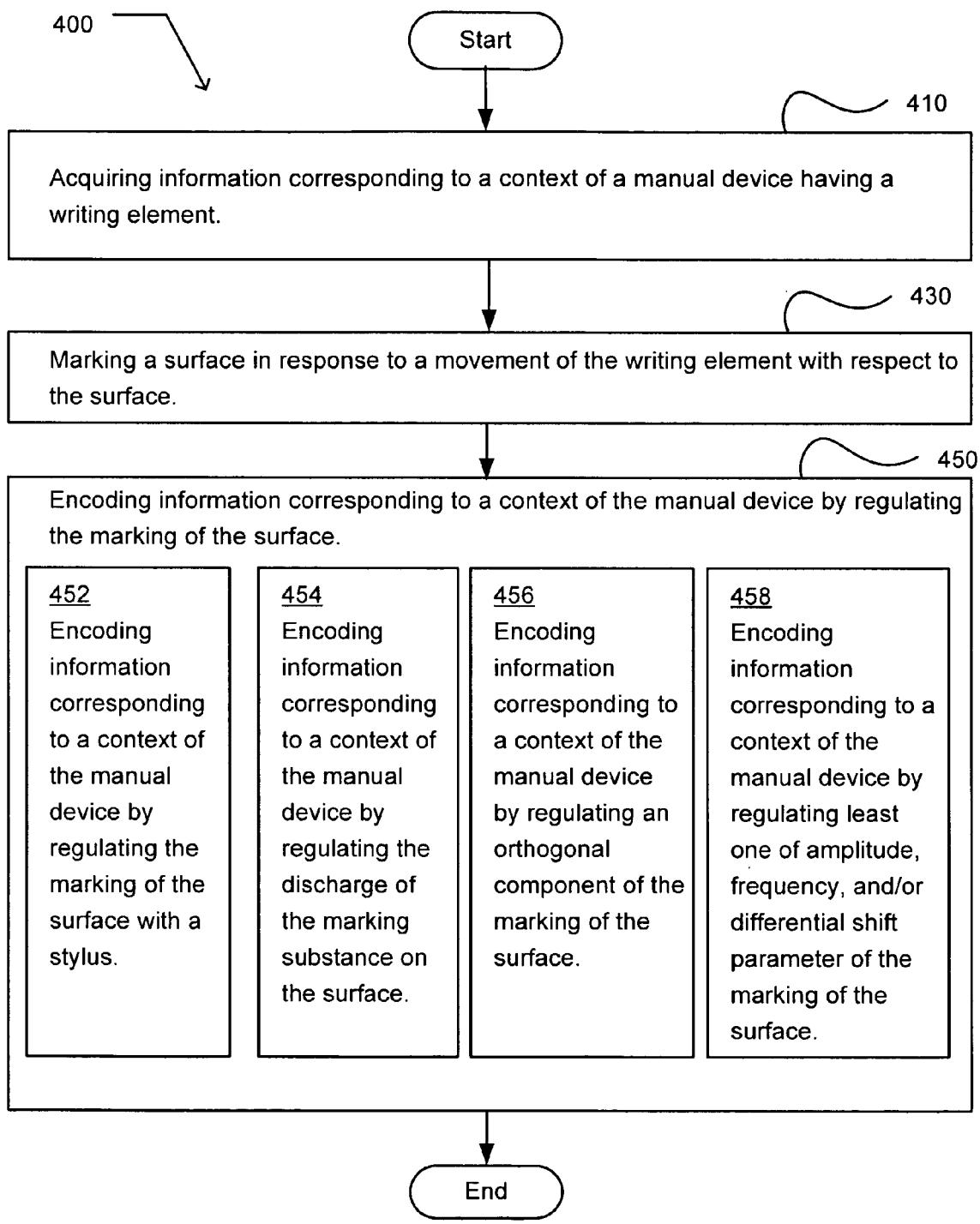
FIG. 8 illustrates another embodiment of the operational flow of FIG. 5.

FIG. 8 illustrates another embodiment of the operational flow 400 of FIG. 5. The insertion operation 450 may include at least one additional operation. The at least one additional operation may include an operation 452, an operation 454, an operation 456, and/or an operation 458. The operation 452 encodes information corresponding to a context of the manual device by regulating the marking of the surface with a stylus. The operation 454 encodes information corresponding to a context of the manual device by regulating the discharge of the marking substance on the surface. The operation 456 encodes information corresponding to a context of the manual device by regulating an orthogonal component of the marking of the surface. The operation 458 encodes information corresponding to a context of the manual device by regulating least one of amplitude, frequency, and/or differential shift parameter of the marking of the surface.

Figure 9:
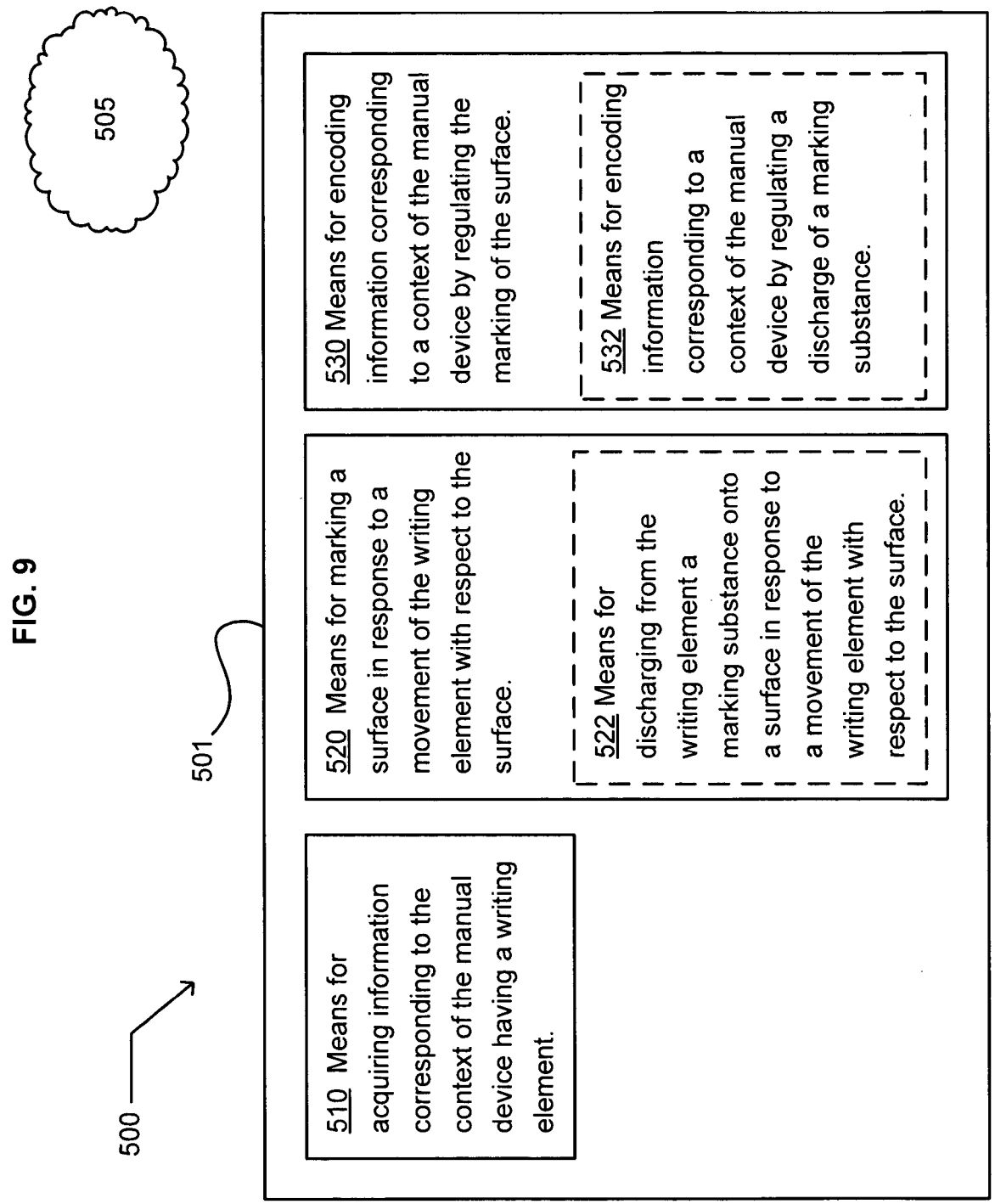
FIG. 9 illustrates an exemplary environment that includes a manual device having a writing element and operable in a context.

FIG. 9 illustrates an exemplary environment 500 that includes a manual device 501 having a writing element and operable in a context 505. The manual device includes means 510 for acquiring information corresponding to the context of the manual device having a writing element. The manual device also includes means 520 for marking a surface in response to a movement of the writing element with respect to the surface. The manual device further includes means 530 for encoding information corresponding to a context of the manual device by regulating the marking of the surface.

In an alternative embodiment, the means 520 includes means 522 for discharging from the writing element a marking substance onto a surface in response to a movement of the writing element with respect to the surface. In a further embodiment, the means 530 includes means 532 for encoding information corresponding to a context of the manual device by regulating a discharge of a marking substance.

Figure 10:
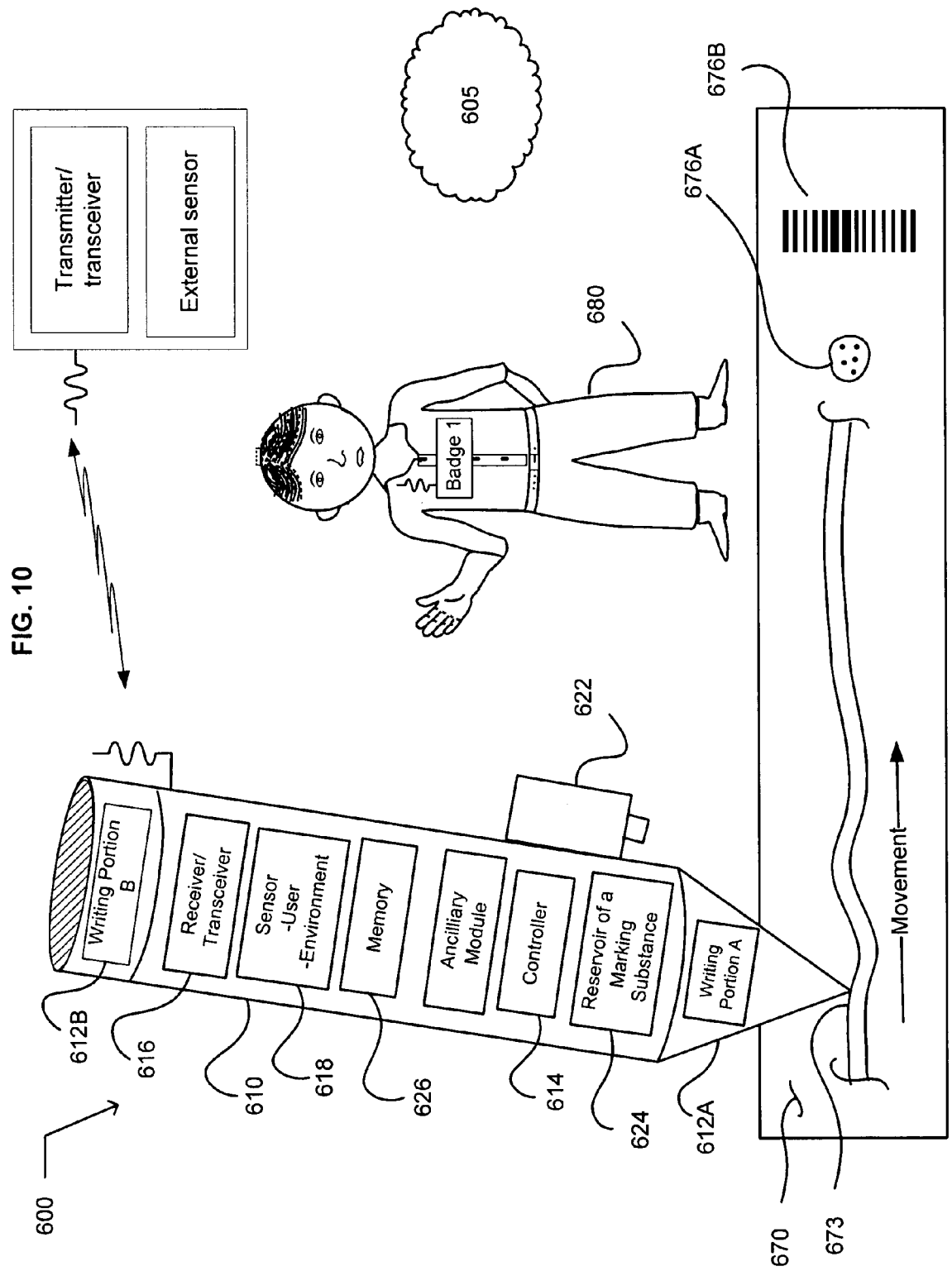
FIG. 10 illustrates an exemplary environment in which embodiments may be implemented.

FIG. 10 illustrates an exemplary environment 600 in which embodiments may be implemented. The exemplary environment includes an apparatus 610 and a context 605 of the apparatus. The apparatus includes a writing element 612 having a first writing portion 612A operable to discharge a first marking 673 substance on a surface 670 in response to a movement of the writing element over the surface. The writing element also has a second writing portion 612B operable to discharge a second marking substance 676 on the surface in response to a controller 614. Alternative embodiments of the second marking substance are illustrated as one or more microparticles 676A and a barcode 676B. The apparatus also includes the controller operable to encode information corresponding to the context of the apparatus by regulating the discharge of the second marking substance 676.

In an embodiment, the writing element 612 further includes a first writing portion 612A having a first orifice operable to discharge a first marking substance 673 on a surface in response to a movement of the writing element over the surface. The writing element also includes a second writing portion 612B having a second orifice operable discharge a second marking 676 substance on the surface in response to a controller (the orifices are not shown). For example, a single writing element may include two orifices each respectively operable to discharge a marking substance. In another embodiment, the writing element further includes a writing element having a first portion operable to discharge a first marking substance on a surface in response to a movement of the writing element over the surface and a second portion operable discharge a second marking substance on the surface in response to a controller. The first portion of a writing element is proximate to the second portion of the writing element (the proximate first and second discharging portions are not shown). In another embodiment, the writing element further includes a writing element having a first portion operable to discharge a first marking substance on a surface in response to a movement of the writing element over the surface and a second portion operable discharge a second marking substance on the surface in response to a controller. The first portion of a writing element is spaced-apart from the second portion of the writing element. FIG. 10 illustrates an embodiment of the spaced-apart configuration, where the first portion of the writing element 612A is located at an end of a longitudinal body in a manner similar to a pen, pencil, or other common writing instrument. The second portion 612B of the writing element is located at another or opposing end of the longitudinal body in a manner similar to an eraser end of a pencil. In a further embodiment, the device may be described as including two spaced-apart writing elements—a writing element 612A having an orifice operable to discharge a first marking and a writing element 612B having an orifice operable to discharge a second marking substance (the orifices are not shown).

In operation of an embodiment, a human user 680 may grip or hold the apparatus 610 in a hand, and with a hand movement, move the apparatus and the first portion 612A of the writing element across the surface 670 in a manner similar to writing on a sheet of paper with a pen. The first marking substance 673 is deposited on the surface in response to the movement. For example, the user may guide the first portion of the writing element to across the surface in a manner to form a mark representative of a word, to create a line, and/or to draw an object on the surface. The human user may stop writing with the first portion of the writing element, turn the apparatus end-for-end, and make a movement of the second portion 612B with respect to the surface. For example, the user may move the second portion across the surface in a swiping movement to discharge the second marking substance 676. The controller encodes information corresponding to a context of the apparatus by regulating the discharge of the second marking substance. FIG. 10 illustrates an aspect of the discharge of the second marking substance where the controller encodes information corresponding to a context 605 of the apparatus by regulating the discharge of the second marking substance to form a bar code pattern on the surface, illustrated as the one-dimensional bar code 676B. By way of further example, the user may move the second portion against the surface, such as in a tapping movement, and the controller encodes information corresponding to a context 605 of the apparatus by regulating the discharge the second marking substance in a form of one or more microparticles 676A.

In an embodiment, the writing element 612 further includes a writing element having a first portion 612A operable to discharge a first marking substance 673 on a surface in response to a movement of the writing element over the surface and a second portion 612B operable discharge a second marking substance 676 on the surface in response to a controller 614. The second marking substance is at least substantially similar to the first marking substance. In another embodiment, the writing further includes a writing element having a first portion operable to discharge a first marking substance on a surface in response to a movement of the writing element over the surface and a second portion operable discharge a second marking substance on the surface. The second marking substance is at least substantially dissimilar to the first marking substance. In a further embodiment, the writing element further includes a writing element having a first portion operable to discharge a first marking substance on a surface in response to a movement of the writing element over the surface and a second portion operable discharge a second marking substance on the surface in response to a controller. The second marking substance is a same marking substance as the first marking substance.

In an embodiment, the writing element 612 further includes a writing element having a first portion 612A operable to discharge a first marking substance 673 on a surface 670 in response to a movement of the writing element over the surface and a second portion 612B operable discharge a second marking substance on the surface in response to a controller 614. The second marking substance includes at least one of visible and/or invisible marking substance. In another embodiment, the writing element further includes a writing element having a first portion operable to discharge a first marking substance on a surface in response to a movement of the writing element over the surface and a second portion operable discharge a second marking substance on the surface in response to a controller. The second marking substance includes at least one of ink, graphite, paint, particles, nanoparticles, and/or quantum dots. In a further embodiment, the writing element further includes a writing element having a first portion operable to discharge a first marking substance on a surface in response to a movement of the writing element over the surface and a second portion operable discharge in response to a controller a second marking substance in two dimensions on the surface. For example, discharging a marking substance in two dimensions on the surface may include forming a two dimensional bar code. See a bar code 979E at FIG. 16 infra.

In an embodiment, the controller 614 further includes a controller operable to encode information corresponding to a context 605 of the apparatus 610 by regulating the discharge of the second marking substance 676 in a manner that is at least substantially independent of the movement of the writing element 612 over the surface. In another embodiment, the controller further includes a controller operable to encode information corresponding to a context of the apparatus by regulating an orthogonal discharge of the second marking substance relative to a movement of the writing element.

In an embodiment, the apparatus 610 further includes a sensor 618 operable to acquire the information corresponding to a context 605 of the apparatus. In another embodiment, the apparatus further includes a sensor operable to acquire and transmit the information corresponding to a context of the apparatus. In a further embodiment, the apparatus further includes an imaging device 622 operable to capture an aspect of the surface. In another embodiment, the apparatus further includes a reservoir 624 configured to contain a supply at least one of the first marking substance and/or the second marking substance. In a further embodiment, the apparatus includes a memory 626 configurable by file that includes at least one instance of a context of the apparatus and a code indicative of the context of the apparatus.

Figure 11:
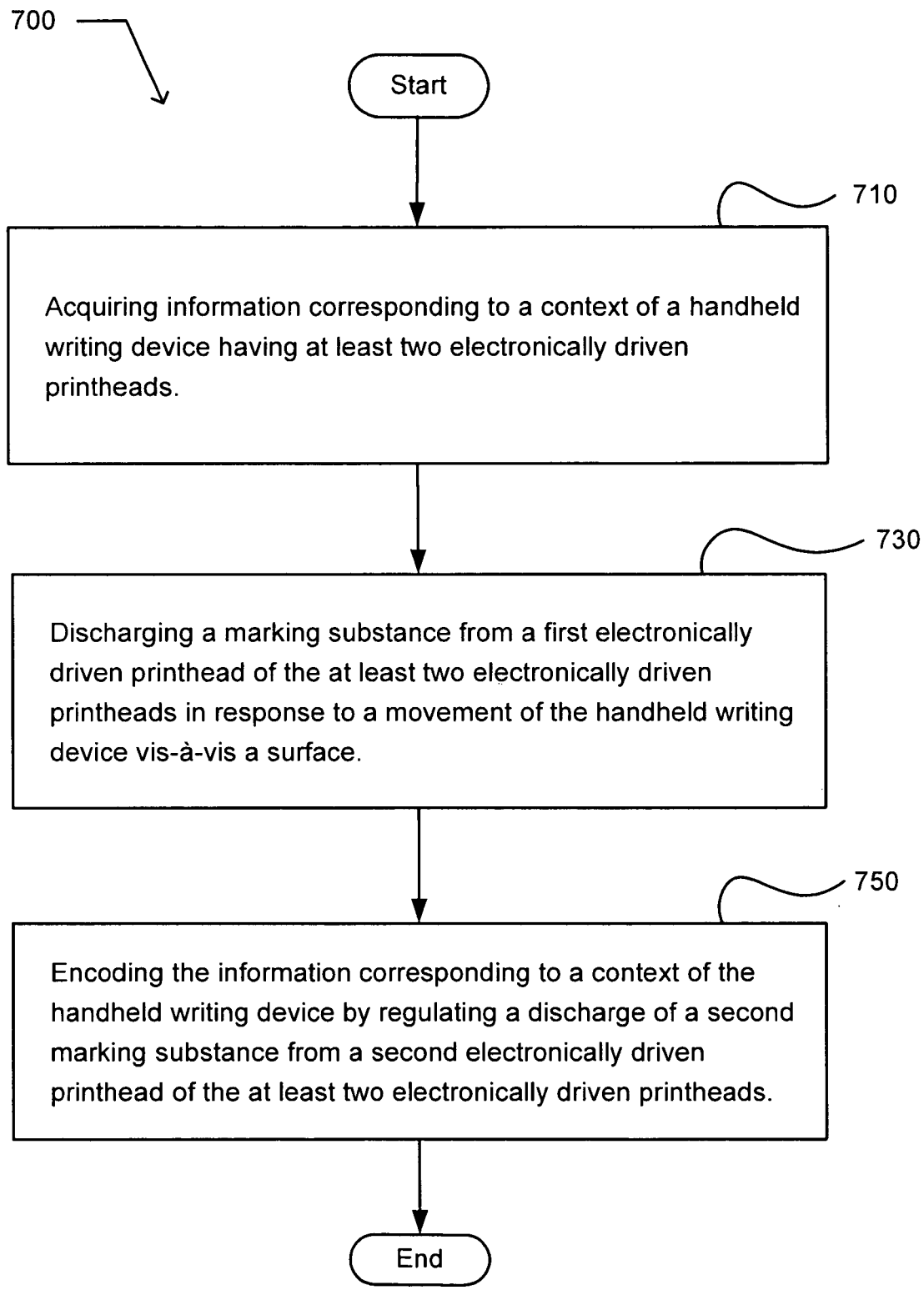
FIG. 11 illustrates an exemplary operational flow in which embodiments may be implemented.

FIG. 11 illustrates an exemplary operational flow 700 in which embodiments may be implemented. After a start operation, the operational flow moves to a procuring operation 710. The procuring operation acquires information corresponding to a context of a handheld writing device having at least two electronically driven printheads. A writing operation 730 discharges a marking substance from a first electronically driven printhead of the at least two electronically driven printheads in response to a movement of the handheld writing device vis-à-vis a surface. An insertion operation 750 encodes the information corresponding to a context of the handheld writing device by regulating a discharge of a second marking substance from a second electronically driven printhead of the at least two electronically driven printheads. The operational flow then proceeds to an end operation.

Figure 12:
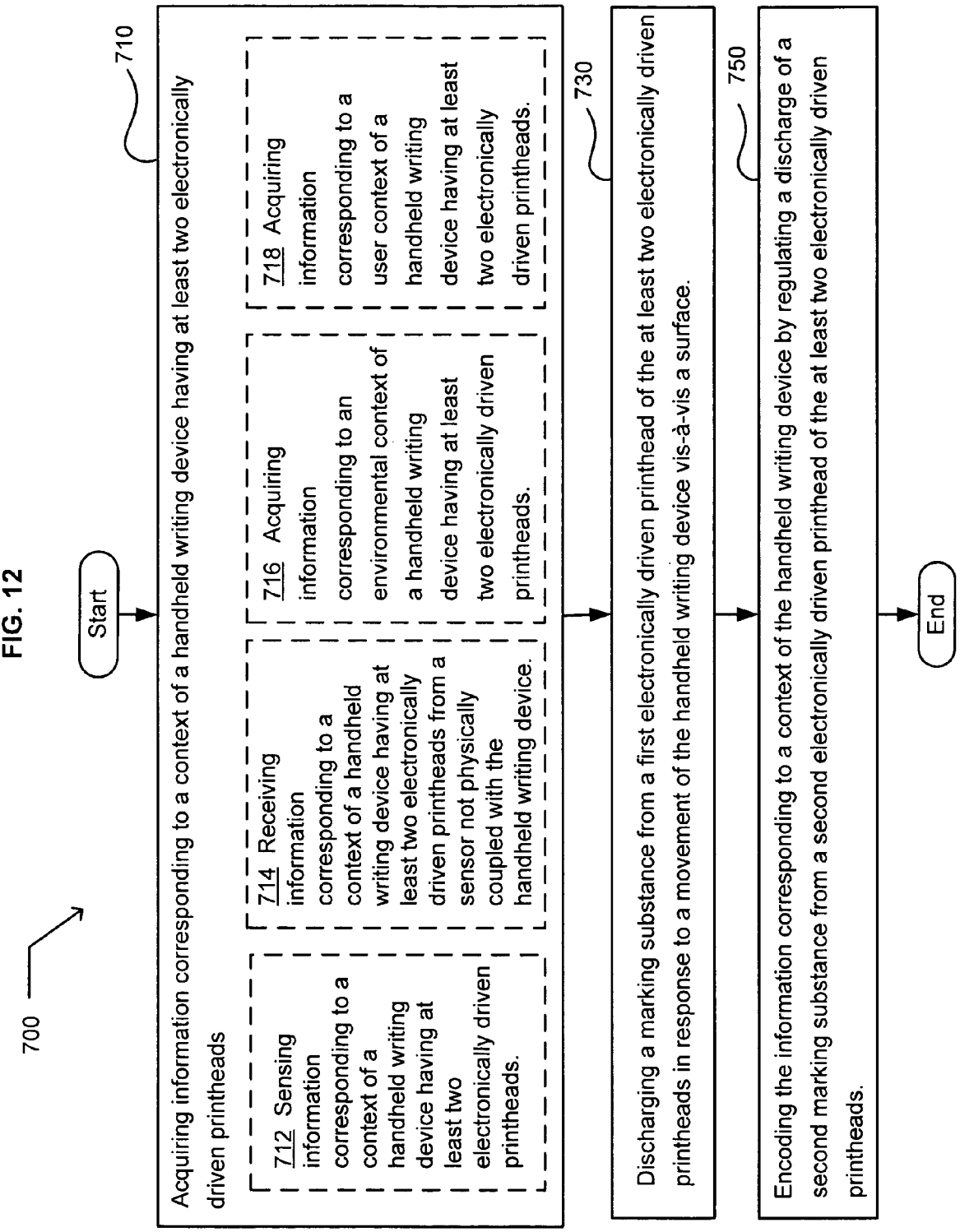
FIG. 12 illustrates an alternative embodiment of the exemplary operational flow of FIG. 11.

FIG. 12 illustrates an alternative embodiment of the exemplary operational flow 700 of FIG. 11. The procuring operation 710 may include at least one additional operation. The at least one additional operation may include an operation 712, an operation 714, an operation 716, and/or an operation 718. The operation 712 senses information corresponding to a context of a handheld writing device having at least two electronically driven printheads. The operation 714 receives information corresponding to a context of a handheld writing device having at least two electronically driven printheads from a sensor not physically coupled with the handheld writing device. In an embodiment, the operation 714 includes wirelessly receiving the information. The operation 716 acquires information corresponding to an environmental context of a handheld writing device having at least two electronically driven printheads. The operation 718 acquires information corresponding to a user context of a handheld writing device having at least two electronically driven printheads.

Figure 13:
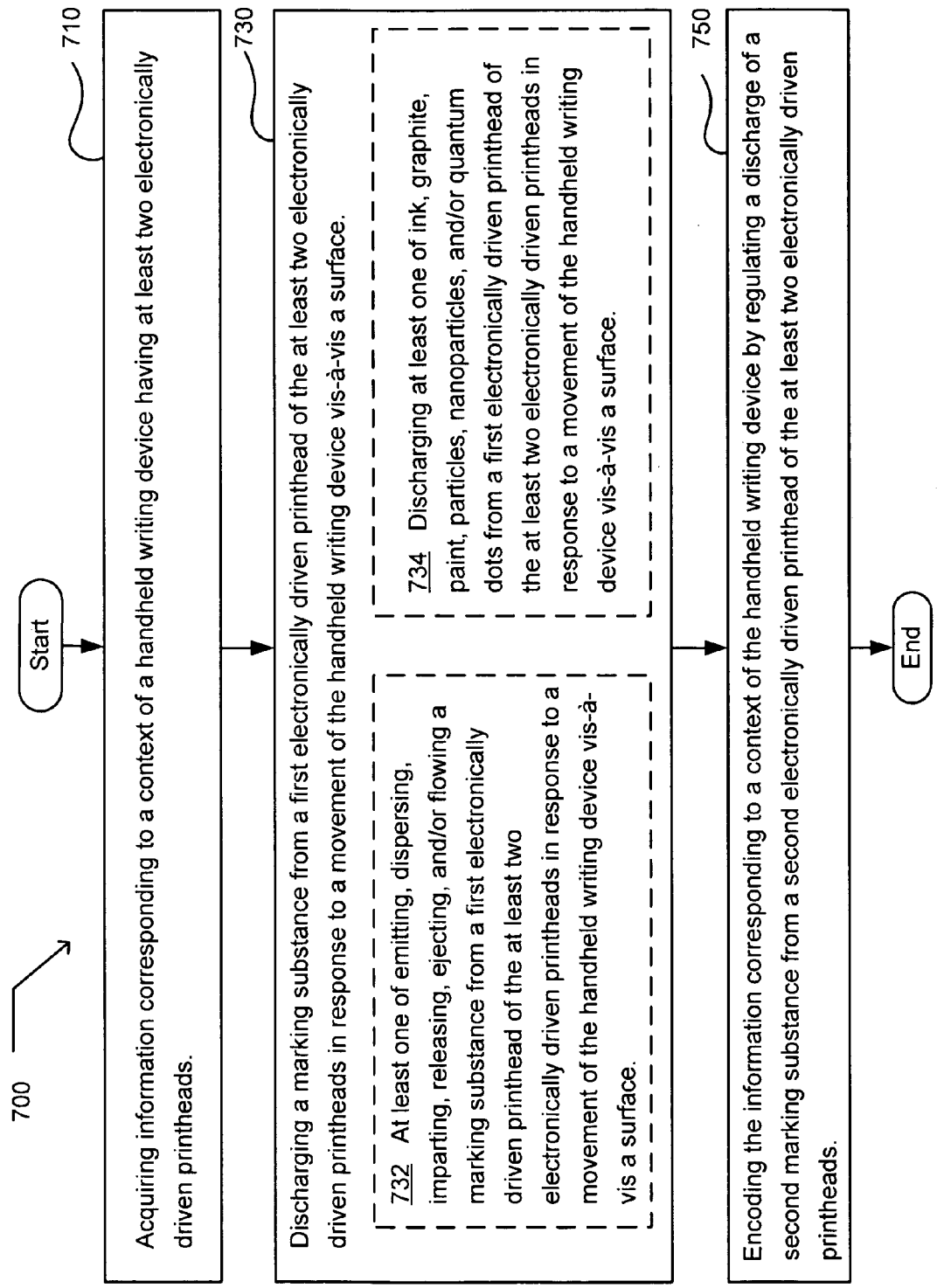
FIG. 13 illustrates another alternative embodiment of the exemplary operational flow of FIG. 11.

FIG. 13 illustrates another alternative embodiment of the exemplary operational flow 700 of FIG. 11. The writing operation 730 may include at least one additional operation. The at least one additional operation may include an operation 732, and/or an operation 734. The operation 732 includes at least one of emitting, dispersing, imparting, releasing, ejecting, and/or flowing a marking substance from a first electronically driven printhead of the at least two electronically driven printheads in response to a movement of the handheld writing device vis-à-vis a surface. The operation 734 discharges at least one of ink, graphite, paint, particles, nanoparticles, and/or quantum dots from a first electronically driven printhead of the at least two electronically driven printheads in response to a movement of the handheld writing device vis-à-vis a surface.

Figure 14:
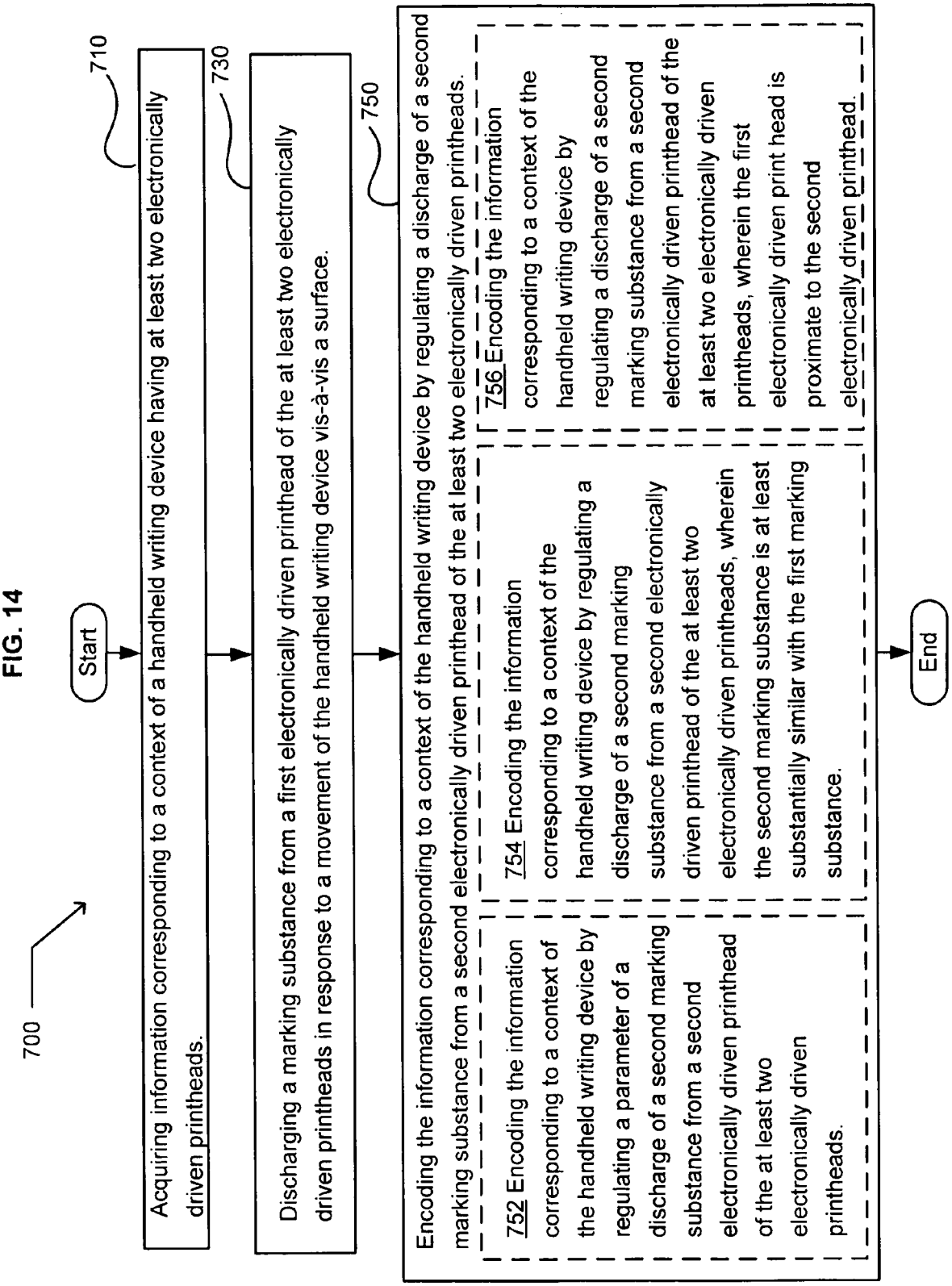
FIG. 14 illustrates a further alternative embodiment of the exemplary operational flow of FIG. 11.

FIG. 14 illustrates a further alternative embodiment of the exemplary operational flow 700 of FIG. 11. The insertion operation 750 may include at least one additional operation. The at least one additional operation may include an operation 752, an operation 754, and/or an operation 756. The operation 752 encodes the information corresponding to a context of the handheld writing device by regulating a parameter of a discharge of a second marking substance from a second electronically driven printhead of the at least two electronically driven printheads. The operation 754 encodes the information corresponding to a context of the handheld writing device by regulating a discharge of a second marking substance from a second electronically driven printhead of the at least two electronically driven printheads. The second marking substance is at least substantially similar with the first marking substance. The operation 756 encodes the information corresponding to a context of the handheld writing device by regulating a discharge of a second marking substance from a second electronically driven printhead of the at least two electronically driven printheads. The first electronically driven print head is proximate to the second electronically driven printhead.

Figure 15:
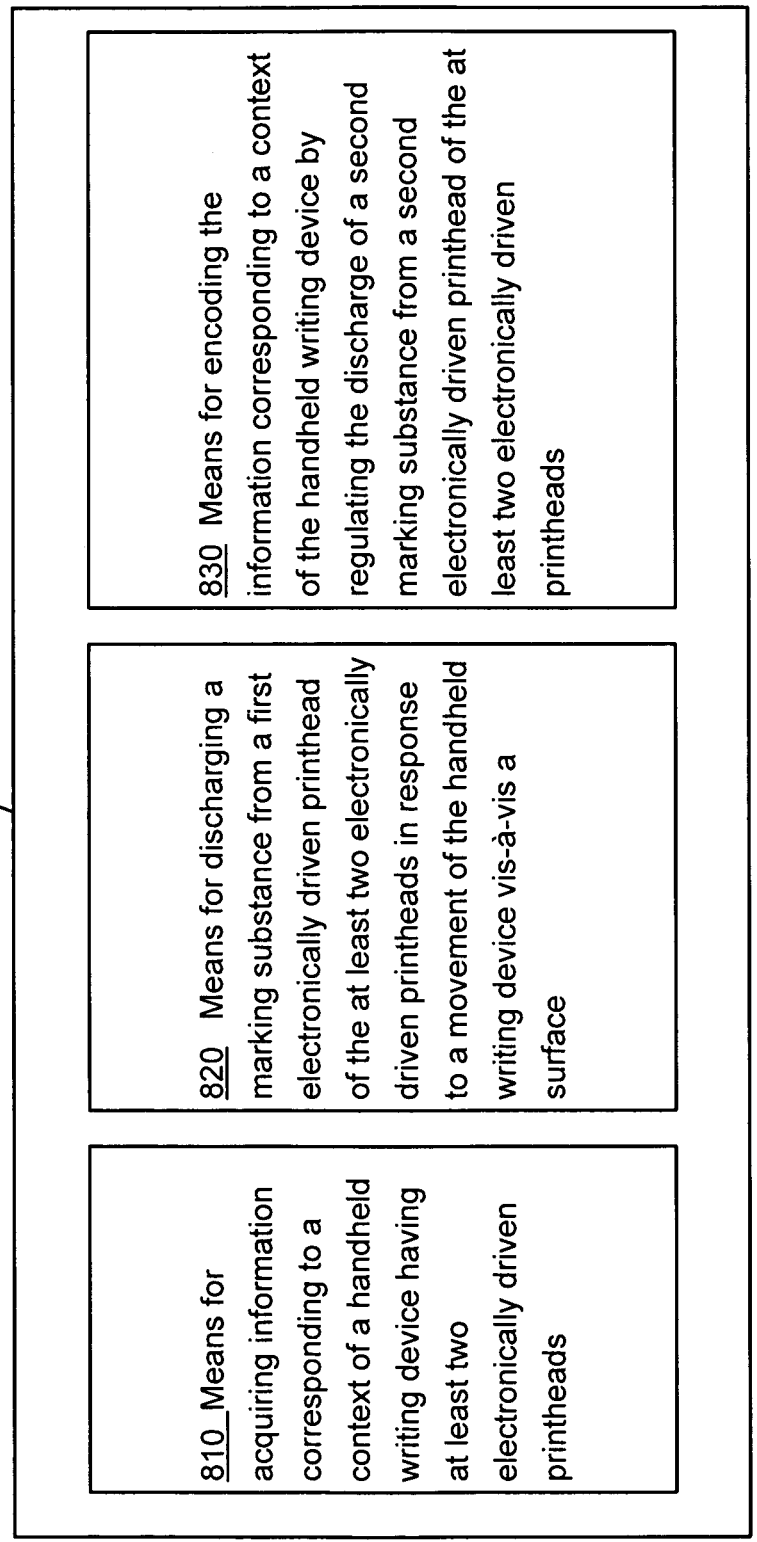
FIG. 15 illustrates an exemplary environment 800 that includes a handheld writing device 801 operable in a context 805.

FIG. 15 illustrates an exemplary environment 800 that includes a handheld writing device 801 operable in a context 805. The handheld writing device includes means 810 for acquiring information corresponding to a context of the handheld writing device having at least two electronically driven printheads. The handheld writing device also includes means 820 for discharging a marking substance from a first electronically driven printhead of the at least two electronically driven printheads in response to a movement of the handheld writing device vis-à-vis a surface. The handheld writing device further includes means 830 for encoding the information corresponding to a context of the handheld writing device by regulating the discharge of a second marking substance from a second electronically driven printhead of the at least two electronically driven printheads.

Figure 16:
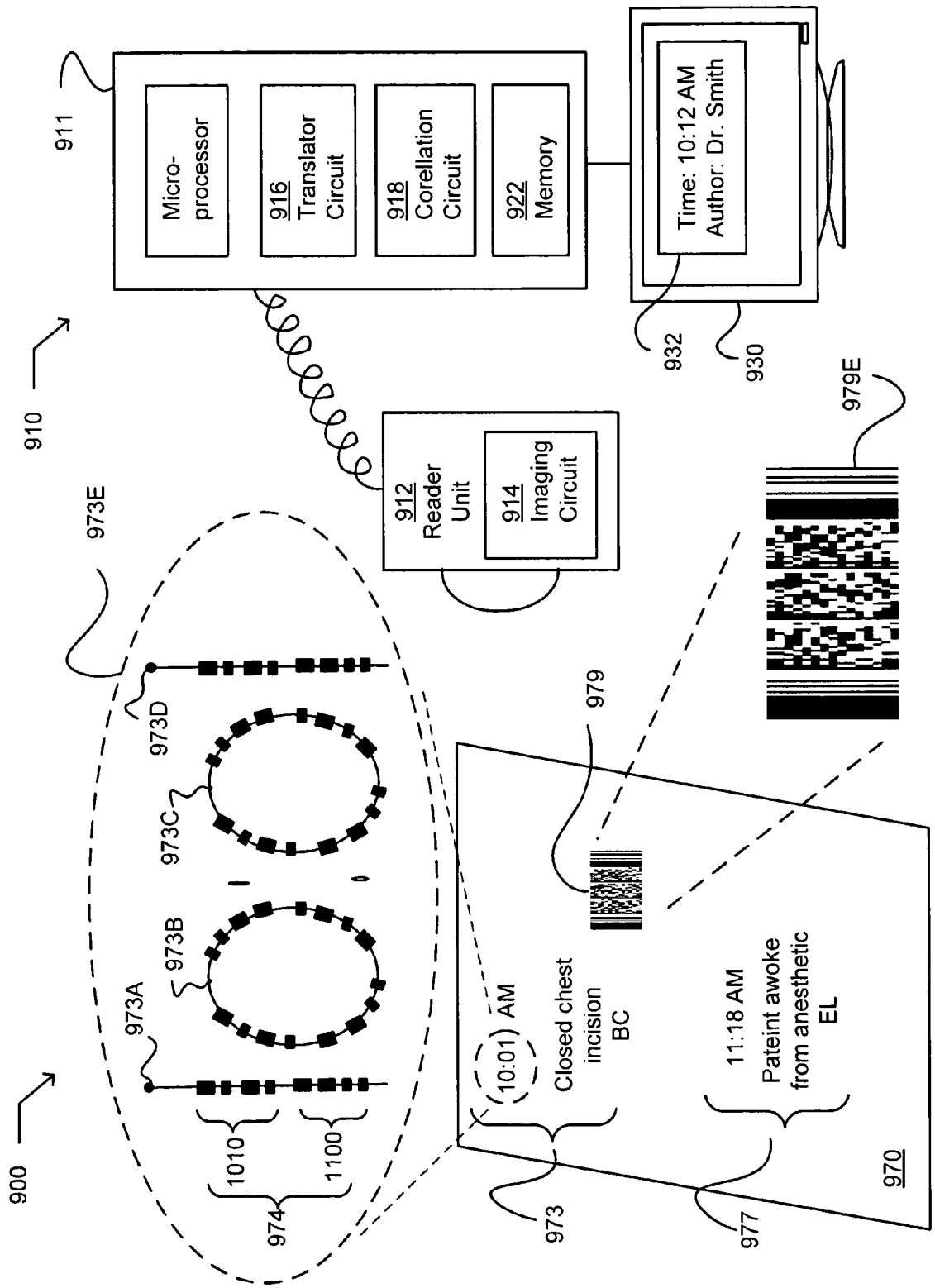
FIG. 16 illustrates an exemplary environment in which embodiments may be implemented.

FIG. 16 illustrates an exemplary environment 900 in which embodiments may be implemented. The environment includes a device 910 and a surface 970. The surface 970 includes instances of digital information encoded in a hand-formed expression formed on a surface by a handheld writing device. In an illustrative embodiment, instance 973 includes a hand-formed expression "10:01 AM Closed chest incision" followed by initials "BC." A portion of the hand-formed expression "10:01 AM" is enlarged instance "10:01" (973E). Enlarged instance 973E illustrates the digital information encoded in the hand-formed expression "10:01 AM," as binary digital information 1010 1100 (974). The encoded digital information corresponds to a time when the expression was formed on the surface by handheld writing device. Instance 977 includes a hand-formed expression "11:18 AM Patient awoke from anesthetic" followed by initials "EL." Instance 973 and/or instance 977 may have been formed by the manual device 210 described in conjunction with FIG. 3, the manual device 310 described in conjunction with FIG. 4, the apparatus 610 described in conjunction with FIG. 10, the handheld writing device 801 described in conjunction with FIG. 15, the manual device 1210 described in conjunction with FIG. 20, the device 1401 described in conjunction with FIG. 26, the manual device 1510 of FIG. 27, the device 1701 described in conjunction with FIG. 33, and/or the device 1900 described in conjunction with FIG. 39. The surface also includes a two-dimensional mark illustrated by a two-dimensional barcode 979, an enlargement of which is two-dimensional barcode 979E. The two dimensional mark may have been formed by one or more of the above devices or apparatus.

The device 910 includes an imaging circuit 914, a translator circuit 916, and a correlation circuit 918. The imaging circuit includes an imaging circuit operable to acquire digital information encoded in a hand-formed expression formed on a surface by a handheld writing device. The digital information corresponding to an environment of the handheld writing device when the expression was formed on the surface. The translator circuit includes a translator circuit operable to decode the digital information corresponding to an environment of the handheld writing device when the expression was formed on the surface. The translator circuit may be implemented in hardware, software, firmware, and/or a combination thereof. The correlation circuit includes a correlation circuit operable to generate a signal indicative of the environment of the handheld writing device when the expression was formed on the surface.

The device 910 is illustrated in an embodiment where a reader unit 912 is coupled to a body 911 that includes the translator circuit 916 and the correlation unit 918. In another embodiment of the device, these components may be included in a single physical enclosure, or at least two physical enclosures.

In an embodiment, the imaging circuit 914 further includes an imaging circuit operable to acquire digital information 974 encoded in a hand-formed expression formed by a handheld stylus moving on a surface 970. The digital information corresponding to an environment of the handheld stylus when the expression was formed on the surface. In another embodiment, the imaging circuit further includes an imaging circuit operable to acquire digital information encoded in a hand-formed expression formed by a substance deposited by a handheld writing device on a surface. The digital information corresponding to an environment of the handheld device when the substance was deposited on the surface. In a further embodiment, the imaging circuit further includes an imaging circuit operable to acquire digital information encoded in at least one of a line, grid, path, stroke, and/or spot hand-formed on a surface by a handheld writing device. The digital information corresponding to an environment of the handheld writing device when the at least one of a line, grid, path, stroke, and/or spot was formed on the surface.

In an embodiment, the imaging circuit 914 further includes an imaging circuit operable to acquire digital information 974 encoded in at least one of a line, grid, path, stroke, and/or spot hand-formed by a substance deposited on a surface 970 by a handheld writing device. The digital information corresponding to an environment of the handheld writing device when the substance was deposited on the surface. In another embodiment, the imaging circuit further includes an imaging circuit operable to acquire digital information encoded in a marking substance deposited on a surface by a handheld writing device. The digital information corresponding to an environment of the handheld writing device when the marking substance was deposited on the surface. In a further embodiment, the imaging circuit further includes an imaging circuit operable to acquire digital information encoded in at least one of a visible and/or invisible marking substance deposited on a surface by a handheld writing device. The digital information corresponding to an environment of the handheld writing device when the marking substance was deposited on the surface.

In an embodiment, the imaging circuit 914 further includes an imaging circuit operable to acquire digital information 974 encoded in a fluorescent substance deposited on a surface 970 by a handheld writing device. The digital information corresponding to an environment of the handheld writing device when the fluorescent substance was deposited on the surface. In another embodiment, the imaging circuit further includes an imaging circuit operable to acquire digital information encoded in a hand-formed expression formed on a surface of at least one of a container, a package, a living body, a human body, and/or an object by a handheld writing device. The digital information corresponding to an environment of the handheld writing device when the expression was formed on the surface. In a further embodiment, the imaging circuit further includes an imaging circuit operable to acquire digital information encoded in a hand-formed expression formed on at least one of a skin, layer, paper, metal, plastic, and/or composite surface by a handheld writing device. The digital information corresponding to an environment of the handheld writing device when the expression was formed on the surface.

In an embodiment, the imaging circuit 914 further includes an imaging circuit operable to acquire digital information 974 encoded in a hand-formed expression formed on a surface 970 by a handheld writing device. The digital information corresponding to an environment of the handheld writing device contemporaneous with the formation of the expression on the surface. In a further embodiment, the imaging circuit further includes an imaging circuit operable to acquire digital information encoded in a hand-formed expression formed on a surface by a handheld writing device. The digital information corresponding to an environment temporarily proximate to when the expression was formed on the surface.

In another embodiment, the translator circuit 916 further includes a translator circuit operable to decode the digital information 974 corresponding to at least one of a user context and/or an external context of the handheld writing device when the expression was formed on the surface 970. In an embodiment, the device 910 further includes a memory 922 configurable by a file that includes at least one correlation between an instance of encoded digital information and an environment of the handheld marking device. In a further embodiment, the device further includes a memory configurable by a file that includes at least one user established correlation between an instance of encoded digital information and an environment of the handheld marking device. In another embodiment, the device further includes a display 930 operable to broadcast a human viewable image 932 indicative of the environment of the handheld writing device when the expression was formed on the surface.

In use of an embodiment, the device 910 may be used to read instances of digital information encoded in a hand-formed line. In the illustrative embodiment described above, the surface 970 includes the hand-formed expression 973 "10:01 AM Closed chest incision" followed by initials "BC." The imaging circuit 914 of the reader unit 912 is used to acquire the digital information 974 encoded in a hand-formed expression indicative of the environment of the handheld writing device when the expression was hand-formed. The digital information includes the binary information 1010 1100 (974) and other information such as the identification of the person using the instrument to make the hand-formed expression (not shown). The translator circuit 916 decodes the binary information. The correlation circuit 918 generates a signal indicating that the environment of the handheld writing device when the expression was hand-formed includes a time of 10:12 AM and that the person holding the writing instrument was Dr. Smith. In another embodiment, the display 930 broadcasts a human viewable image 932 indicating the occurrence time as 10:12 AM and that the person holding the writing instrument was Dr. Smith. A person viewing the display may form an opinion about the accuracy of the hand-formed expression 973, and/or may inquire further of Dr. Smith about whether Dr. Smith uses the initials "BC" as a self-identifier when preparing patient records.

Figure 17:
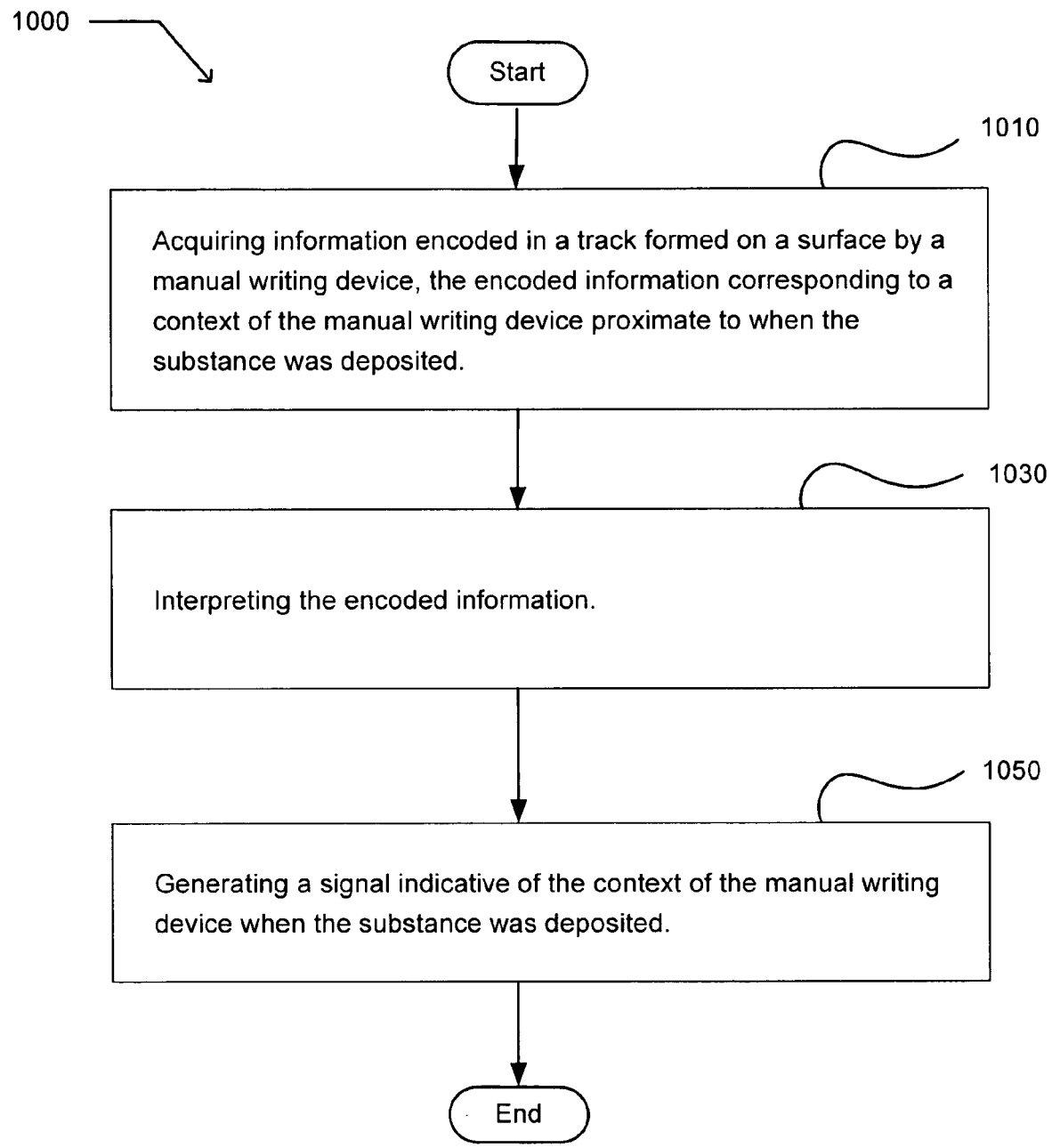
FIG. 17 illustrates an exemplary operational flow.

FIG. 17 illustrates an exemplary operational flow 1000 in which embodiments may be implemented. After a start operation, the operational flow moves to an obtaining operation 1010. The obtaining operation acquires information encoded in a track formed on a surface by a manual writing device. The encoded information corresponding to a context of the manual writing device proximate to when the substance was deposited. A decode operation 1030 interprets the encoded information. A communication operation 1050 generates a signal indicative of the context of the manual writing device when the substance was deposited. The operational flow then proceeds to an end operation.

Figure 18:
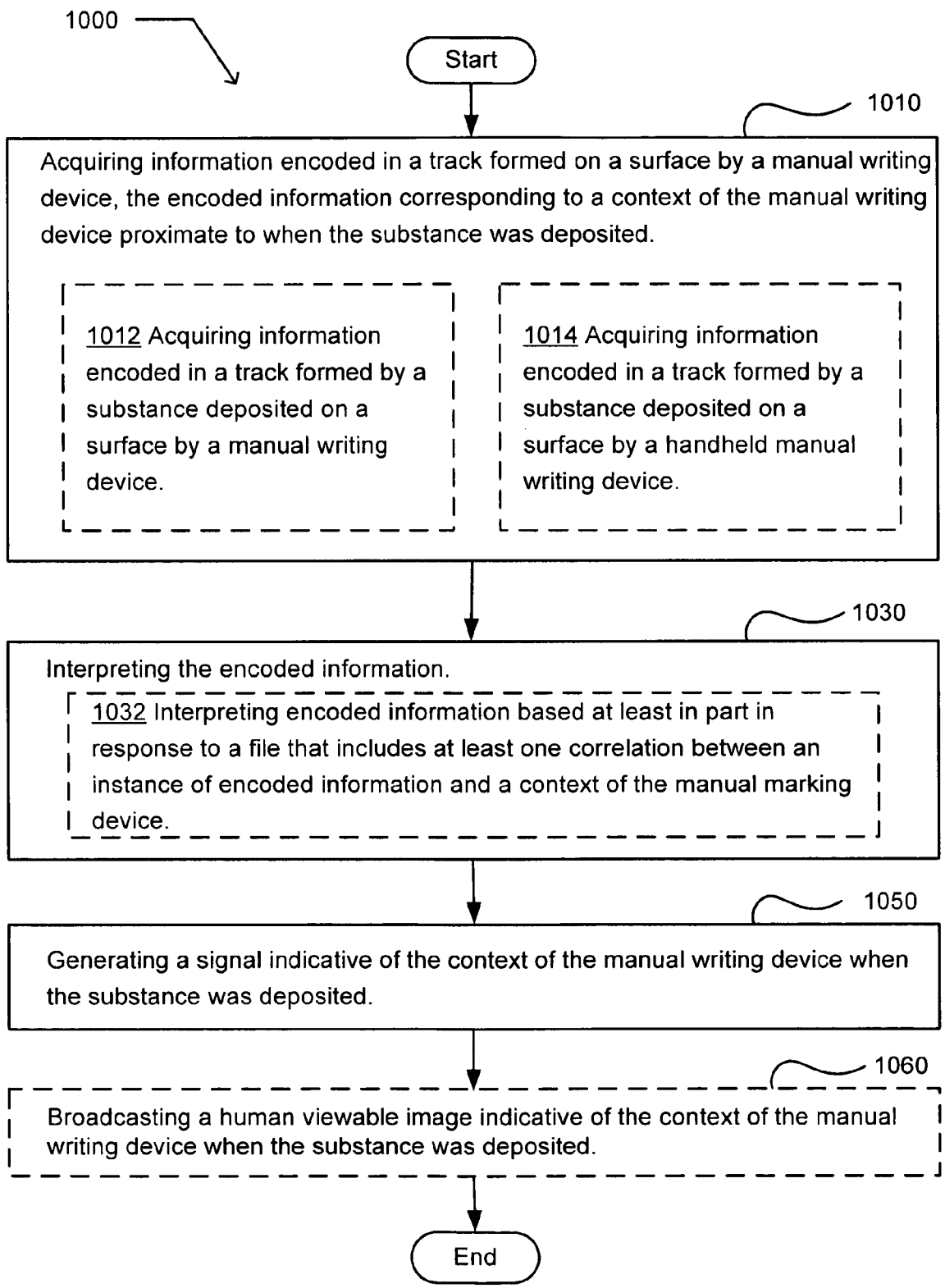
FIG. 18 illustrates an alternative embodiment of the exemplary operational flow of FIG. 17.

FIG. 18 illustrates an alternative embodiment of the exemplary operational flow 1000 of FIG. 17. The obtaining operation 1010 may include at least one additional operation. The at least one additional operation may include an operation 1012, and/or an operation 1014. The operation 1012 acquires information encoded in a track formed by a substance deposited on a surface by a manual writing device. The operation 1014 acquires information encoded in a track formed by a substance deposited on a surface by a handheld manual writing device. The decode operation 1030 may include at least one additional operation, such as an operation 1032. The operation 1032 interprets encoded information based at least in part in response to a file that includes at least one correlation between an instance of encoded information and a context of the manual marking device.

In an alternative embodiment, the exemplary operational flow 1000 includes broadcasting a human viewable image indicative of the context of the manual writing device when the substance was deposited 1060.

Figure 19:
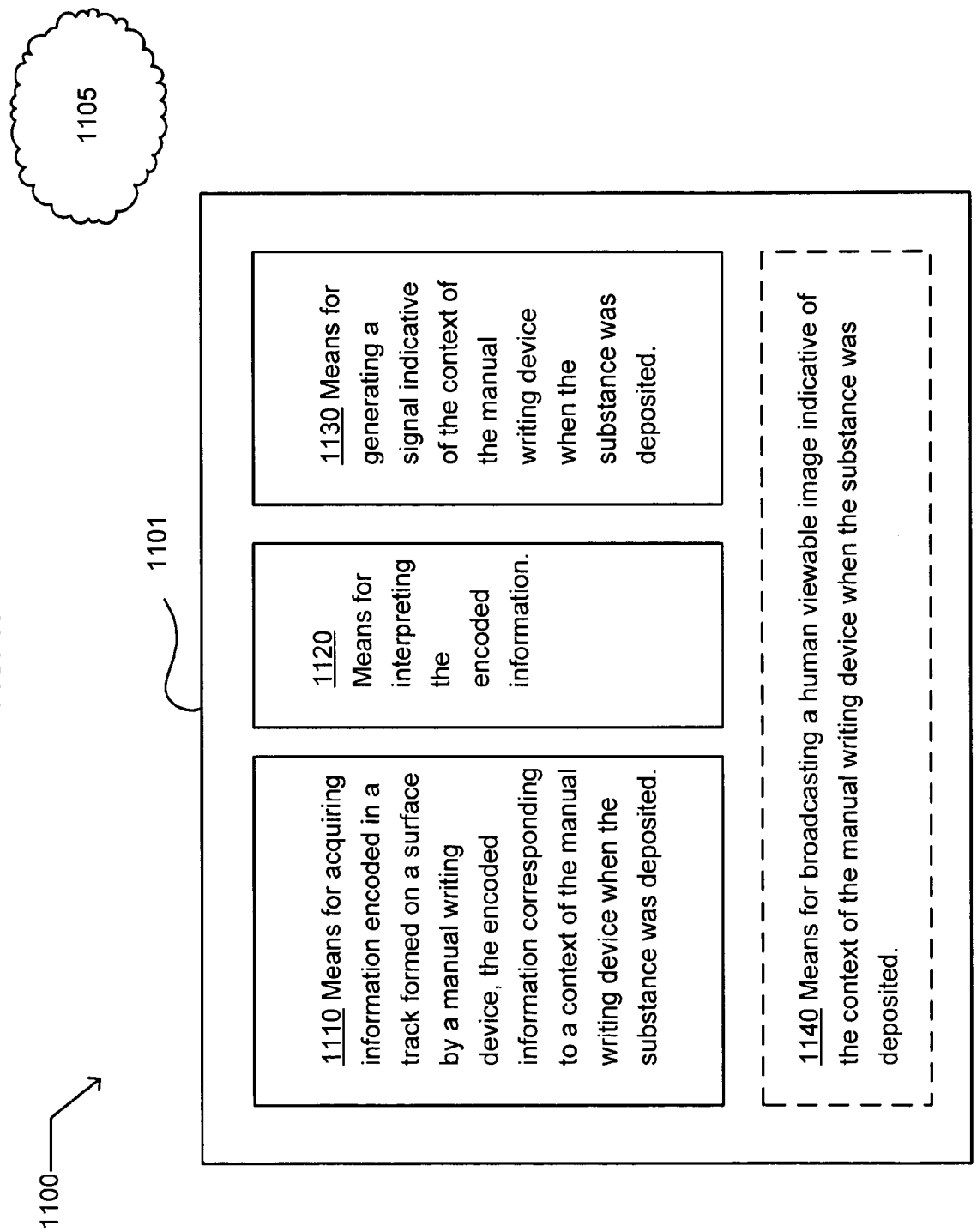
FIG. 19 illustrates an exemplary environment in which embodiments may be implemented.

FIG. 19 illustrates an exemplary environment 1000 in which embodiments may be implemented. The exemplary environment includes a device 1101 and a context 1105 of the device. The device includes means 1110 for acquiring information encoded in a track formed on a surface by a manual writing device. The encoded information corresponds to a context of the manual writing device when the substance was deposited. The device also includes means 1120 for interpreting the encoded information. The device further includes means 1130 for generating a signal indicative of the context of the manual writing device when the substance was deposited. In an alternative embodiment, the device further includes means 1140 for broadcasting a human viewable image indicative of the context of the manual writing device when the substance was deposited.

Figure 20:
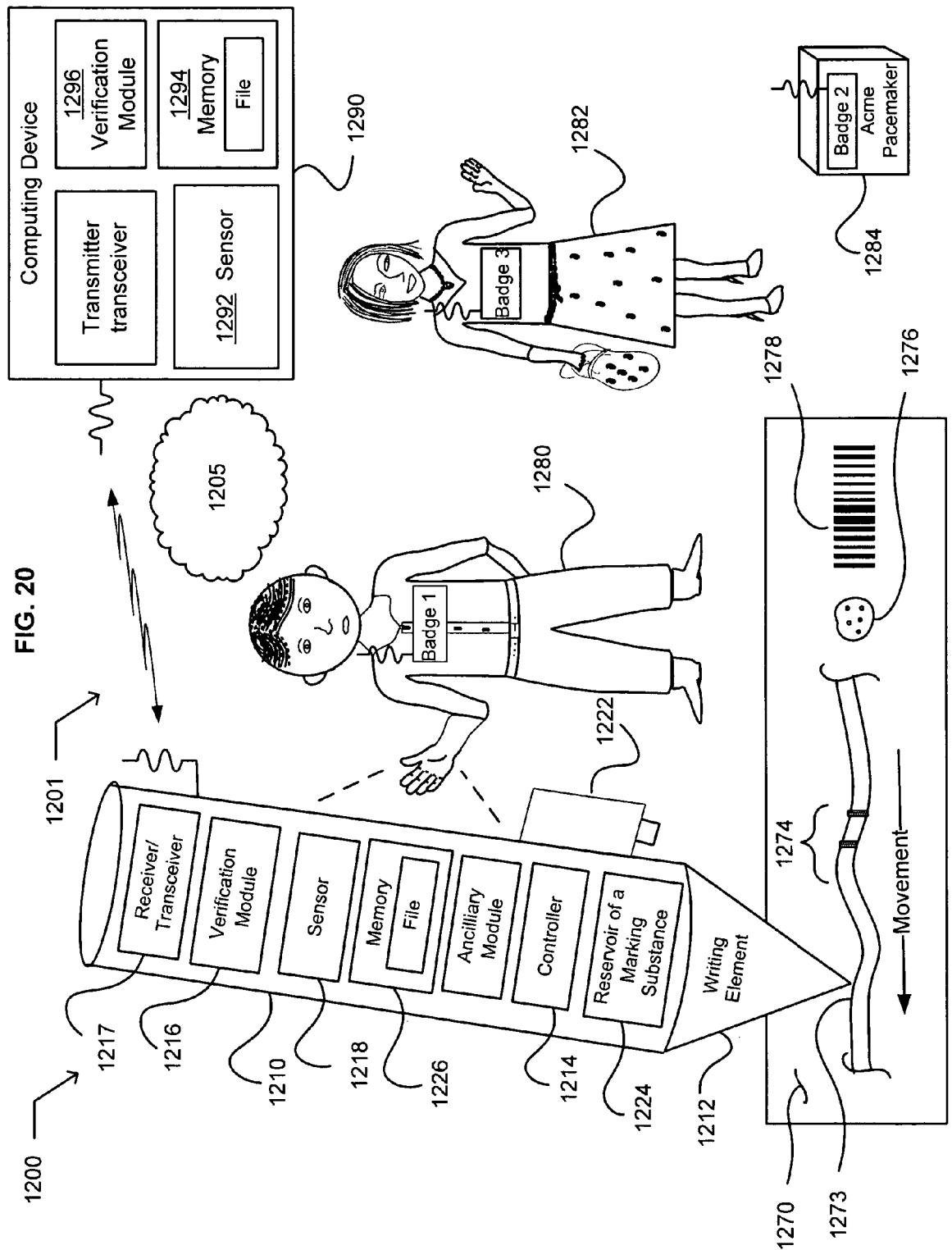
FIG. 20 illustrates an exemplary setting in which embodiments may be implemented.

FIG. 20 illustrates an exemplary setting 1200 in which embodiments may be implemented. The exemplary environment includes a system 1201 operable in an environment 1205 that includes at least one aspect. The system includes a manual device 1210, a sensor, illustrated as a sensor 1218 and/or a sensor 1292, and a verification module, illustrated as a verification module 1216 and/or a verification module 1296. In an embodiment, the system may include identification device, such as for example an RFID tags, illustrated as a Badge 1 worn by a human user 1280, a Badge 2 attached to object 1284, and/or a Badge 3 worn by a proximate human 1282.

The manual device 1210 includes a writing element 1212 operable to discharge a marking substance 1273 on a surface 1270 in response to a movement of the writing element upon the surface. The sensor 1218 and/or 1292 is operable to acquire information corresponding to an environment of the manual device. The verification module 1216 and/or 1296 is operable to determine a correspondence between a first aspect of the environment 1205 of the manual device and a second aspect of the environment of the manual device.

In an alternative embodiment, the manual device 1210 further includes a handheld manual device including a writing element 1212 operable to discharge a marking substance 1273 on a surface 1270 in response to a movement of the writing element upon the surface. In another embodiment, the manual device further includes a handheld electronic writing device including a writing element operable to discharge a marking substance on a surface in response to a movement of the writing element upon the surface. In a further embodiment, the manual device further includes a manual device including a writing element operable to discharge a marking substance on a surface in response to a movement of the writing element upon a surface of a body, a package, and/or an object.

In an embodiment, the manual device 1210 further includes a manual device including a writing element 1212 operable to discharge a marking substance 1273 on a surface 1270 in response to a movement of the writing element upon the surface and a controller 1214 operable to regulate the discharge of the marking substance. In an embodiment of the manual device including a controller, the manual device further includes a manual device including a writing element operable to discharge a marking substance on a surface in response to a movement of the writing element upon the surface and a controller operable to encode information 1274 corresponding to an environment 1205 of the manual device by regulating the discharge of the marking substance. In an embodiment of the immediately previous manual device, the manual device further includes a manual device including a writing element operable to discharge a marking substance on a surface in response to a movement of the writing element upon the surface. The manual device also further includes a controller operable to acquire a code useful in encoding information corresponding to an environment of the manual device and to encode the information corresponding to an environment of the manual device by regulating the discharge of the marking substance. For example, the controller may acquire the code from an information storage device, illustrated as a memory 1226, and/or a memory 1294. In a further embodiment of the manual device including a controller, the manual device further includes a manual device including a writing element operable to discharge a marking substance on a surface in response to a movement of the writing element upon the surface. The manual device also further includes a controller operable to inhibit the discharge of the marking substance if a condition is not met. For example, a discharge of the marking substance may be inhibited if a correspondence is not found between a sensor-acquired user identification and user-entered user identification. In another example, a discharge of the marking substance may be inhibited if no verification of a user identification occurs. In a further example, a discharge of the marking substance may be inhibited if a patient prescription is attempted to be entered in a drug order book by a provider whose sensed identification or self-entered identification does not correspond with a pre-designated attending physician or provider for the patient. Other conditions may include a marking for a surgical treatment not listed in a predesignated file of treatments or procedures for a patient, writing an order for a drug to which the patient is allergic. Another example may include writing a shipping address that does not correspond to a preauthorized shipping address saved in a memory device.

In an embodiment, the manual device 1210 further includes a manual device including a writing element 1212 operable to discharge a marking substance 1273 on a surface 1270 in response to a movement of the writing element upon the surface. The manual device also includes the sensor 1218 operable to acquire information corresponding to an environment 1205 of the manual device.

In another embodiment, the system 1201 further includes an electronic device 1290 that includes the sensor 1292 operable to acquire information 1274 corresponding to an environment 1205 of the manual device. In an embodiment, the electronic device may include the thin computing device 20 of FIG. 1. In another embodiment, the electronic device may include the computing device 110 of FIG. 2. In another embodiment, the sensor 1218 and/or 1292 further includes a sensor operable to acquire information corresponding to at least one of time, location, global position, acceleration, temperature, user identification and/or user data environment of the manual device. In a further embodiment, the sensor further includes a sensor operable to acquire information corresponding to at least one of a characteristic of a human touching the manual device, a characteristic of a human proximate to the manual device, and/or a characteristic of a physical object proximate to manual device. For example, a characteristic may include a name and/or identification of a human.

In an embodiment, the sensor 1218 and/or 1292 further includes a sensor including an imaging element 1222 operable to acquire information corresponding to a visual and/or acoustical aspect of the surface 1270. In another embodiment, the sensor further includes a sensor operable to acquire information from at least one of a radio frequency identification tag, a passive radio frequency identification tag, a semi-passive radio frequency identification tag, and/or an active radio frequency identification tag. In a further embodiment, the sensor further includes a sensor operable to acquire information from a radio frequency identification device associatable with at least one of a human 1280, 1282, and/or an object 1284. In another embodiment, the sensor further includes a sensor operable to acquire information corresponding to an environment of the manual device and wirelessly transmit the acquired information to the manual device 1210.

In an embodiment, the manual device 1210 further includes a manual device including a writing element 1212 operable to discharge a marking substance 1273 on a surface 1270 in response to a movement of the writing element upon the surface. The manual device also further includes the memory 1226 configurable by a file that includes data useful in a verification of the environment 1205 of the manual device. In another embodiment, the manual device surface further includes a manual device including a the memory 1226 configurable by a file that includes data useful in a verification of the environment of the manual device. The manual device also further includes the sensor 1218 operable to acquire information corresponding to the environment of the manual device.

In an embodiment, the system 1200 further includes a computing device 1290 that includes the memory 1294 configurable by a file that includes data useful in a verification of the environment 1205 of the manual device 1210. The computing device is operable to communicate wirelessly with the manual device. The computing device further includes the sensor 1292 operable to acquire information corresponding to the environment of the manual device. In an embodiment, the computing device may include the thin computing device 20 of FIG. 1. In another embodiment, the computing device may include the computing device 110 of FIG. 2.

In an embodiment, the storage device 1226 and/or 1294 further includes a storage device configurable by a file that includes at least one instance of an aspect of the environment 1205 of the manual device 1210 and a code indicative of the environment of the manual marking device. In another embodiment, the storage device further includes a storage device configurable by a file that includes at least one instance of medical information corresponding to a patient. In a further embodiment, the storage device further includes a storage device configurable by a patient medical information file that includes at least one instance of an identification of an attending physician, an identification of an ancillary physician, a treatment plan, a patient prescription, and/or a medical image corresponding to the patient. In another embodiment, the storage device further includes a storage device configurable by a file that includes at least one instance of a correspondence of a radio frequency identification device with a human and/or with an object associatable with the radio frequency identification device. In a further embodiment, the storage device further includes a storage device configurable by a file that includes data useful in a verification of a book, a shipping container, a package and/or an object that includes the surface.

In an embodiment, the verification module 1216 and/or 1296 further includes a verification module operable to authenticate a user by determining a correspondence between a user-entered identification aspect of the environment 1205 and a sensor-acquired information corresponding to a user aspect of the environment of the manual device 1210. In another embodiment, the verification module further includes a verification module operable to determine a correspondence between an aspect of the surface 1270 bearing a mark formed by the discharge of the marking substance 1273 upon the surface in response to a movement of the writing element 1212 with data in a file that includes an indication of a predetermined surface to be marked by the manual device. For example, a surgeon may use the manual device to form a presurgery mark on a skin surface over a patient's right kidney for removal. The verification module determines a correspondence between the surgeon's presurgery mark and data in a file indicating that a skin surface over the patient's left kidney is to be marked for removal of the left kidney. In this example, a no-verification notification may be provided by the system 1201 indicative that a wrong kidney was marked for removal. In a further embodiment, the verification module further includes a verification module operable to determine a correspondence between an aspect of the surface and information embodied in a mark formed on the surface by the manual marking device.

Figure 21:
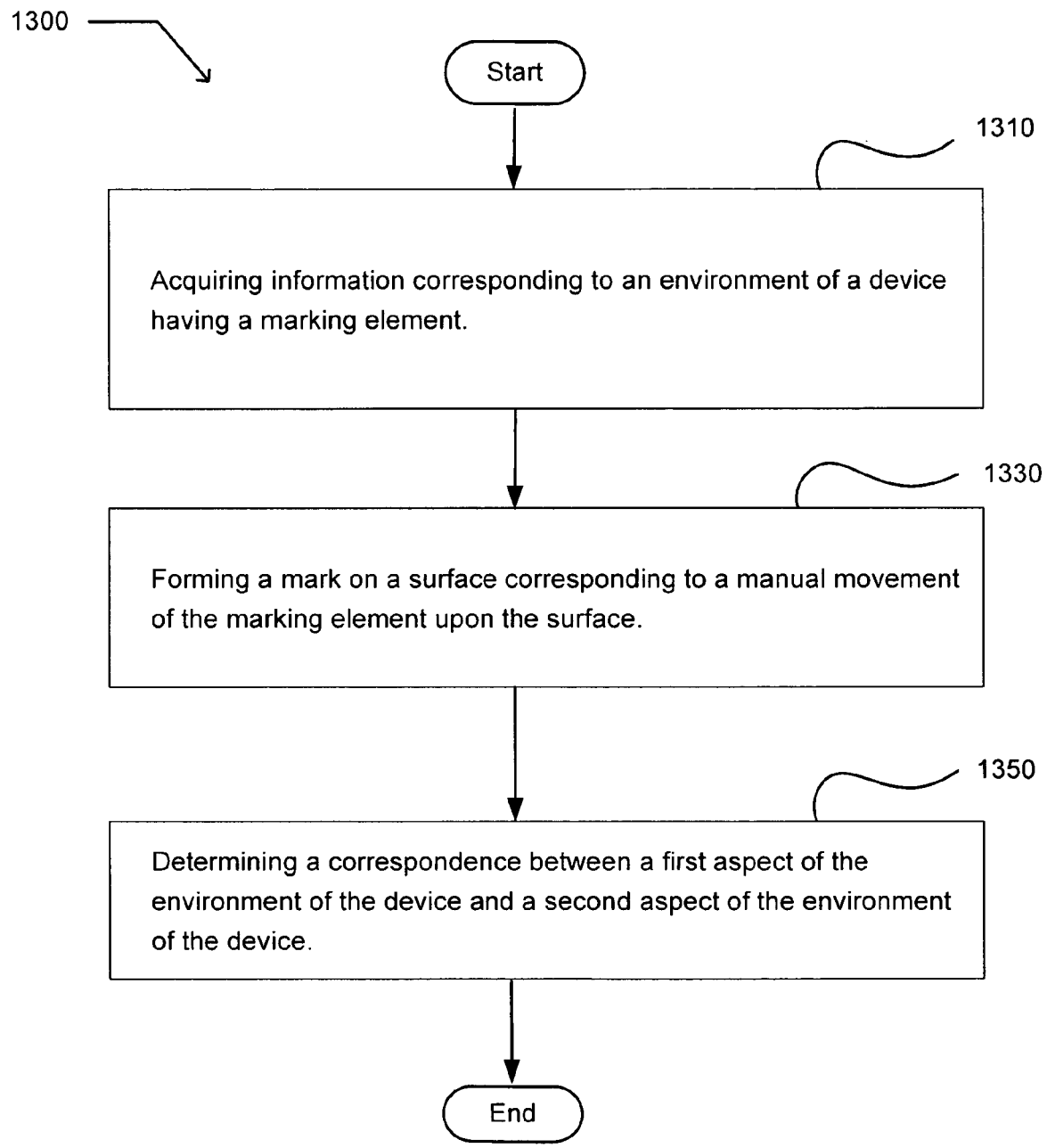
FIG. 21 illustrates an exemplary operational flow in which embodiments may be implemented.

FIG. 21 illustrates an exemplary operational flow 1300 in which embodiments may be implemented. After a start operation, the operational flow includes a receiving operation 1310. The receiving operation acquires information corresponding to an environment of a device having a marking element. A writing operation 1330 forms a mark on a surface corresponding to a manual movement of the marking element upon the surface. A verification operation 1350 determines a correspondence between a first aspect of the environment of the device and a second aspect of the environment of the device. The operational flow then moves to an end operation.

Figure 22:
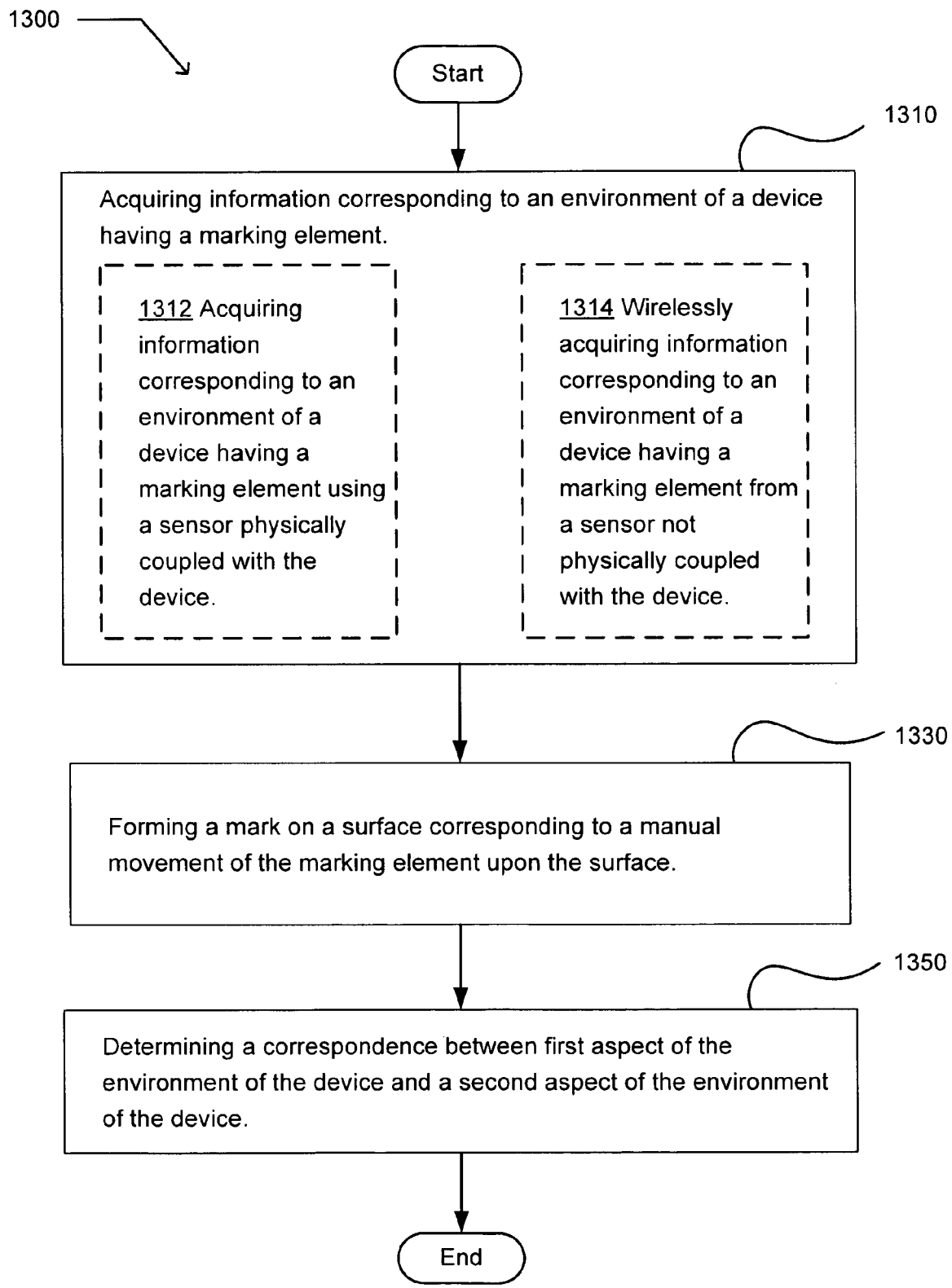
FIG. 22 illustrates an alternative embodiment of the exemplary operational flow of FIG. 23.
Figure 23:
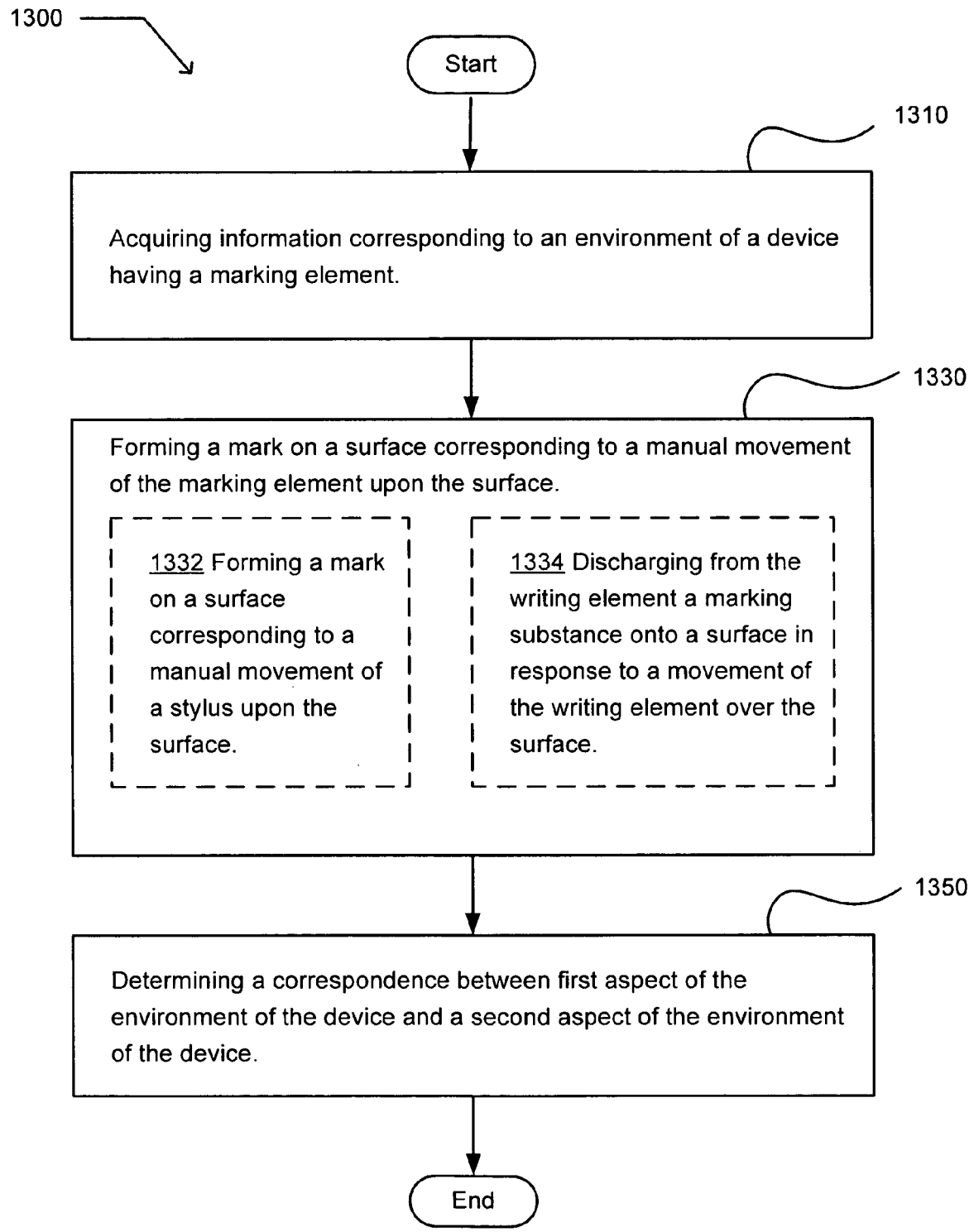
FIG. 23 illustrates another alternative embodiment of the exemplary operational flow of FIG. 22.

FIG. 22 illustrates an alternative embodiment of the exemplary operational flow 1300 of FIG. 23. The receiving operation 1310 may include at least one additional operation. The at least one additional operation may include an operation 1312 and/or an operation 1314. The operation 1312 acquires information corresponding to an environment of a device having a marking element using a sensor physically coupled with the device. The operation 1314 wirelessly acquires information corresponding to an environment of a device having a marking element from a sensor not physically coupled with the device.

FIG. 23 illustrates another alternative embodiment of the exemplary operational flow 1300 of FIG. 22. The writing operation 1330 may include at least one additional operation. The at least one additional operation may include an operation 1332 and/or an operation 1334. The operation 1332 forms a mark on a surface corresponding to a manual movement of a stylus upon the surface. The operation 1334 discharges from the writing element a marking substance onto a surface in response to a movement of the writing element over the surface.

Figure 24:
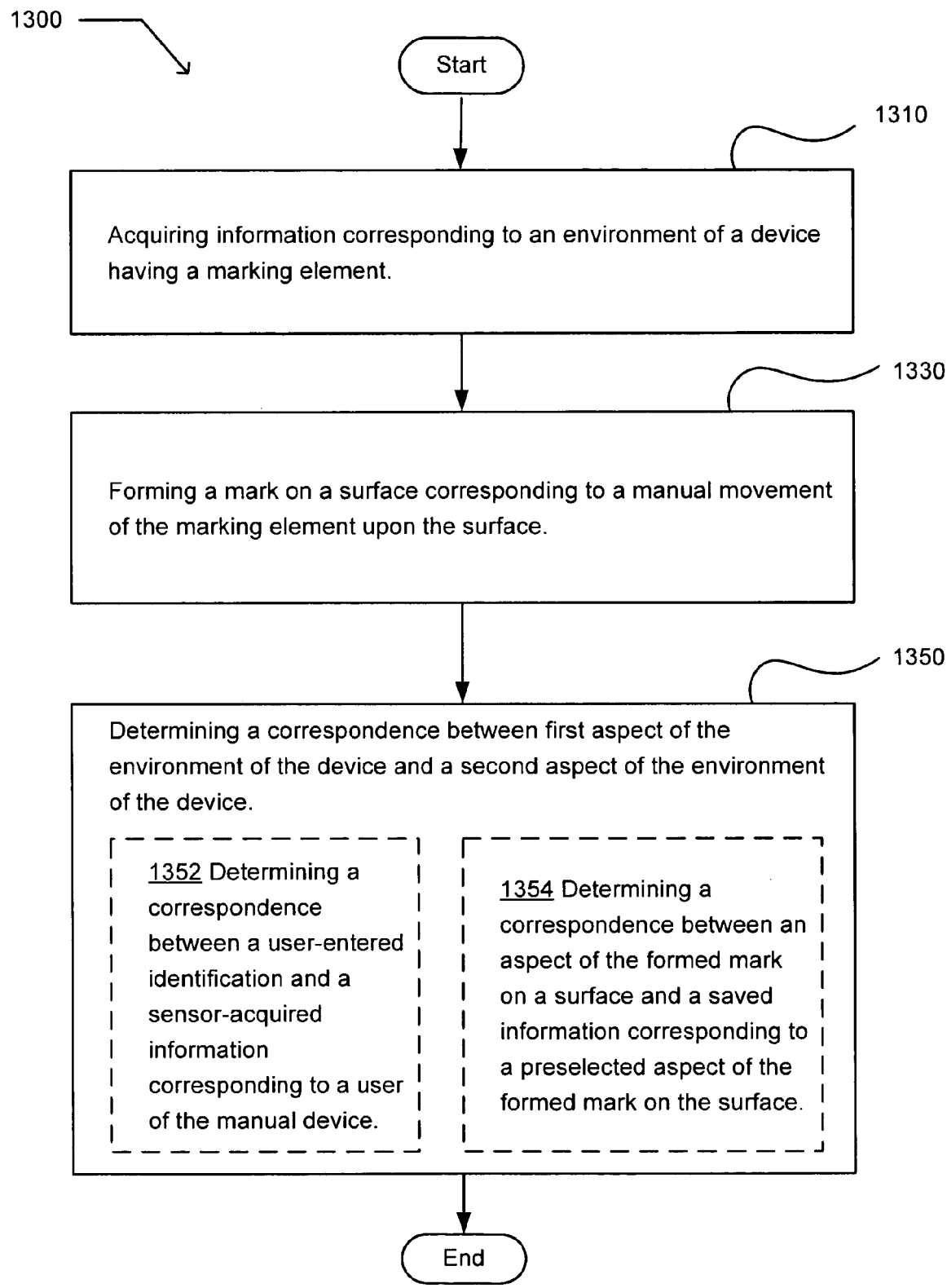
FIG. 24 illustrates a further embodiment of the exemplary operational flow of FIG. 23.

FIG. 24 illustrates a further embodiment of the exemplary operational flow 1300 of FIG. 23. The verification operation 1350 may include at least one additional operation. The at least one additional operation may include an operation 1352 and/or an operation 1354. The operation 1352 determines a correspondence between a user-entered identification and a sensor-acquired information corresponding to a user of the manual device. The operation 1354 determines a correspondence between an aspect of the formed mark on a surface and a saved information corresponding to a preselected aspect of the formed mark on the surface. For example, the aspect of the formed mark may include a surgeon's pre-surgery mark over a left kidney and the saved information may include an operating plan designating the left kidney for surgical treatment.

Figure 25:
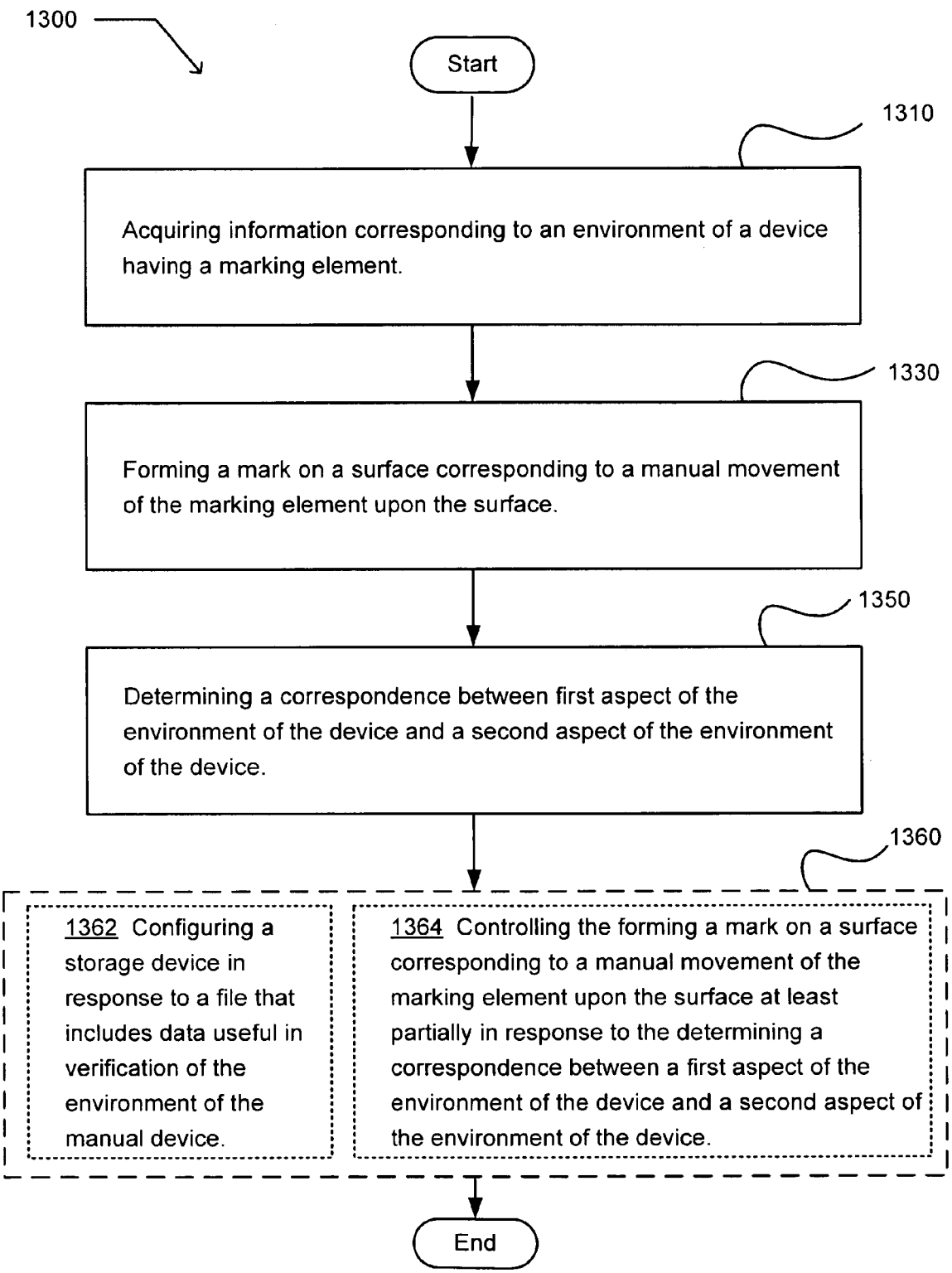
FIG. 25 illustrates another alternative embodiment of the exemplary operational flow of FIG. 23.

FIG. 25 illustrates another alternative embodiment of the exemplary operational flow 1300 of FIG. 23. The exemplary operational flow may include at least one additional operation 1360. The at least one additional operation may include an operation 1362 and/or an operation 1364. The operation 1362 configures a storage device in response to a file that includes data useful in verification of the environment of the manual device. The operation 1364 controls the forming a mark on a surface corresponding to a manual movement of the marking element upon the surface at least partially in response to the determining a correspondence between a first aspect of the environment of the device and a second aspect of the environment of the device.

Figure 26:
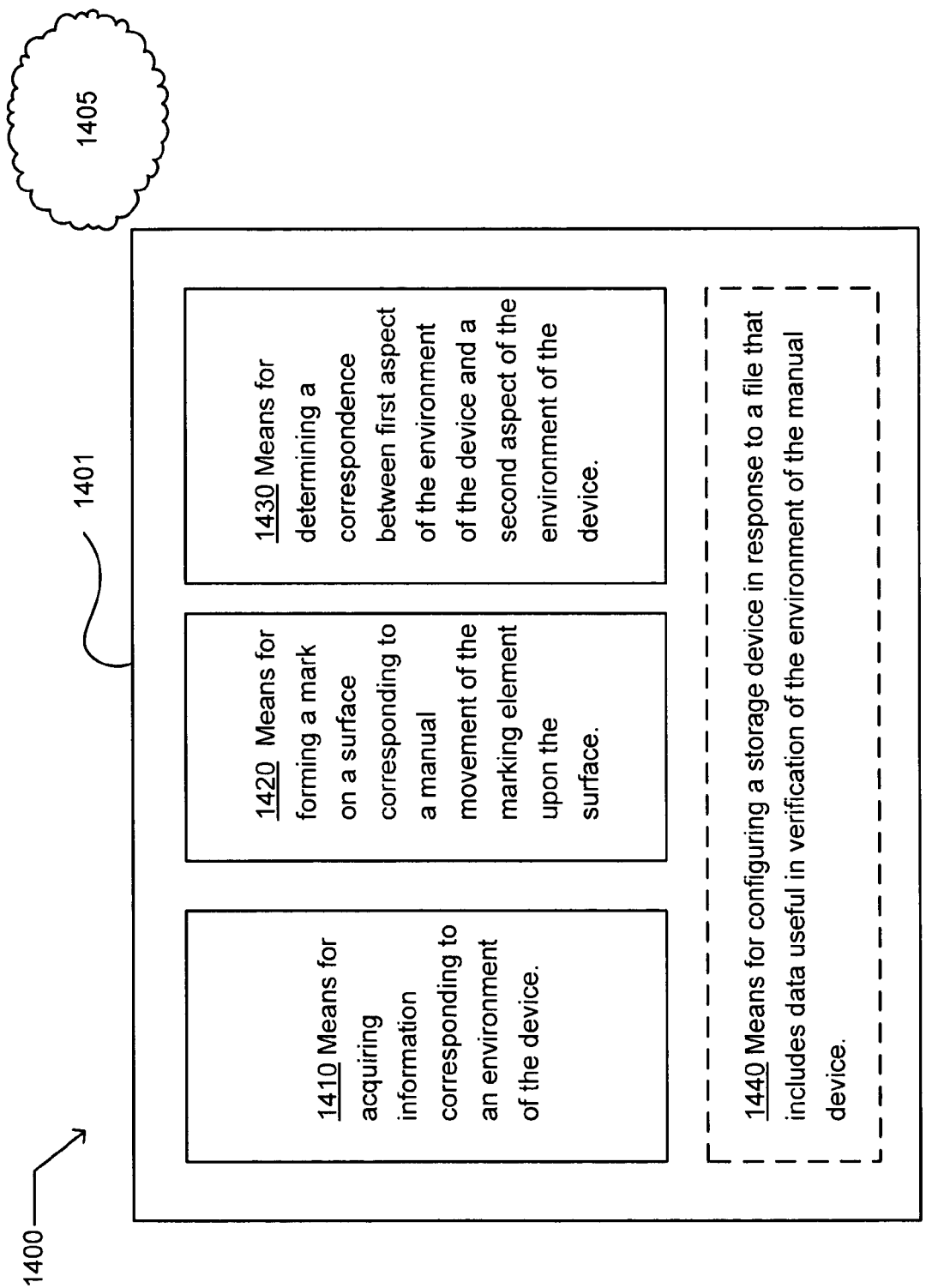
FIG. 26 illustrates an exemplary setting in which embodiments may be implemented.

FIG. 26 illustrates an exemplary setting 1400 in which embodiments may be implemented. The exemplary setting includes a device 1401 having a marking element and an environment 1405 of the device. The device includes means 1410 for acquiring information corresponding to the environment of the device. The device also includes means 1420 for forming a mark on a surface corresponding to a manual movement of the marking element upon the surface. The device further includes means 1430 for determining a correspondence between first aspect of the environment of the device and a second aspect of the environment of the device. In an alternative embodiment, the device further includes means 1440 for configuring a storage device in response to a file that includes data useful in verification of the environment of the manual device.

Figure 27:
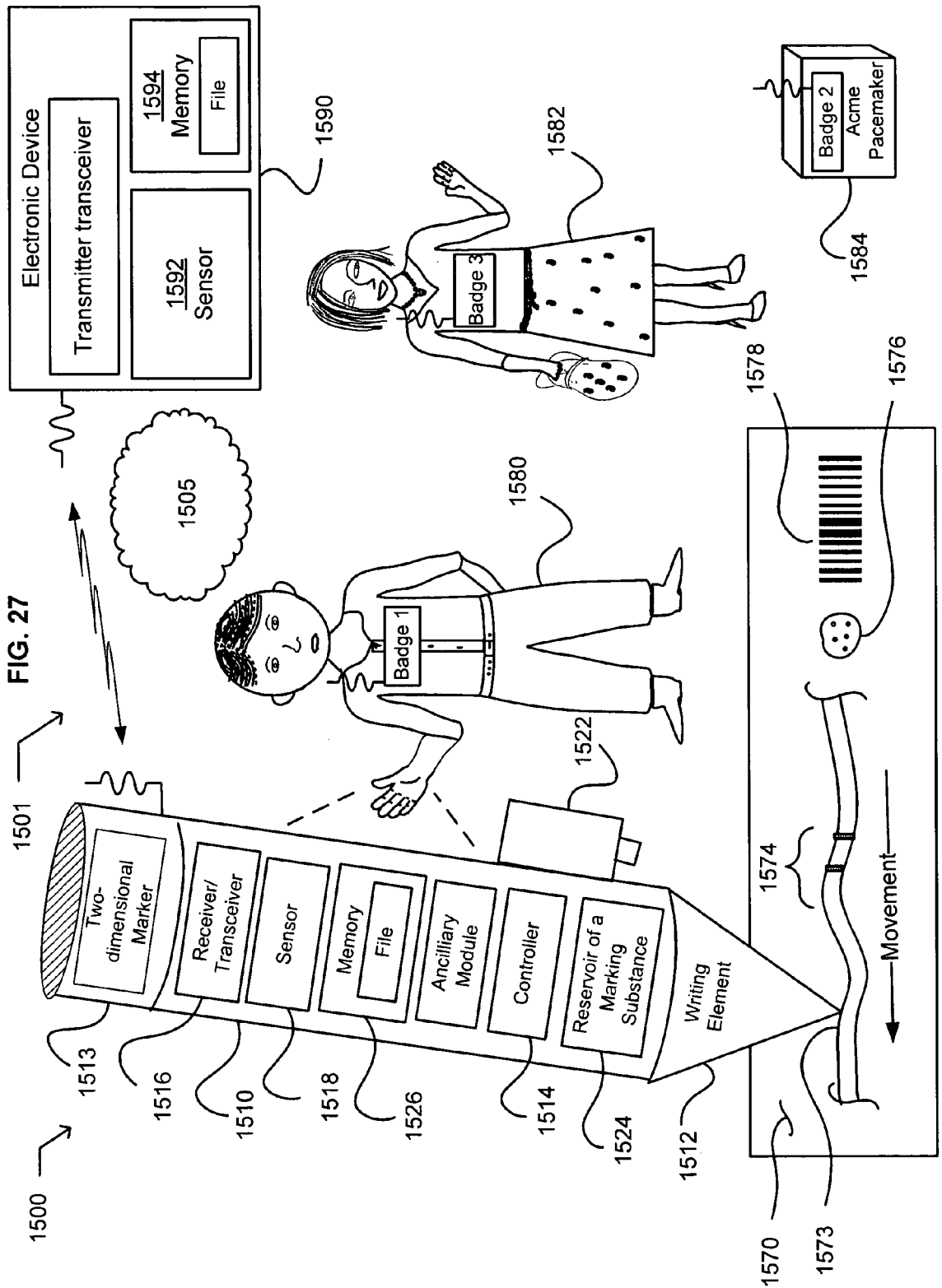
FIG. 27 illustrates an exemplary setting in which embodiments may be implemented.

FIG. 27 illustrates an exemplary setting 1500 in which embodiments may be implemented. The exemplary setting includes a system 1501 and an environment 1505 in which the system may operate. The system includes a manual device 1510, which further includes a first writing element illustrated as a writing element 1512, a second writing element illustrated as a two-dimensional marker 1513, and a controller 1514. The system also includes a sensor, illustrated as at least one of a sensor 1518 and a sensor 1592.

The first writing element 1512 is operable to discharge a first marking substance 1573 on a surface 1570 in response to a manual movement of the first writing element upon the surface. The second writing element 1513 is operable to discharge a second marking substance, illustrated as at least one of second marking substance 1574, 1576, and/or 1578 on the surface in response to the controller 1514. The controller is operable to encode information corresponding to the environment 1505 of the manual device by regulating a discharge of the second marking substance. The sensor, illustrated as at least one of a sensor 1518, and/or a sensor 1592 is operable to acquire data indicative of an environment of the manual device.

In an embodiment, the second writing element 1513 further includes a second writing element operable to discharge a second marking substance 1576, 1578 on the surface 1570 in response to a controller 1514 and in response to another manual movement. For example, the another manual movement of the device 1510 may include any manual movement. A manual movement may include a tap, a swipe, and/or a turning the manual device over and swiping the two-dimensional marker 1513 portion across the surface.

In an embodiment, the sensor (1518, 1592) further includes a sensor operable to acquire data indicative of at least one of time, location, global position, acceleration, temperature, user identification and/or user data. In another embodiment, the sensor 1592 further includes a sensor operable to acquire data indicative of the environment 1505 of the manual device 1510. The sensor also includes a memory 1594 configurable by a file that includes data useful in characterizing the environment of the manual device.

In an embodiment, the system 1501 includes an electronic device 1590 that includes the sensor 1592 operable to acquire data indicative of an environment 1505 of the manual device 1510. In another embodiment, the electronic device may include the thin computing device 20 of FIG. 1. In a further embodiment, the electronic device may include the computing device 110 of FIG. 2. In another embodiment, the system includes an electronic device 1590 operable to wirelessly communicate with the manual device. This electronic device includes the sensor 1592 operable to acquire data indicative of an environment of the manual device. In a further embodiment, the system includes an electronic device that includes the sensor 1592 operable to acquire data indicative of an environment of the manual device. This electronic device also includes the memory 1594 configurable by a file that includes data useful in characterizing the environment of the manual device 1510.

In an embodiment, the manual device 1510 further includes the sensor 1518 operable to acquire data indicative of an environment 1505 of the manual device. In another embodiment, the manual device includes the sensor 1518 operable to acquire data indicative of an environment of the manual device and further includes the memory 1526 configurable by a file that includes data useful in characterizing the environment of the manual device. In a further embodiment, the manual device includes a first writing element 1512 spaced apart from a second writing element 1213. In another embodiment, the manual device includes a first writing element proximate to a second writing element.

Figure 28:
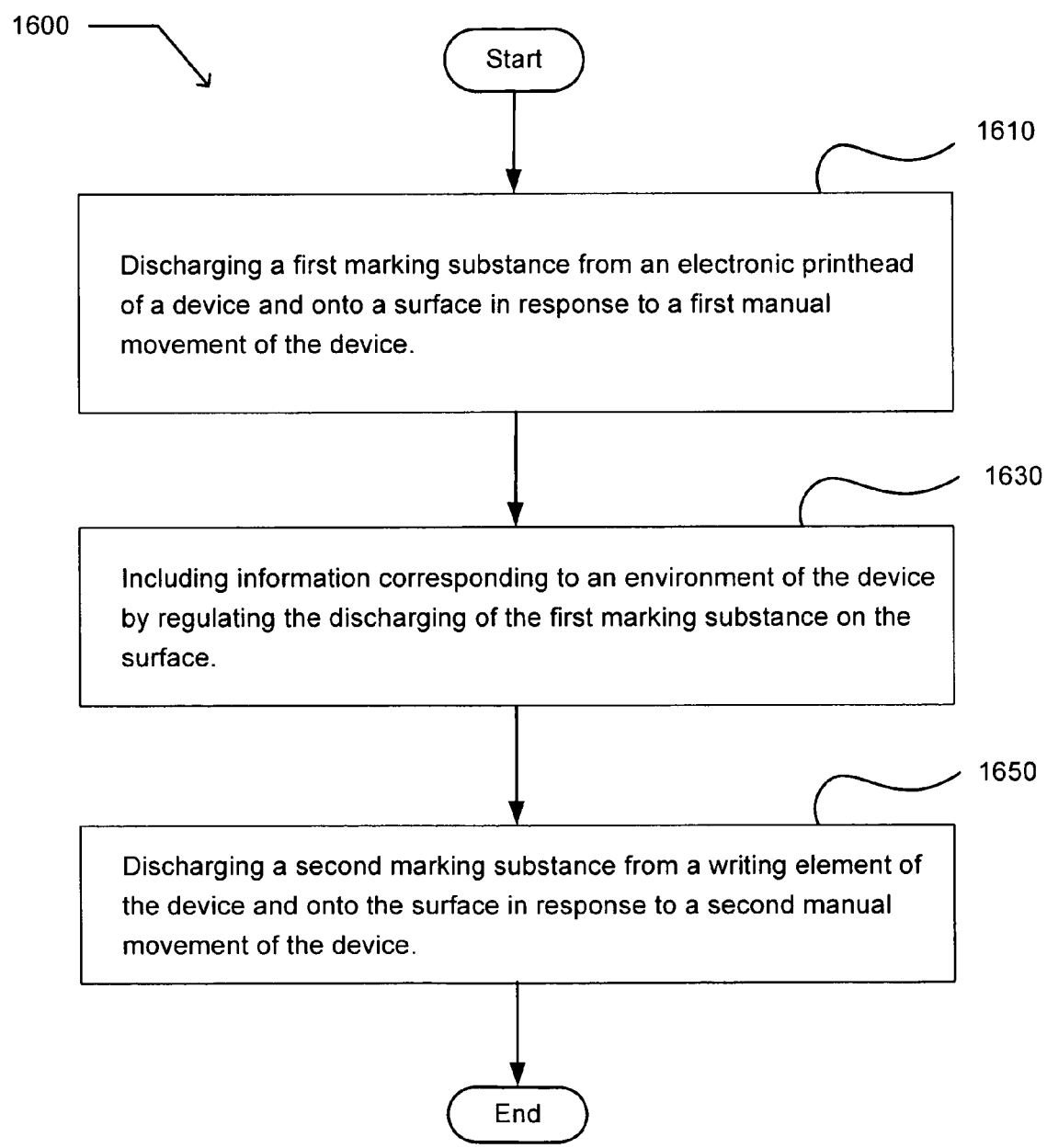
FIG. 28 illustrates an exemplary operational flow in which embodiments may be implemented.

FIG. 28 illustrates an exemplary operational flow 1600 in which embodiments may be implemented. After a start operation, the operational flow moves to a first writing operation 1610. The first writing operation discharges a first marking substance from an electronic printhead of a device and onto a surface in response to a first manual movement of the device. An insertion operation 1630 includes information corresponding to an environment of the device by regulating the discharging of the first marking substance on the surface. A second writing operation 1650 discharges a second marking substance from a writing element of the device and onto the surface in response to a second manual movement of the device. The operational flow then moves to an end operation.

Figure 29:
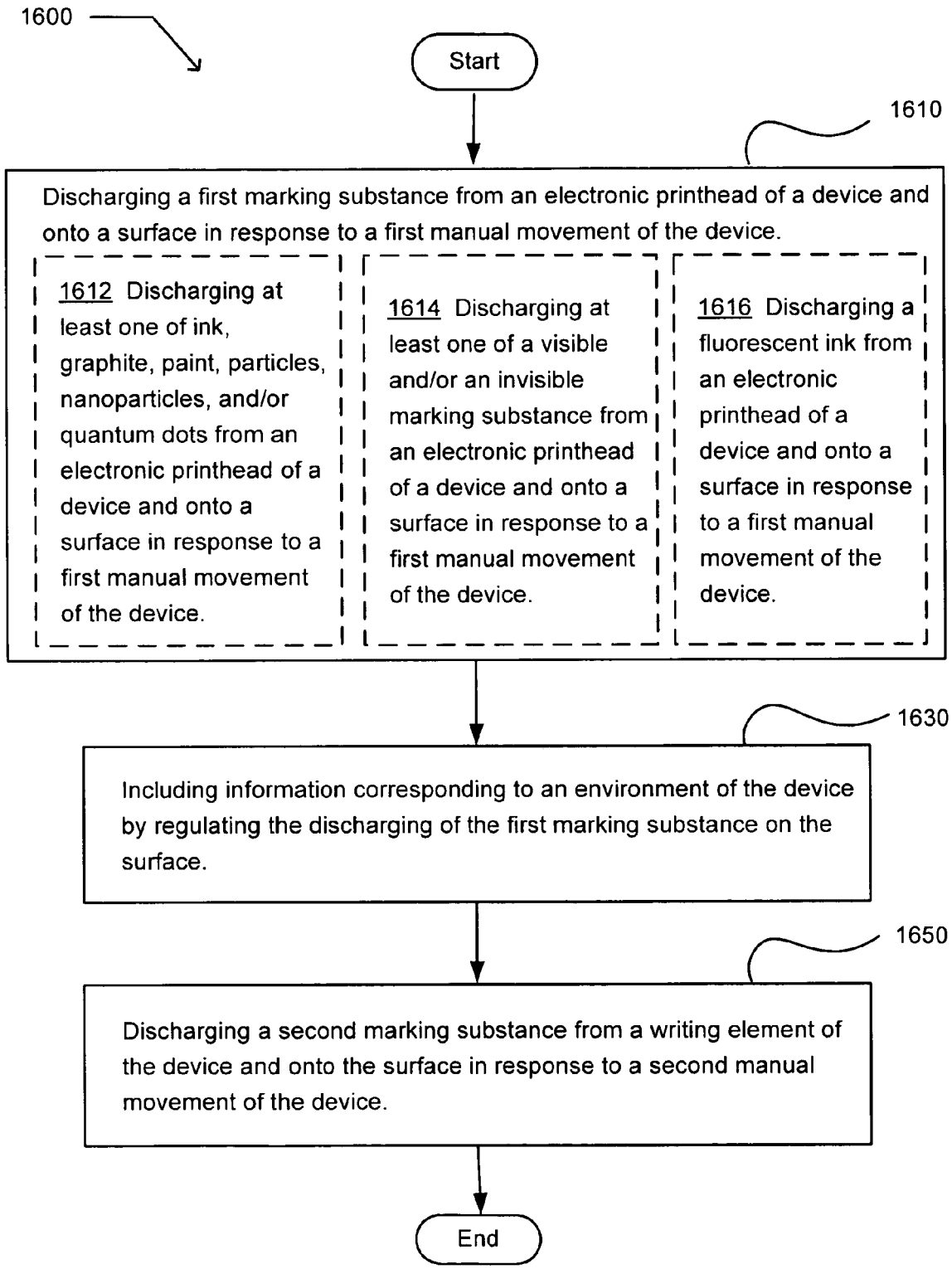
FIG. 29 illustrates an alternative embodiment of the exemplary operational flow of FIG. 28.

FIG. 29 illustrates an alternative embodiment of the exemplary operational flow 1600 of FIG. 28. The first writing operation 1610 may include at least one additional operation. The at least one additional operation may include an operation 1612, an operation 1614, and/or an operation 1616. The operation 1612 discharges at least one of ink, graphite, paint, particles, nanoparticles, and/or quantum dots from an electronic printhead of a device and onto a surface in response to a first manual movement of the device. The operation 1614 discharges at least one of a visible and/or an invisible marking substance from an electronic printhead of a device and onto a surface in response to a first manual movement of the device. The operation 1616 discharges a fluorescent ink from an electronic printhead of a device and onto a surface in response to a first manual movement of the device.

Figure 30:
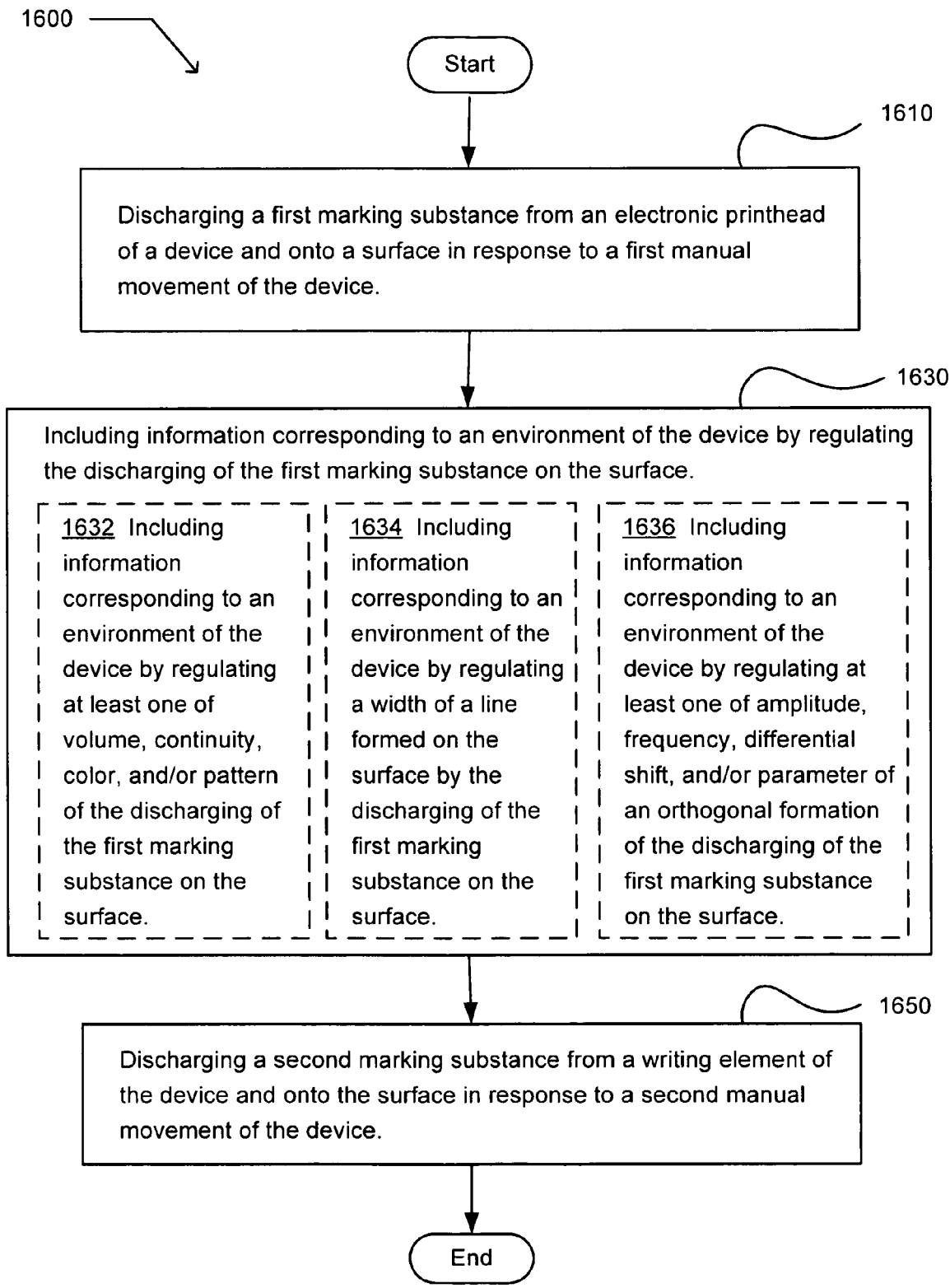
FIG. 30 illustrates another alternative embodiment of the exemplary operational flow of FIG. 28.

FIG. 30 illustrates another alternative embodiment of the exemplary operational flow 1600 of FIG. 28. The insertion operation 1630 may include at least one additional operation. The at least one additional operation may include an operation 1632, an operation 1634, and/or an operation 1636. The operation 1632 includes information corresponding to an environment of the device by regulating at least one of volume, continuity, color, and/or pattern of the discharging of the first marking substance on the surface. The operation 1634 includes information corresponding to an environment of the device by regulating a width of a line formed on the surface by the discharging of the first marking substance on the surface. The operation 1636 includes information corresponding to an environment of the device by regulating at least one of amplitude, frequency, differential shift, and/or parameter of an orthogonal formation of the discharging of the first marking substance on the surface.

Figure 31:
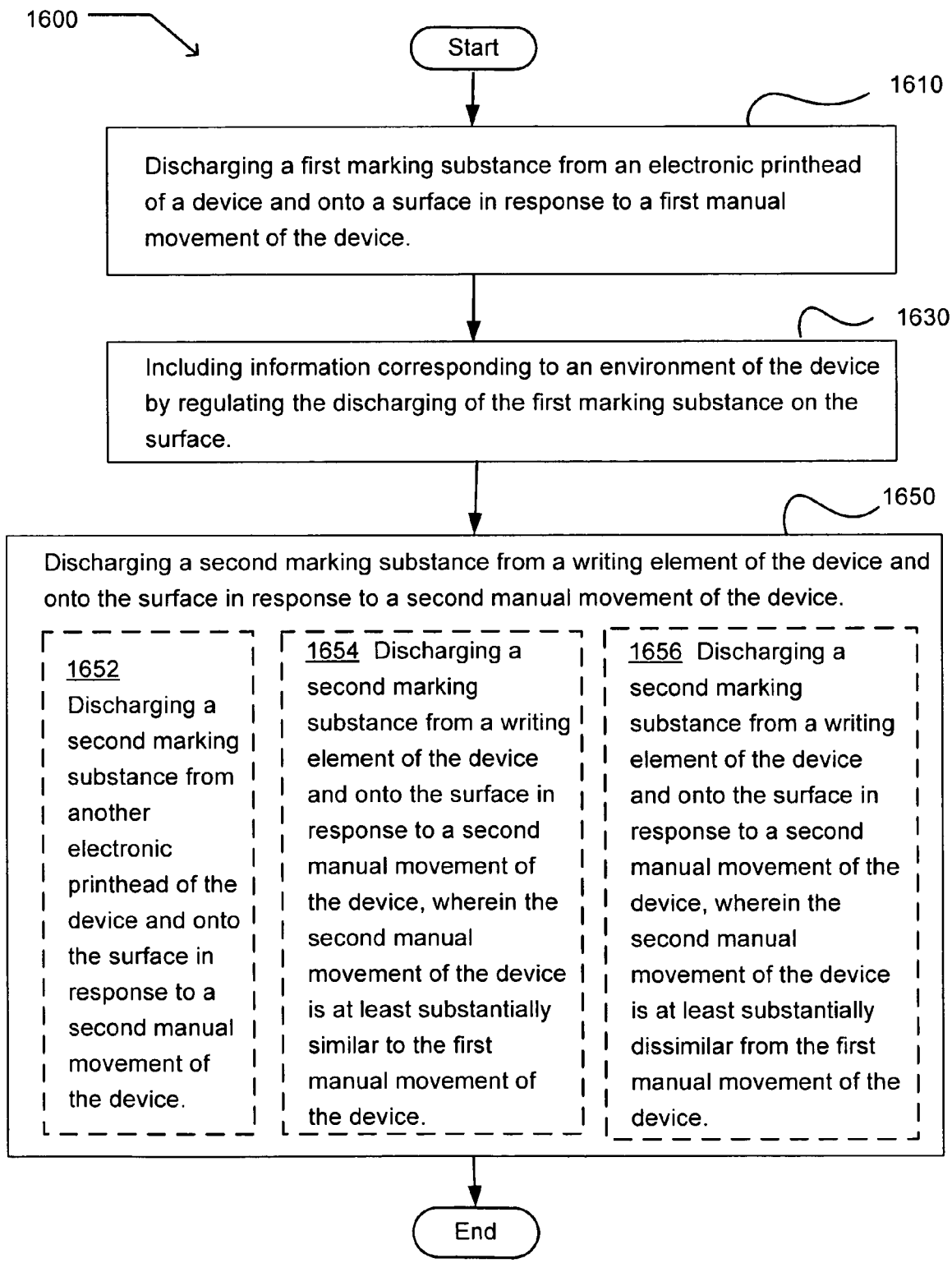
FIG. 31 illustrates a further alternative embodiment of the exemplary operational flow of FIG. 28.

FIG. 31 illustrates a further alternative embodiment of the exemplary operational flow 1600 of FIG. 28. The second writing operation 1650 may include at least one additional operation. The at least one additional operation may include an operation 1652, an operation 1654, and/or an operation 1656. The operation 1652 discharges a second marking substance from another electronic printhead of the device and onto the surface in response to a second manual movement of the device. The operation 1654 discharges a second marking substance from a writing element of the device and onto the surface in response to a second manual movement of the device, wherein the second manual movement of the device is at least substantially similar to the first manual movement of the device. The operation 1656 discharges a second marking substance from a writing element of the device and onto the surface in response to a second manual movement of the device, wherein the second manual movement of the device is at least substantially dissimilar from the first manual movement of the device.

Figure 32:
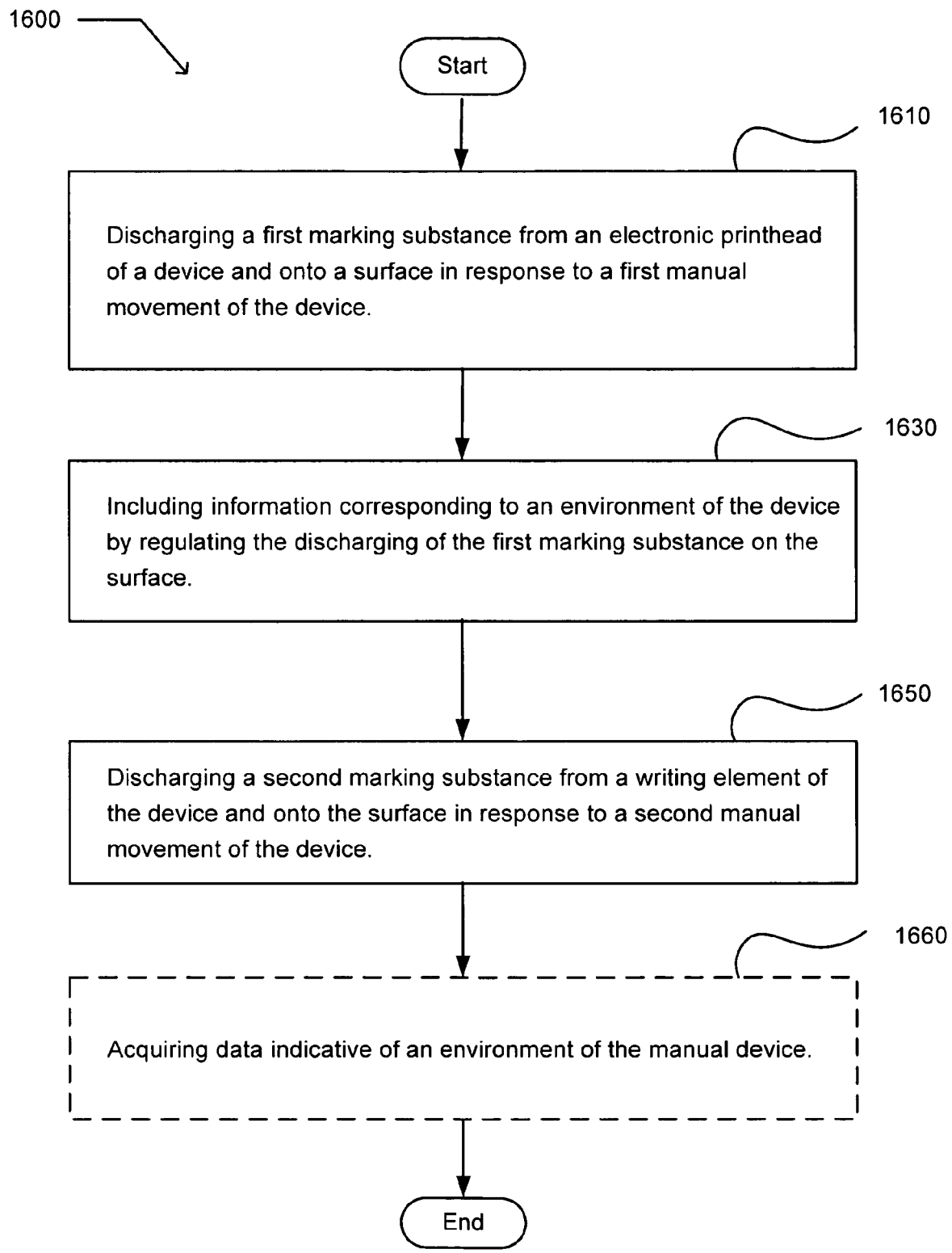
FIG. 32 illustrates another alternative embodiment of the exemplary operational flow of FIG. 28.

FIG. 32 illustrates another alternative embodiment of the exemplary operational flow 1600 of FIG. 28. The operational flow may include at least one additional operation, such as an accession operation. The accession operation 1660 acquires data indicative of an environment of the manual device.

Figure 33:
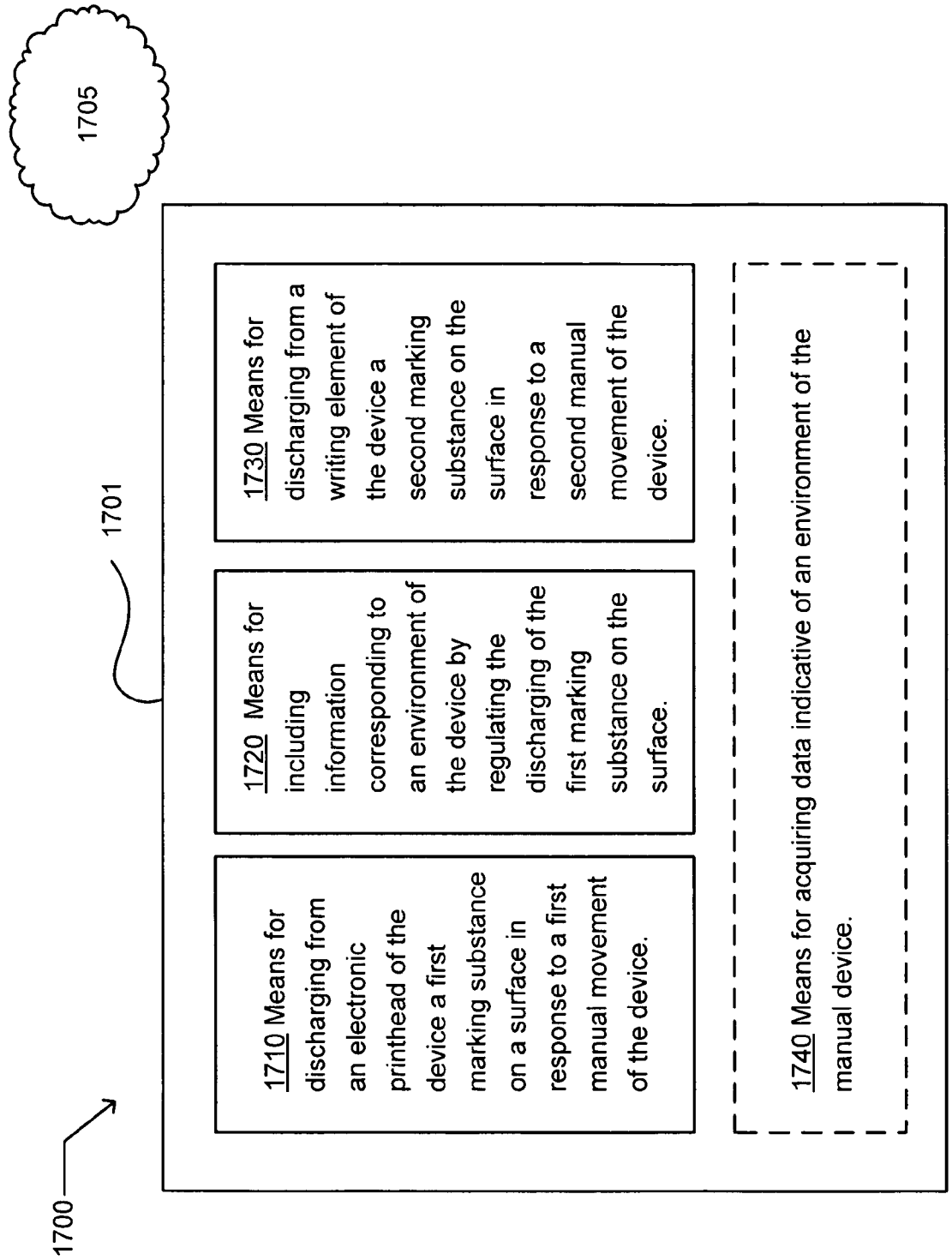
FIG. 33 illustrates an exemplary setting in which embodiments may be implemented.

FIG. 33 illustrates an exemplary setting 1700 in which embodiments may be implemented. The setting includes a device 1701 operable in an environment 1705. The device includes means 1710 for discharging from an electronic printhead of the device a first marking substance on a surface in response to a first manual movement of the device. The device also includes means 1720 for including information corresponding to an environment of the device by regulating the discharging of the first marking substance on the surface. The device further includes means 1730 for discharging from a writing element of the device a second marking substance on the surface in response to a second manual movement of the device. In an alternative embodiment, the device also includes means 1740 for acquiring data indicative of an environment of the manual device.

Returning to FIG. 3 and the exemplary setting 200 that includes an exemplary manual device 210 operable in a context 205. Another embodiment of the exemplary manual device includes a writing element 212 and a controller 214. The writing element is operable to form a mark 272 on a surface 270 corresponding to a movement of the writing element over the surface. The controller is operable to digitally encode information in the mark.

In an embodiment, the writing element 212 further includes a writing element operable to form a human viewable mark 272 on a surface 270 corresponding to a movement of the writing element over the surface. In another embodiment, the writing element further includes a writing element operable to form a machine-readable mark on a surface corresponding to a movement of the writing element over the surface. In a further embodiment, the writing element further includes an electronic writing element operable to form a mark on a surface corresponding to a movement of the writing element over the surface. In another embodiment, the writing element further includes a writing element operable to form a mark on a surface corresponding to a manual movement of the writing element over the surface. In a further embodiment, the writing element further includes a writing element operable to form a mark on a surface corresponding to a machine caused movement of the writing element over the surface.

In an embodiment, the controller 214 further includes a controller operable to digitally encode information in the mark 272. The digitally encoded information including more information than any information represented by the movement of the writing element 212 over the surface. In another embodiment, the controller further includes a controller operable to digitally encode information in the mark. The encoded information including information other than any information represented by the movement of the writing element over the surface. In a further embodiment, the controller further includes a controller operable to digitally encode information in the mark by regulating the formation of the mark. The encoded information including information additional to any information represented by the movement of the writing element over the surface.

In an embodiment, the controller 214 operable to digitally encode information in the mark 272 further includes a controller operable to digitally encode information in the mark by regulating the formation of the mark. In a further embodiment, the controller further includes a controller operable to receive information other than information represented by the movement of the writing element over the surface and to digitally encode the received information in the mark. In another embodiment, the controller further includes a controller operable to receive the information corresponding to an aspect of the surface and to digitally encode the received information in the mark by regulating the formation of the mark.

In an embodiment, the controller 214 further includes a controller operable to digitally encode contextual information in the mark 272. In another embodiment, the controller further includes a controller operable to digitally encode information in the mark formed on a surface 270 of a patient. The information corresponding to at least one of a patient information and/or a patient history.

Figure 34:
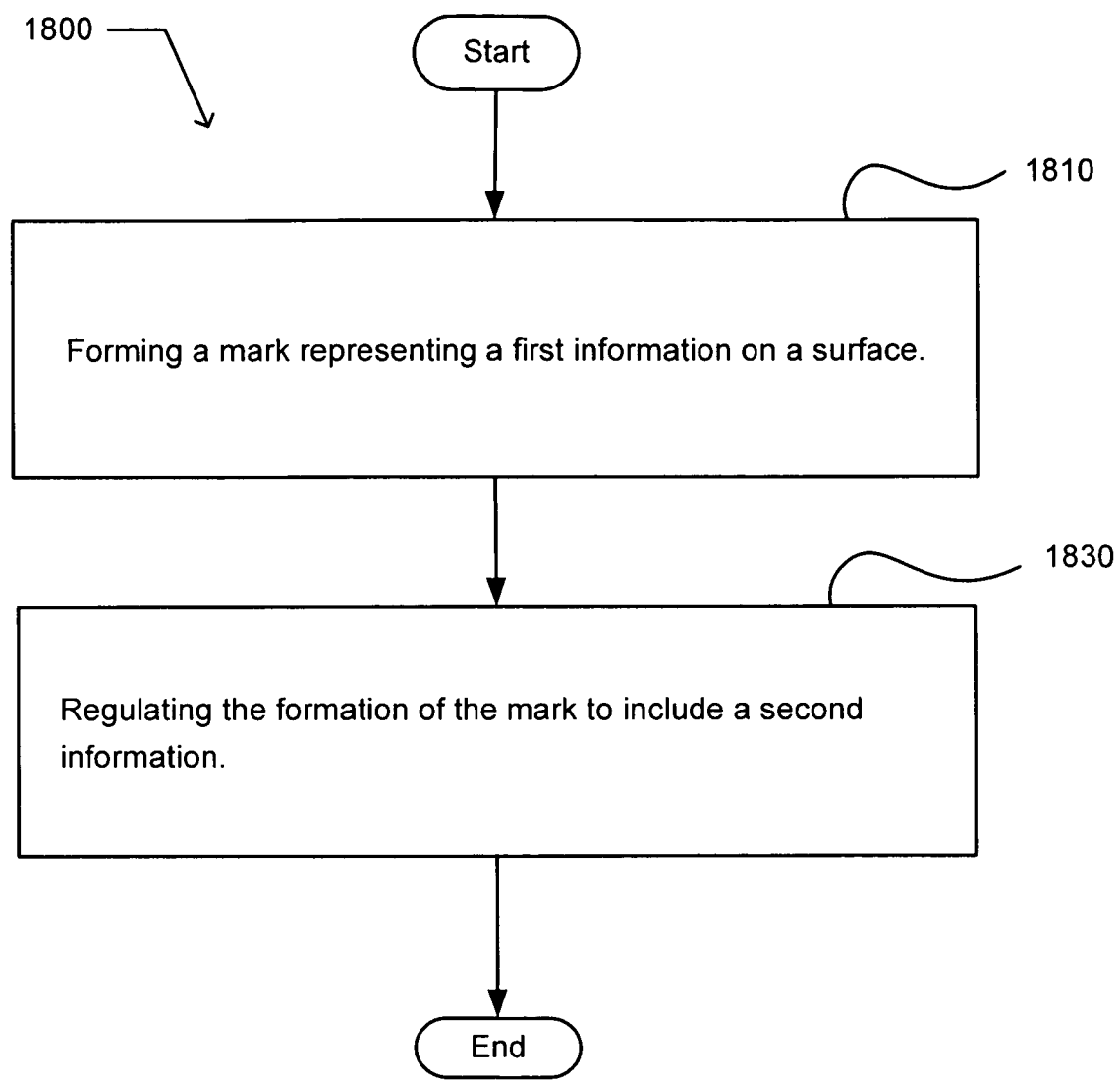
FIG. 34 illustrates an exemplary operational flow.

FIG. 34 illustrates an exemplary operational flow 1800. After a start operation, the operational flow moves to a writing operation 1810. The writing operation forms a mark representing a first information on a surface. An insertion operation 1830 regulates the formation of the mark to include a second information. The operational flow then moves to an end operation.

Figure 35:
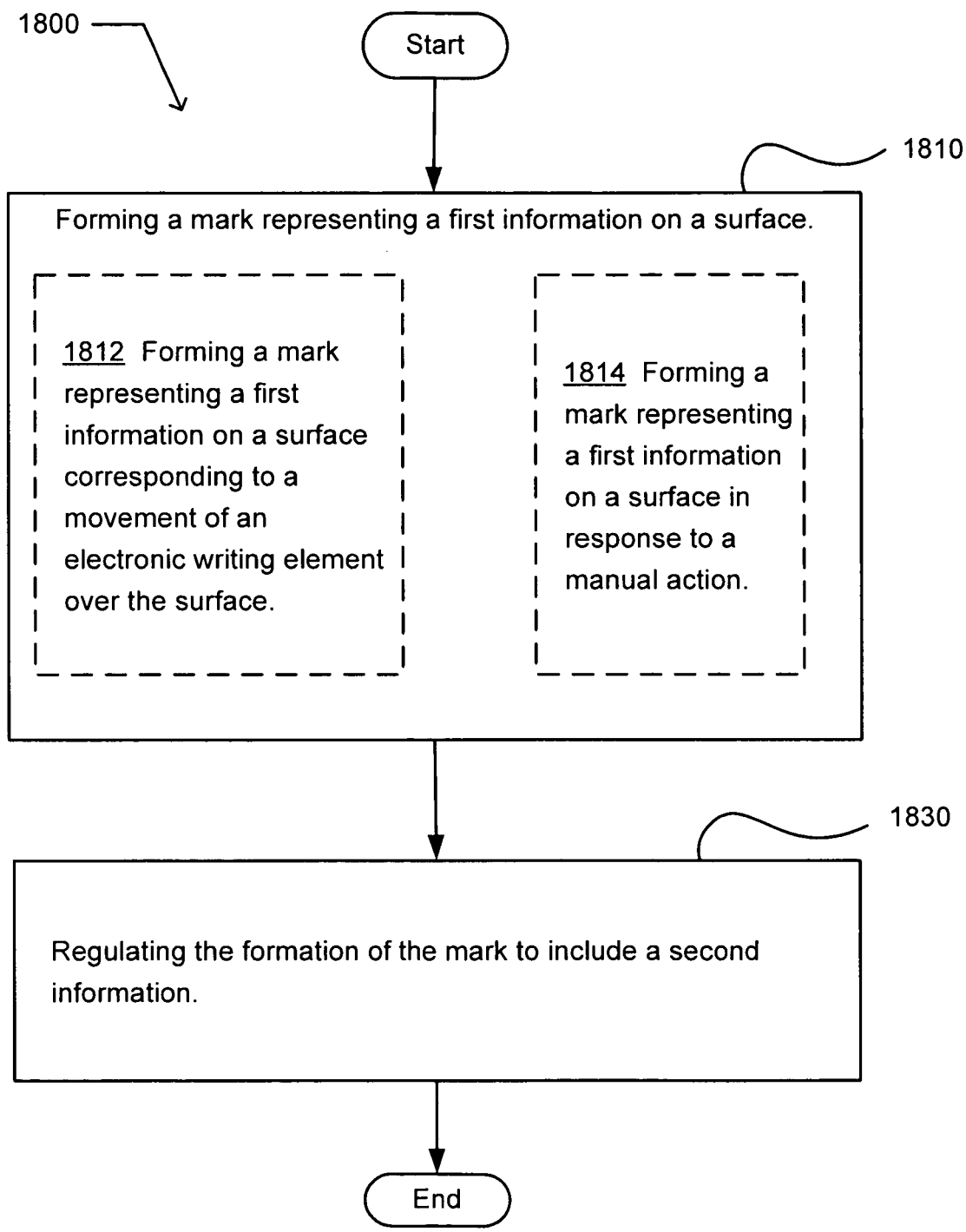
FIG. 35 illustrates an alternative embodiment of the operational flow of FIG. 34.

FIG. 35 illustrates an alternative embodiment of the operational flow 1800 of FIG. 34. The writing operation 1810 may include at least one additional operation. The at least one additional operation includes an operation 1812 and/or an operation 1814. The operation 1812 forms a mark representing a first information on a surface corresponding to a movement of an electronic writing element over the surface. The operation 1814 forms a mark representing a first information on a surface in response to manual action.

Figure 36:
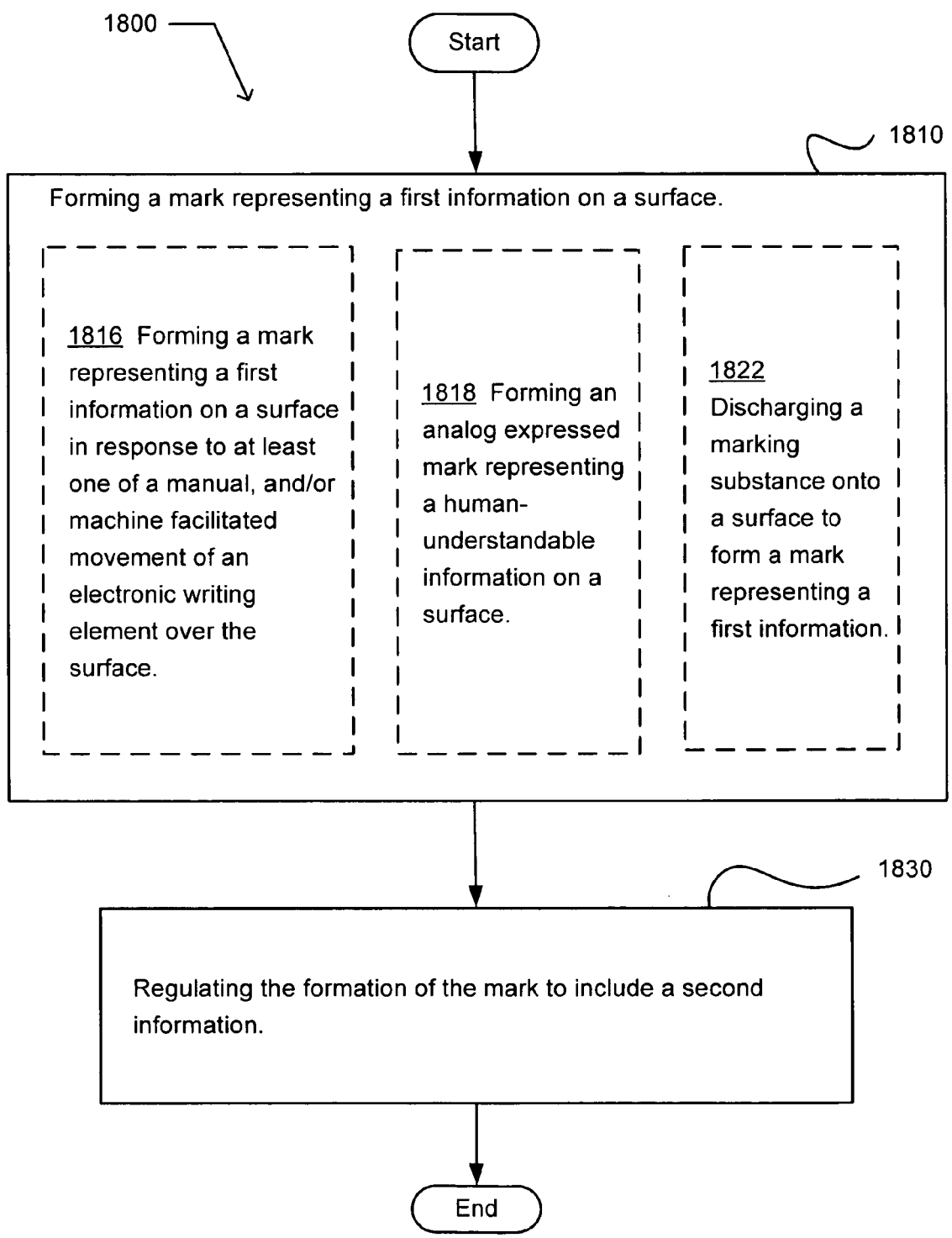
FIG. 36 illustrates another alternative embodiment of the operational flow of FIG. 34.

FIG. 36 illustrates another alternative embodiment of the operational flow 1800 of FIG. 34. The writing operation 1810 may include at least one additional operation. The at least one additional operation includes an operation 1816, an operation 1818, and/or an operation 1822. The operation 1816 forms a mark representing a first information on a surface in response to at least one of a manual, and/or machine facilitated movement of an electronic writing element over the surface. The operation 1818 forms an analog expressed mark representing a human-understandable information on a surface. The operation 1822 discharges a marking substance onto a surface to form a mark representing a first information.

Figure 37:
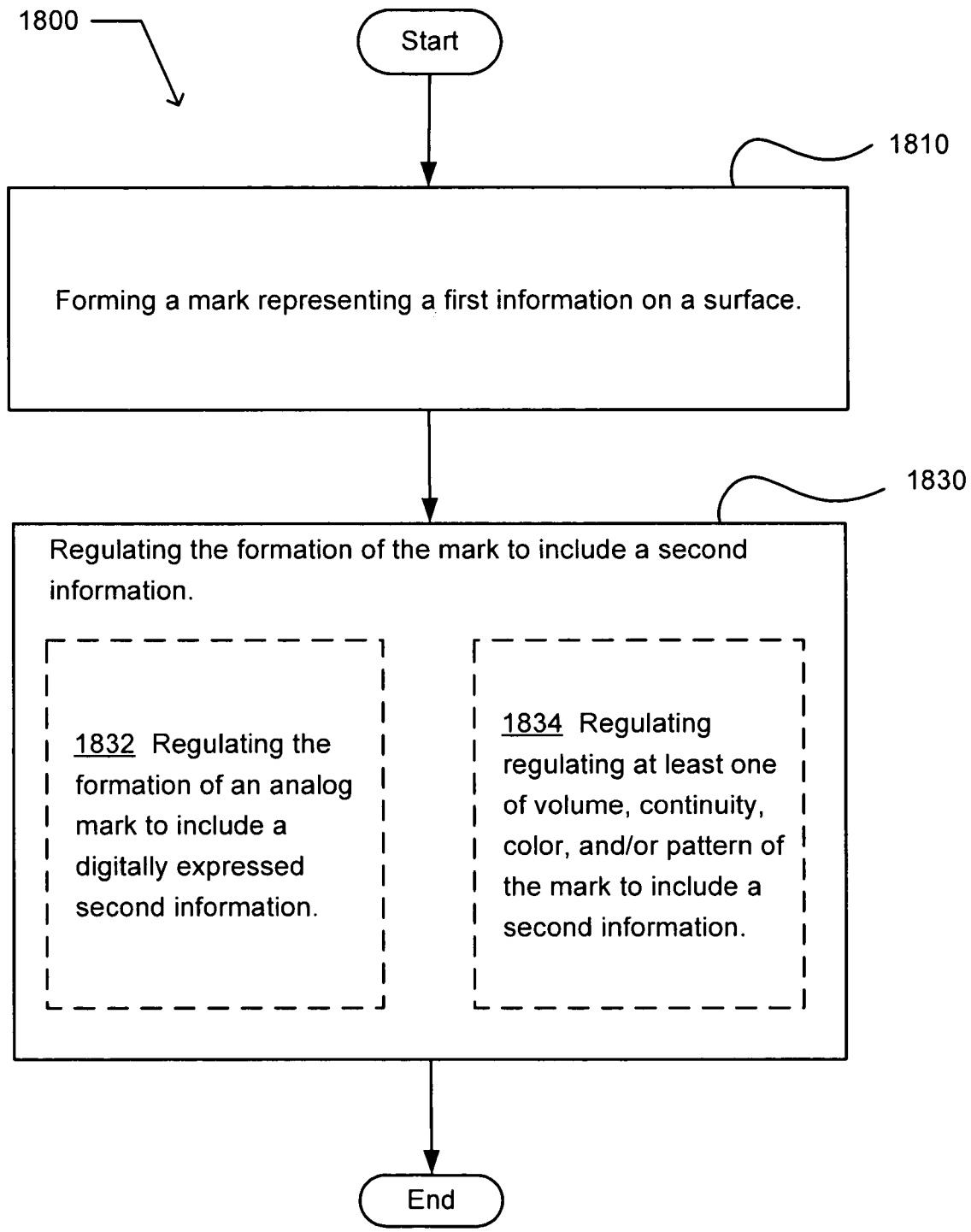
FIG. 37 illustrates a further alternative embodiment of the operational flow of FIG. 34.

FIG. 37 illustrates a further alternative embodiment of the operational flow 1800 of FIG. 34. The insertion operation 1830 may include at least one additional operation. The at least one additional operation includes an operation 1832 and/or an operation 1834. The operation 1832 regulates the formation of an analog mark to include a digitally expressed second information. The operation 1834 regulates at least one of volume, continuity, color, and/or pattern of the mark to include a second information.

Figure 38:
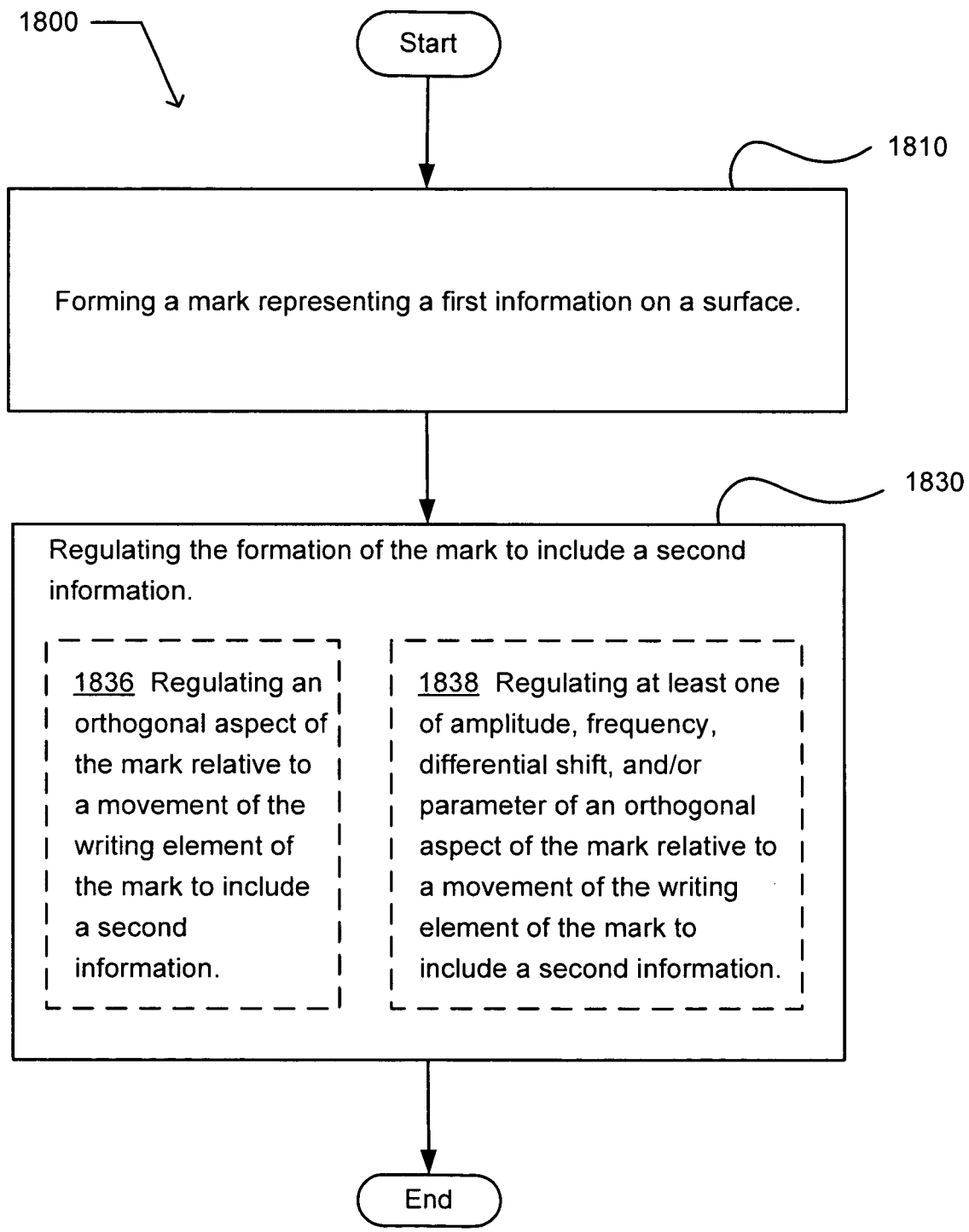
FIG. 38 illustrates an alternative embodiment of the operational flow of FIG. 34.

FIG. 38 illustrates an alternative embodiment of the operational flow 1800 of FIG. 34. The insertion operation 1830 may include at least one additional operation. The at least one additional operation includes an operation 1836 and/or an operation 1838. The operation 1836 regulates an orthogonal aspect of the mark relative to a movement of the writing element of the mark to include a second information. The operation 1838 regulates at least one of amplitude, frequency, differential shift, and/or parameter of an orthogonal aspect of the mark relative to a movement of the writing element of the mark to include a second information.

Figure 39:
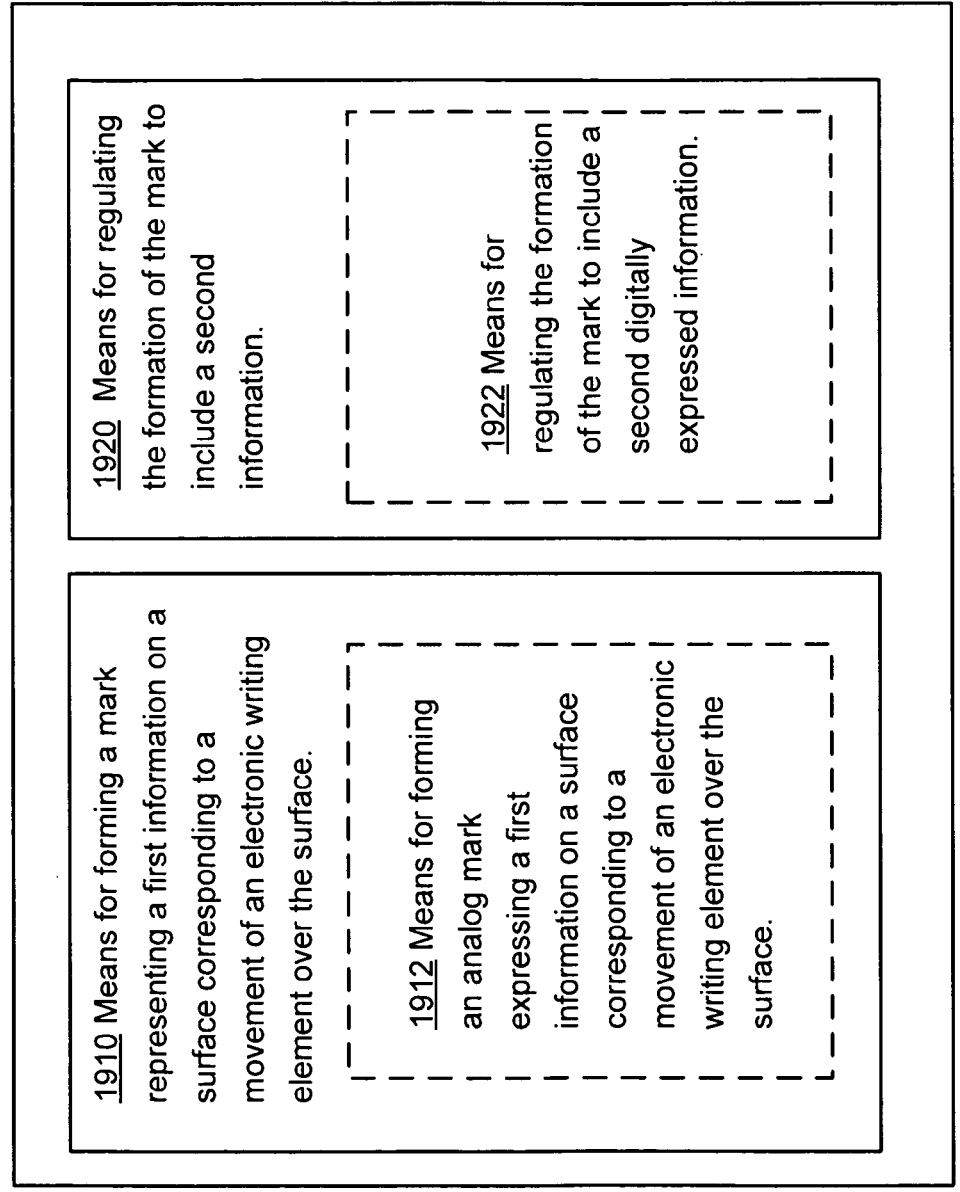
FIG. 39 illustrates a device in which embodiments may be implemented

FIG. 39 illustrates a device 1900 in which embodiments may be implemented. The device includes means 1910 for forming a mark representing a first information on a surface corresponding to a movement of an electronic writing element over the surface. The device also includes means 1920 for regulating the formation of the mark to include a second information.

In an alternative embodiment, the means 1910 include means 1912 for forming an analog mark expressing a first information on a surface corresponding to a movement of an electronic writing element over the surface. In another alternative embodiment, the means 1920 include means 1922 for regulating the formation of the mark to include a second digitally expressed information.

It will be understood by those skilled in the art that the various components and elements disclosed herein and in the drawings, as well as the various steps and substeps disclosed herein and in the drawings, may be incorporated together in different combinations to implement embodiments and enhance possible benefits and advantages. The exemplary system, apparatus, and device embodiment disclosed herein, including FIGS. 1-4, 9, 10, 15, 16, 19, 20, 26, 27, 33, and 39, along with other components, devices, know-how, skill, and techniques that are known in the art may be individually or in a combination to implement and/or practice one or more methods and process illustrated in FIGS. 5-8, 11-14, 17-18, 21-25, 28-32, and 34-38. It is to be understood that the methods and processes can be incorporated in one or more different types of computer program products with a carrier medium having program instructions encoded thereon. However, it is to be further understood by those skilled in the art that other systems, apparatus, and technology may be used to implement and practice such methods and processes.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
a manual device, including at least:
a longitudinal body;
a first marking element operable to discharge a first marking substance on a surface in response to a manual movement of the first marking element upon the surface, the first marking element proximate to a first end of the longitudinal body;
a second marking element operable to discharge a second marking substance on a surface in response to a controller, the second marking element proximate to an opposing end of the longitudinal body spaced apart from the first end; and
the controller operably coupled to at least the second marking element, the controller capable of at least:
regulating discharge of the second marking substance bearing digitally-encoded data in at least two dimensions via the second marking element; and
regulating discharge of the second marking substance based at least in part on acquired data indicative of at least one aspect of an environment of the manual device; and
a sensor operable to acquire data indicative of one or more aspects of an environment associated with the manual device.

2. The system of claim 1, wherein regulating discharge of the second marking substance based at least in part on acquired data indicative of at least one aspect of an environment of the manual device comprises:
regulating discharge of the second marking substance, the second marking substance including at least a liquid marking substance, based at least in part on acquired data indicative of one or more temperatures associated with the environment of the manual device, including at least adjusting a flow rate of the liquid marking substance based at least in part on the acquired data indicative of one or more temperatures.

3. The system of claim 1, wherein the controller operably coupled to at least the second marking element comprises:
a controller operably coupled to the at least second marking element, the controller capable of at least directing the second marking element to produce at least one of a two-dimensional barcode or a QR code on a surface via regulating discharge of the second marking substance via the second marking element.

4. The system of claim 1, wherein the controller operably coupled to at least the second marking element comprises:
a controller operably coupled to at least the second marking element, the controller capable of at least regulating discharge of the second marking substance to at least produce a barcode on a surface, the barcode capable of being decoded by a barcode reader.

5. The system of claim 1, wherein the controller operably coupled to at least the second marking element comprises:
a controller operably coupled to at least the second marking element, the controller capable of at least regulating discharge of at least three quantum dots, the discharge of the at least three quantum dots in at least two dimensions.

6. The system of claim 1, wherein the controller operably coupled to at least the second marking element comprises:
a controller operably coupled to at least the second marking element, the controller capable of at least regulating discharge at least three quantum dots in at least two dimensions, the at least three quantum dots capable of being distinguished from at least a portion of the second marking substance.

7. The system of claim 1, wherein the controller operably coupled to at least the second marking element comprises:
a controller operably coupled to at least the second marking element, the controller capable of at least regulating discharge of the second marking substance bearing digitally-encoded data in at least two orthogonal dimensions.

8. The system of claim 1, wherein the controller operably coupled to at least the second marking element comprises:
a controller operably coupled to at least the second marking element, the controller capable of at least regulating discharge of the second marking substance bearing digitally-encoded data wherein at least a portion of the discharged second marking substance is invisible to a human.

9. The system of claim 1, wherein the first marking element operable to discharge a first marking substance on a surface in response to a manual movement of the first marking element upon the surface, the first marking element proximate to a first end of the longitudinal body comprises:
the first marking element operable to discharge a first marking substance on a surface in response to at least one of a manual movement of the first marking element upon the surface or the controller.

10. The system of claim 1, wherein the controller operably coupled to at least the second marking element comprises:
a controller operably coupled to at least the second marking element, the controller capable of at least regulating discharge of the second marking substance bearing digitally-encoded data in at least two dimensions, including at least discharging two or more bits of data in a first dimension and two or more bits of data in a second dimension.

11. The system of claim 1, wherein the sensor operable to acquire data indicative of one or more aspects of an environment associated with the manual device comprises:
a sensor operable to acquire data indicative of one or more temperatures associated with the environment of the manual device.

12. The system of claim 1, wherein regulating discharge of the second marking substance based at least in part on acquired data indicative of at least one aspect of an environment of the manual device comprises:
regulating discharge of the second marking substance based at least in part on acquired data indicative of one or more temperatures associated with the environment of the manual device, including at least encoding at least one acquired temperature and regulating the discharge of the second marking substance to include at least the encoded at least one acquired temperature as digitally-encoded data.

13. The system of claim 1, wherein the manual device comprises:
a manual device including at least the sensor operable to acquire data indicative of one or more aspects of an environment associated with the manual device.

14. The system of claim 1, wherein the controller operably coupled to at least the second marking element comprises:
a controller operably coupled to at least the second marking element, the controller capable of at least regulating discharge of at least three quantum dots, the discharge of the at least three quantum dots in at least two dimensions, the at least three quantum dots capable of being distinguished by a human from at least a portion of the second marking substance.

15. The system of claim 1, further comprising:
an electronic device operable to wirelessly communicate with the manual device and including at least the sensor operable to acquire data indicative of one or more aspects of an environment associated with the manual device.

16. The system of claim 1, wherein the second marking element operable to discharge a second marking substance on a surface in response to a controller, the second marking element proximate to an opposing end of the longitudinal body spaced apart from the first end comprises:
a second marking element operable to discharge a substance on a surface in response to a controller and in response to another manual movement.

17. The system of claim 1, wherein the manual device comprises:
a first marking element operable to discharge a first marking substance via the first marking element; and
a second marking element operable to discharge the first marking substance via the second marking element.

18. A method, comprising:
providing a manual device, including at least:
a longitudinal body;
a first marking element operable to discharge a first marking substance on a surface in response to a manual movement of the first marking element upon the surface, the first marking element proximate to a first end of the longitudinal body; and
a second marking element operable to discharge a second marking substance on a surface, the second marking element proximate to an opposing end of the longitudinal body spaced apart from the first end;
acquiring data indicative of one or more aspects of an environment associated with a manual device;
digitally encoding at least some acquired data indicative of at least one aspect of the environment of the manual device; and
regulating discharge of the second marking substance via the second marking element of the manual device, including at least discharging the second marking substance to include at least the digitally-encoded data in at least two dimensions.

19. A system, comprising:
means for acquiring data indicative of one or more aspects of an environment associated with the system;
means for digitally encoding at least some acquired data indicative of at least one aspect of the environment of the system;
means for marking, including at least:
means for discharging a mark in response to contact with a surface;
means for discharging a mark bearing digitally-encoded data in at least two dimensions,
wherein the means for discharging a mark in response to contact with a surface and the means for discharging a mark bearing digitally-encoded data in at least two dimensions are disposed at opposing ends of the means for marking; and
means for regulating discharge of the means for discharging a mark bearing digitally-encoded data in at least two dimensions, the means for regulating discharge including at least a means for including at least some acquired digitally-encoded data within a mark bearing digitally-encoded data in at least two dimensions.

* * * * *

UNITED STATES PATENT AND TRADEMARK OFFICE
CERTIFICATE OF CORRECTION

PATENT NO. : 8,823,636 B2  
APPLICATION NO. : 11/603334  
DATED : September 2, 2014  
INVENTOR(S) : Cohen et al.

Page 1 of 1

It is certified that error appears in the above-identified patent and that said Letters Patent is hereby corrected as shown below:

Title Page, Item (75) Inventors, should read

-- (75) Inventors: Alexander J. Cohen, Mill Valley, CA (US); B. Isaac Cohen, Mill Valley, CA (US); Ed Harlow, Boston, MA (US); Eric C. Leuthardt, St. Louis, MO (US); Royce A. Levien, Lexington, MA (US); Mark A. Malamud, Seattle, WA (US); Robert W. Lord, Seattle, WA (US) --.

Signed and Sealed this
Fifteenth Day of September, 2015

Michelle K. Lee
*Director of the United States Patent and Trademark Office*